United States Patent [19]

Strolle et al.

[11] Patent Number: 5,500,739
[45] Date of Patent: Mar. 19, 1996

[54] FREQUENCY-MULTIPLEXING FM LUMA SIGNAL WITH COLOR AND 2ND UNDER SIGNALS HAVING OVERLAPPING FREQUENCY SPECTRA

[75] Inventors: Christopher H. Strolle, Glenside, Pa.; Chandrakant B. Patel, Hopewell, N.J.; Werner F. Wedam, Lawrenceville, N.J.; Raymond Schnitzler, Highland Park, N.J.; Hermann J. Weckenbrock, Bordentown, N.J.; Jung Wan Ko, Lawrenceville, N.J.; Jong Kwung Yun, Suwon, Rep. of Korea; Allen L. Limberg, Ringoes, N.J.

[73] Assignee: SamSung Electronics Co., Ltd., Suwon, Rep. of Korea

[21] Appl. No.: 59,765

[22] Filed: May 11, 1993

Related U.S. Application Data

[63] Continuation-in-part of Ser. No. 531,070, May 31, 1990, abandoned, Ser. No. 27,772, Mar. 8, 1993, abandoned, Ser. No. 8,813, Jan. 25, 1993, and Ser. No. 787,690, Nov. 4, 1991, which is a continuation-in-part of Ser. No. 635,197, Jan. 2, 1991, abandoned, which is a continuation-in-part of Ser. No. 569,029, Aug. 17, 1990, Pat. No. 5,113,262, said Ser. No. 8,813, is a continuation-in-part of Ser. No. 604,494, Oct. 26, 1990, abandoned.

[51] Int. Cl.$^6$ ........................................... H04N 9/79
[52] U.S. Cl. .................. 358/310; 358/320; 358/330; 348/638; 348/708; 348/712; 348/713; 348/641; 348/642
[58] Field of Search .................. 358/310, 320, 358/330, 334; 348/441, 453, 455–459, 638, 641, 642, 708, 712, 713; H04N 9/79

[56] References Cited

U.S. PATENT DOCUMENTS

| | | | |
|---|---|---|---|
| 4,831,463 | 5/1989 | Faroudja | 358/310 |
| 4,870,481 | 9/1989 | Kawamata | 358/31 |
| 4,984,093 | 1/1991 | Schmidtmann et al. | 358/330 |
| 5,031,030 | 7/1991 | Hurst, Jr. | 358/12 |
| 5,063,457 | 11/1991 | Ishikawa et al. | 358/330 |
| 5,113,262 | 5/1992 | Strolle et al. | 358/310 |
| 5,161,030 | 11/1992 | Song | 358/310 |

FOREIGN PATENT DOCUMENTS

| | | |
|---|---|---|
| 0015499A1 | 9/1980 | European Pat. Off. . |
| 0484154A2 | 5/1992 | European Pat. Off. . |
| WO90/09080 | 8/1990 | WIPO . |

OTHER PUBLICATIONS

British Office Action on Application No. 9108836.9 Oct. 1993.

Journal of British I.R.E. on "Reduction of Television Bandwidth by Frequency–Interlace", Feb. 1960, pp. 127–136 (disclosed by Howson and Bell).

Primary Examiner—Tommy P. Chin
Assistant Examiner—Khoi Truong
Attorney, Agent, or Firm—Robert E. Bushnell

[57] ABSTRACT

A frequency-multiplexed video signal is generated in which a color-under signal and a second under signal are linearly combined with at least partially overlapping frequency spectra to form a composite under signal for an FM luma signal. The frequency-multiplexed video signal is suited for recording on magnetic tape using helical scanning methods and for being played back from the magnetic tape using helical scanning methods. The second under signal is generated in such way that line-comb filtering can be used during playback to separate color-under signal and second under signal each from the composite signal despite their frequency spectra being at least partially overlapping in the composite signal.

160 Claims, 16 Drawing Sheets

|  |  | START OF |  | COLOR SUB-CARRIER | PHASE ALT CARRIER |
|---|---|---|---|---|---|
| FR1 | FLD1 | LINE | 1 | 0° | 0° |
|  | FLD2 | LINE | 263 | 0° | 0° |
| FR2 | FLD1 | LINE | 1 | −180° | 0° |
|  | FLD2 | LINE | 263 | −180° | 0° |

TABLE I

|  |  | 3.58 MHz COLOR SUB-CARRIER | 629 KHz COLOR-UNDER CARRIER | 629 KHz SECOND-UNDER CARRIER | | 3.58 MHz PAC | 4.21 MHz CARRIER |
|---|---|---|---|---|---|---|---|
| FR1 FLD1 | LINE 1 | 0° | 0° | IP | 0° | 0° | 0° |
|  | LINE 2 | 180° | 270° | OP | 90° | 0° | 90° |
|  | LINE 3 | 0° | 180° | IP | 180° | 0° | 180° |
|  | LINE 4 | 180° | 90° | OP | 270° | 0° | 270° |
|  | LINE 5 | 0° | 0° | IP | 0° | 0° | 0° |
|  | ⋮ |  |  |  |  |  |  |
|  | LINE 262 | 180° | 270° | OP | 90° | 0° | 90° |
| FLD2 | LINE 263 | 0° | 0° | IP | 0° | 0° | 0° |
|  | LINE 264 | 180° | 90° | OP | 270° | 0° | 270° |
|  | LINE 265 | 0° | 180° | IP | 180° | 0° | 180° |
|  | LINE 266 | 180° | 270° | OP | 90° | 0° | 90° |
|  | LINE 267 | 0° | 0° | IP | 0° | 0° | 0° |
|  | ⋮ |  |  |  |  |  |  |
|  | LINE 525 | 0° | 180° | IP | 180° | 0° | 180° |
| FR2 FLD1 | LINE 1 | 180° | 180° | OP | 0° | 0° | 0° |
|  | LINE 2 | 0° | 90° | IP | 90° | 0° | 90° |
|  | LINE 3 | 180° | 0° | OP | 180° | 0° | 180° |
|  | LINE 4 | 0° | 270° | IP | 270° | 0° | 270° |
|  | LINE 5 | 180° | 180° | OP | 0° | 0° | 0° |
|  | ⋮ |  |  |  |  |  |  |
|  | LINE 262 | 0° | 90° | IP | 90° | 0° | 90° |
| FLD2 | LINE 263 | 180° | 180° | OP | 0° | 0° | 0° |
|  | LINE 264 | 0° | 270° | IP | 270° | 0° | 270° |
|  | LINE 265 | 180° | 0° | OP | 180° | 0° | 180° |
|  | LINE 266 | 0° | 90° | IP | 90° | 0° | 90° |
|  | ⋮ |  |  |  |  |  |  |
|  | LINE 525 | 180° | 0° | OP | 180° | 0° | 180° |

TABLE II

*Fig. 7*

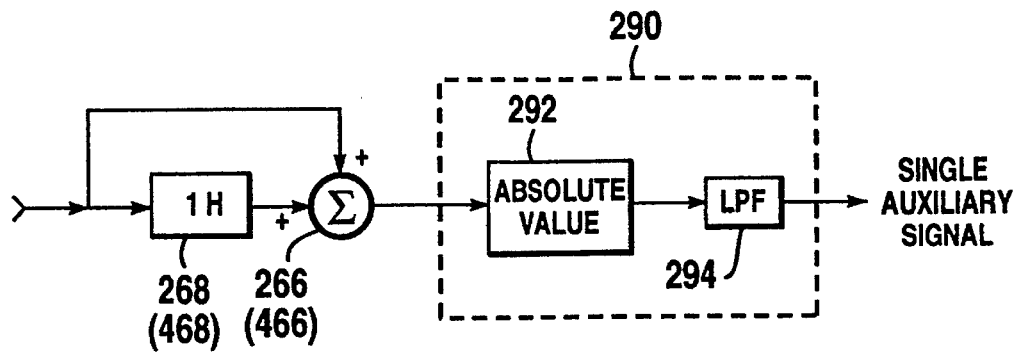
Fig. 12
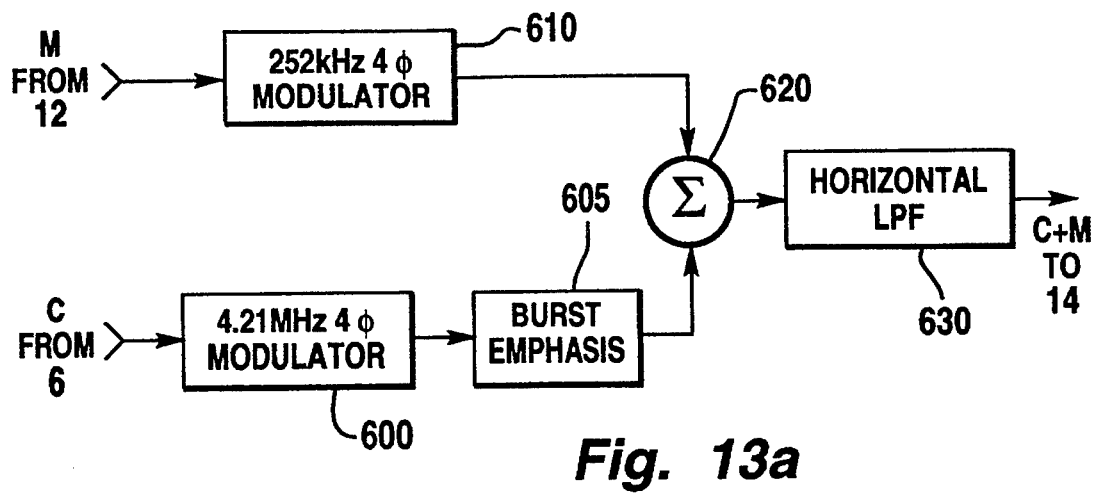
Fig. 13a
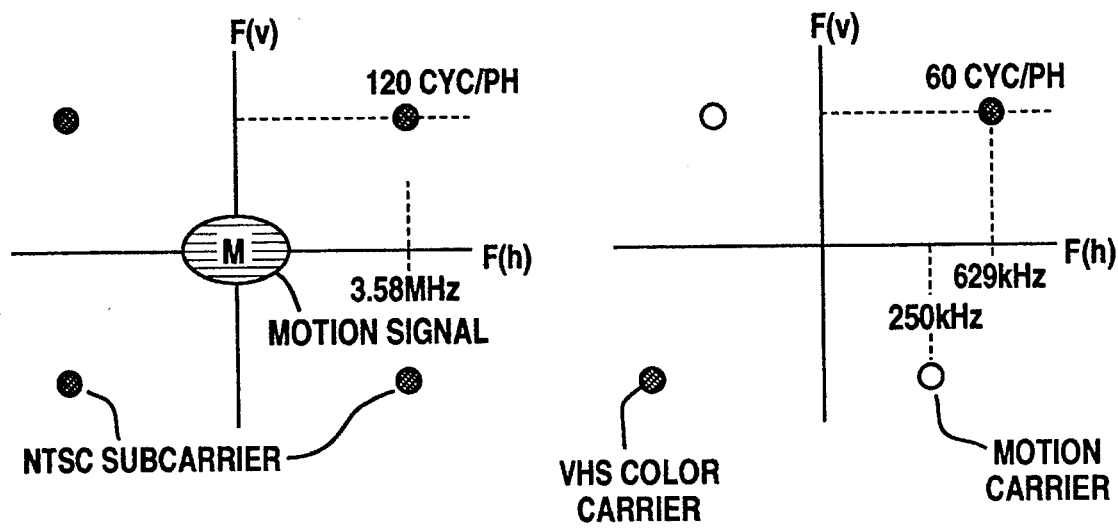
Fig. 13b     Fig. 13c

FREQUENCY-MULTIPLEXING FM LUMA SIGNAL WITH COLOR AND 2ND UNDER SIGNALS HAVING OVERLAPPING FREQUENCY SPECTRA

This is a continuation-in-part of U.S. patent application Ser. No. 07/531,070 filed May 31, 1990 now abandoned, and of U.S. patent application Ser. No. 08/027,772 filed Mar. 8, 1993, now abandoned, and of U.S. patent application Ser. No. 08/008,813 filed Jan. 25, 1993, and is a continuation-in-part of U.S. patent application Ser. No. 07/787,690 filed Nov. 4, 1991. U.S. patent application Ser. No. 07/787,690 filed Nov. 4, 1991, is a continuation-in-part of U.S. patent application Ser. No. 07/635,197 filed Jan. 2, 1991,; now abandoned which is a continuation-in-part of U.S. patent application Ser. No. 07/569,029 filed Aug. 17, 1990, and issued May 12, 1992, as U.S. Pat. No. 5,113,262. U.S. patent application Ser. No. 08/008,813 filed Jan. 25, 1993, is a continuation-in-part of U.S. patent application Ser. No. 07/604,494 filed Oct. 26, 1990, now abandoned.

The invention described herein relates generally to an apparatus and a method for processing video signals comprising luminance and chrominance signal components to be recorded on and played back from magnetic tape. More particularly, the invention relates to transmitting auxiliary information together with a color-under signal in a frequency band of the signal recorded on the magnetic tape, which frequency band is under a frequency band containing a luminance carrier frequency modulated by the luminance signal.

BACKGROUND OF THE INVENTION

In video recording systems, it is known to modulate the frequency of a luminance carrier in accordance with a luminance signal separated from a composite video signal, thereby to generate a frequency-modulated (FM) luma signal. It is further known to translate the frequencies of a chrominance signal separated from a composite video signal, which frequencies are from the upper portions of the spectrum of the composite video signal to lower frequencies, to generate a "color-under" signal that can be frequency-multiplexed below the frequency-modulated luminance carrier to form a video signal for recording. Such a frequency translation or down-conversion procedure for chrominance signal implements what is known in the recording art as a color-under recording system.

In a color-under recording system, the signal reproduced during playback is supplied to frequency-selective filters for separation into an upper-band frequency-modulated luminance carrier and a lower-band color-under signal. The luminance (Y) signal, in accordance with which the frequency of the luminance carrier was modulated during recording, is detected. The frequencies of the color-under signal are translated back to their original spectrum during playback in an up-conversion procedure to restore chrominance (C) signal with its the in-phase (I) and quadrature (Q) components. The restored chrominance (C) signal can be recombined with the detected luminance (Y) signal to regenerate the composite video signal, which can then be used to modulate a low-level picture carrier to be supplied together with a low-level sound carrier to a television receiver. Or, in apparatus combining a video tape machine and a television receiver, the chrominance (C) signal can be supplied directly to synchronous detectors for detecting color-difference signals therefrom for application to color matrix circuitry, and the detected luminance signal can be supplied directly to a luma delay line preceding the color matrix circuitry.

As is well known, in video cassette recorders (VCRs) according to the standard VHS format, the input video chrominance (color difference) information which is modulated on a chroma sub-carrier (nominally 3.58 MHz for NTSC composite video) is separated from the luminance information prior to recording and then frequency down-converted by heterodyning against a 4.21 MHz carrier to provide a sub-carrier at approximately 629 KHz (40 times the horizontal scanning frequency) with the sidebands reversed in order from the NTSC chroma component, to be directly recorded onto the videotape in the frequency spectrum below the recorded luminance component (i.e., below approximately 1.2 MHz.) as the so-called "color-under" sub-carrier signal. As is also well known, in order to reduce beat and cross-talk between mutually adjacent recorded tracks, during the recording process the phase of the VHS format's 629 KHz color-under carrier is shifted 90° each line in every track scan (i.e., field), so that its phase is shifted or rotated +90° per line (advanced) on odd tracks and −90° per line (retarded) on even tracks. See for example U.S. Pat. Nos. 3,723,638 to Fuhita, 4,068,257 to Hirota et al. and 4,178,606 to Hirota, the disclosures of which patents are incorporated hereinto by reference thereto.

In U.S. Pat. No. 5,113,262, issued 12 May 1992 to inventors of the invention described herein and to others, entitled VIDEO SIGNAL RECORDING SYSTEM ENABLING LIMITED BANDWIDTH RECORDING AND PLAYBACK and incorporated by reference into this specification, a video signal recording system is described that modifies VHS video cassette recording by folding the spectrum of a 5 MHz bandwidth luminance signal to frequency-modulate the luminance carrier, the modulation sidebands of which are higher in frequency than an accompanying color-under signal. A motion (M) signal is derived descriptive of the frame-to-frame changes in the luminance signals, is used for controlling adaptive filtering of the luminance signal during recording, and is recorded for controlling adaptive filtering of the luminance signal during playback.

The video signal recording system described in U.S. Pat. No. 5,113,262 includes an adaptive deemphasis circuit in the record path for luminance signal and an adaptive reemphasis circuit in the playback path for luminance signal. The adaptive deemphasis circuit includes circuitry for detecting the level of the high-frequency portion of the luminance signal and includes circuitry for variably reducing the level of the high-frequency portion in response to the detected signal level. If the level of the high-frequency portion of the luminance signal is high, then the level of the high-frequency portion is reduced by a maximum amount; if the level is low, then the level is reduced by a minimum amount. The adaptive reemphasis circuit in the playback path performs substantially the inverse operation. This adaptive reemphasis circuit includes circuitry for detecting the level of the high-frequency portion of the unfolded luminance signal, and circuitry for variably increasing the level of the high-frequency portion in response to the detected level. If the level of the high-frequency portion of the unfolded luminance signal is relatively high, then the level is boosted by the maximum amount; if the level is relatively low, then the level is boosted by the minimum amount.

U.S. patent application Ser. No. 07/787,690 filed 4 Nov. 4, 1991 by C. H. Strolle et alii, entitled SYSTEM FOR RECORDING AND REPRODUCING A WIDE BANDWIDTH VIDEO SIGNAL VIA A NARROW BAND- WIDTH SYSTEM describes improvements in the deemphasis and reemphasis functions in a video signal recording system of the type described in U.S. Pat. No. 5,113,262. U.S. patent application Ser.No. 07/787,690 also describes improvements in the recording of the motion (M) signal, in which the motion (M) signal is used to modulate the amplitude of a 252 kHz second under carrier located below the 629 kHz color-under carrier in the frequency multiplex signal generated for recording on video tape. U.S. patent application Ser.No. 07/787,690 describes the use of quadrature selective filters (QSFs) for separating the overlapping amplitude-modulation sidebands of the color-under and second carriers when playing back from the video tape. (The specification and drawing of U.S. patent application Ser.No. 07/787,690 are included herein, by inclusion in an appendix at the close of this specification.)

The correspondence between the deemphasis and reemphasis functions in a video signal recording system of the type described in U.S. Pat. No. 5,113,262 can be adversely affected by the presence of noise in the signal recovered from the video tape. U.S. patent application Ser.No. 08/008,813 filed 25 Jan. 1993 by C. H. Strolle et alii and entitled ADAPTIVE DEEMPHASIS AND REEMPHASIS OF HIGH FREQUENCIES IN VIDEO TAPE RECORDING, UTILIZING A RECORDED CONTROL SIGNAL describes a control signal (G) used for controlling the deemphasis function during recording being recorded on the video tape, to be reproduced during playback for controlling the reemphasis function. U.S. patent application Ser.No. 08/008,813 is a continuation-in-part of U.S. patent application Ser.No. 07/604,494 filed 26 Oct. 1990 and indicates that it is preferable to multiplex the control signal into the modified VHS video signal described in U.S. Pat. No. 5,113,262 to avoid the need for further heads for recording and playback of the control signal. (The specification and drawing of U.S. patent application Ser.No. 08/008,813 are are included herein, by inclusion in an appendix at the close of this specification.)

There is, then, a need in the color video cassette recording art to convey in a manner compatible with already established video recording procedures auxiliary signals, such as the motion signal (M) and control signal (G) described above, which provide for improved regeneration of the color television signals. In accordance with the invention the color-under signal is augmented with another under signal carrying the motion signal (M) and control signal (G) described above (or, alternatively, other additional information such as digital audio signals). If this second under signal carries additional information of significant bandwidth, the frequency band in which it reposes will have to overlap the frequency band of the color-under signal at least to some extent. The problem, then, is how to encode the color-under and second under signal such that they can be separated from each other after sharing the same frequency band during recording.

Luma/chroma separators using line-comb filters are known by designers of television receivers and designers of video recorders. In one type of luma/chroma separator, a composite video signal and that signal as delayed by the interval of one horizontal scan line can be differentially combined to separate the chrominance signal from the luminance signal, and the same signals can be additively combined to separate the luminance signal from the chrominance signal. This is because both the luminance and chrominance signals are highly correlated from line to line; but the 3.58 MHz color subcarrier, being an odd multiple of half scan line frequency, is out-of-phase at corresponding positions along current scan lines in the two differentially combined composite video signals differentially delayed by one scan line. In an alternative known type of luma/chroma separator, a composite video signal, that signal as delayed by the interval of one horizontal scan line, and that signal as delayed by the interval of one horizontal scan line are combined in (1/4):(1/2):(1/4) ratio, to separate the luminance signal from the chrominance signal, and are combined in (−1/4):(1/2):(−1/4) ratio, to separate the chrominance signal from the luminance signal.

A baseband signal, like the luminance signal in the composite video signal, is not a suitable signal for recording on a magnetic tape, particularly when using helical scanning techniques as usually done in video recording. A modulated carrier is required during recording for coupling from the record amplifier through the rotary transformer to the heads on the headwheel rim and for coupling from the head to induce appreciable magnetic flux variations in the magnetic tape. A modulated carrier is also required during playback so the magnetic flux variations in the magnetic tape induce appreciable electrical playback response from the heads and for coupling from the heads on the headwheel rim back through the rotary transformer to the playback amplifier.

Suppose that a modulated carrier that is an even multiple of half scan line frequency is combined with a modulated carrier that is an odd multiple of half scan line frequency and the combined signal is down-converted by heterodyning with an unmodulated carrier that is an odd multiple of half scan line frequency, thereafter to be frequency multiplexed with an FM luma signal. Suppose further that during playback the down-converted signal is recovered and up-converted to regenerate the combined signal. The carrier that is an even multiple of half scan line frequency is in-phase at corresponding positions along current scan lines in the two differentially combined composite video signals differentially delayed by one scan line. The carrier that is an odd multiple of half scan line frequency is out-of-phase at corresponding positions along current scan lines in the two differentially combined composite video signals differentially delayed by one scan line. Accordingly, the inventors note, line-comb filtering can be used to separate the carrier that is an even multiple of half scan line frequency from the carrier that is an odd multiple of half scan line frequency. The carrier that is an odd multiple of half scan line frequency can be the color subcarrier encoding I and Q signals in what are essentially quadrature amplitude-modulation (QAM) sidebands per the prior art. The carrier that is an even multiple of half scan line frequency can encode the M and G signals in QAM sidebands.

Alternatively, suppose that a modulated carrier that is a first odd multiple of half scan line frequency is combined with a modulated carrier that is a second odd multiple of half scan line frequency and the combined signal is down-converted to be frequency multiplexed with an FM luma signal. Suppose further that during playback the down-converted signal is recovered and up-converted to regenerate the combined signal. The carrier that is a first odd multiple of half scan line frequency can be the color subcarrier encoding I and Q signals in what are essentially quadrature amplitude-modulation (QAM) sidebands, and the carrier that is a second odd multiple of half scan line frequency can encode the M and G signals in QAM sidebands. Line-comb filtering can be used to separate the carrier that is a second odd multiple of half scan line frequency from the carrier that is a first odd multiple of half scan line frequency, the inventors point out, if the carrier that is a second odd multiple of half scan line frequency is made to be in-phase at corresponding positions in the two differentially combined composite video signals differentially delayed by one scan line. This can be accomplished by reversing the phase of the carrier that is a second odd multiple of half scan line frequency from each horizontal scan line to the next, the inventors point out.

SUMMARY OF THE INVENTION

The invention is embodied in one of its aspects in electrical manifestations of a video-related signal in which a first carrier wave that is a multiple of half horizontal scan line frequency and a second carrier wave that is a multiple of half horizontal scan line frequency are modulated in accordance with respective signals and the respective modulation results are linearly combined with at least partially overlapping frequency spectra. Each of the first and second carrier waves is amplitude modulated, at times in each of two phases that are in quadrature with each other. The first carrier wave is caused to be in-phase at corresponding positions in a current scan line and the previous scan line, and the second carrier wave is caused to be out-of-phase at corresponding positions in a current scan line and the previous scan line. The invention is embodied in another of its aspects in apparatus for generating a description of such a video-related signal in electric signal form.

The invention is embodied in another of its aspects in apparatus for generating an electrical signal descriptive of the result of downconverting such a video-related signal to form a composite under signal for frequency multiplexing with an FM luma signal. The invention is embodied in still others of its aspects in apparatus for magnetically recording such a frequency-multiplexed video signal on a magnetic medium and in apparatus for regenerating such a frequency-multiplexed video signal in electric signal form by playback from such a magnetic recording on a magnetic medium.

The invention is embodied in yet another of its aspects in the separation of the modulated first carrier wave and the modulated second carrier wave, as linearly combined with at least partially overlapping frequency spectra, each from the other by line-comb filtering.

BRIEF DESCRIPTION OF THE DRAWING

FIG. 5 is a schematic showing the chroma vector resolved from the respective I and Q signals and relative positions of the auxiliary signals.

FIGS. 6 and 7 respectively consist of a TABLE I and a TABLE II tabulating phase relationships of signals in the color-under system embodying the invention.

FIG. 12 is a block diagram showing a modification that can be made to the FIG. 8 color-under playback or receiver electronics when the second under signal is used for conveying only a single auxiliary signal.

FIG. 13a is a block diagram of a chrominance/motion signal combining circuit embodying the invention in one of its aspects;

FIG. 13b is a two-dimensional spatial-frequency plot diagram, each point of which has vertical spatial frequency F(v) as ordinate and has horizontal spatial frequency F(h) as abscissa, showing the relationship between the NTSC color carrier and the motion signal;

FIG. 13c is a two-dimensional spatial-frequency plot diagram, each point of which has vertical spatial frequency F(v) as ordinate and has horizontal spatial frequency F(h) as abscissa, showing the relationship between a VHS format color-under carrier and the enclosed motion signal in an even track (channel);

FIG. 13f is a block diagram of a conventional chroma comb filter, which FIGS. 13a through 13f are used in explaining certain precepts of the invention.

DETAILED DESCRIPTION

The present description is made in the context of a television signal processing system in accordance with the NTSC standards adopted by the United States. Nevertheless, the principles of the invention may be applied to the PAL system used primarily in Europe. Moreover, the invention can have application to color television transmission or recording systems where the chroma signal supplied for recording is separate from the luma signal supplied for recording, rather than being included together with the luma signal in a composite signal.

Figure 1:
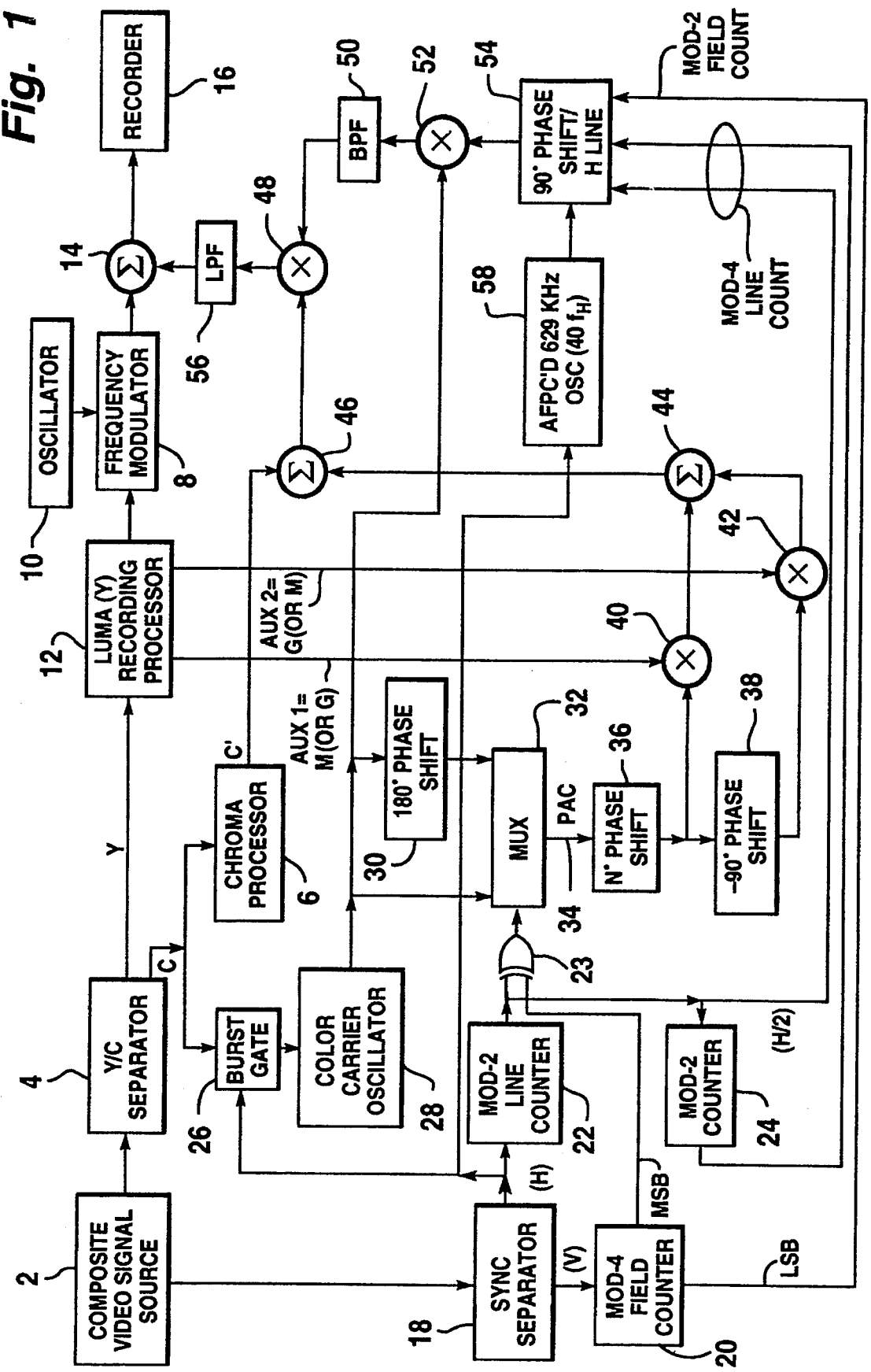
FIG. 1 is a block diagram of color-under recording or transmitter electronics constructed in accordance with an aspect of the invention, in which electronics a second under signal has a suppressed carrier of the same frequency as that of the color under signal, but reversed in phase from each horizontal scan line to the next within each successive image field, and in which the color-under and second under signals are linearly combined to form a composite under signal.

FIG. 1 color-under recording or transmitter electronics connect to a source 2 supplying a composite video signal in NTSC format. The composite signal is applied as input signal to a luma/chroma (Y/C) separator 4, which responds to provide a separated luminance signal Y and a separated chrominance signal C. The Y/C separator 4 is preferably of the type employing line-combing of the chroma signal. The separated chroma signal C is supplied to a chroma processor 6. The chroma processor 6 can comprise an analog-to-digital converter, a digital filter for removing from the resulting digitized separated chroma the components falling into the Fukinuki hole that are likely to cause cross-color problems, and a digital-to-analog converter for converting the filter response C' to analog form. The color burst signal is boosted in level vis-a-vis the remainder of the chrominance information in the chroma signal as down-converted to form color-under signal; in the recording electronics of FIGS. 1–4 the circuitry for performing such boosting is presumed be included in the chroma processor 6.

A frequency modulator 8, of a conventional form used in the video recording art, modulates the frequency of a luminance carrier wave supplied from an oscillator 10. The frequency modulation is in accordance with output signal from a luma processor 12 that generates an analog folded-spectrum luminance signal of reduced bandwidth, no wider than that found in conventional VHS recording, proceeding from the separated luma signal Y supplied by the Y/C separator 4, as described in U.S. Pat. No. 5,113,262. The resulting FM signal encoding luma is supplied to an adder 14 there to be frequency-multiplexed with an augmented color-under signal to generate the processed video signal supplied to a video casette recorder 16 for recording.

The luma processor 12 includes circuitry for deriving a motion signal M descriptive of the frame-to-frame changes in the luminance signals, which is used within the luma processor 12 for controlling adaptive filtering of the luminance signal. The luma processor 12 also contains circuitry for generating a control signal G, which is used within the luma processor 12 for controlling adaptive deemphasis of the upper frequencies of the luminance signal as part of the procedure for folding them into the lower frequencies of the luminance signal. The motion signal M and the control signal G are supplied from the luma processor 12 for recording in accordance with an aspect of the invention.

A sync separator 18 receives composite video signal from the source 2 thereof, as shown in FIG. 1 of the drawing, or, alternatively, receives separated luminance signal Y from the Y/C separator 4. The sync separator 18 supplies separated vertical synchronizing pulses V to a two-stage binary counter 20 that counts fields of video on a modulo-four basis, supplying modulo-two frame count as the more significant of its two bits of count, and supplying modulo-two field count as the less significant of its two bits of count. The modulo-two field count is used to control head-switching in the video casette recorder 16 just as in conventional VHS recording. The binary counter 20 is reset so its modulo-two field count is correct by increasing its count by one after circuitry not shown in the drawing ascertains either (a) that the leading edge of the vertical sync falls in the middle of a horizontal scan line in a field supposedly the first field of a frame or (b) that the leading edge of the vertical sync falls at the beginnng of a horizontal scan line in a field supposedly the second field of a frame.

The sync separator 18 supplies separated horizontal synchronizing pulses H to a binary counter stage 22 that counts lines of video on a modulo-two basis, thereby functioning as a pulse rate divider for separated horizontal synchronizing pulses. The modulo-two line count from the counter stage 22 is supplied to a further modulo-two counter stage 24, the counter stages 22 and 24 together forming a two-stage binary counter that generates a modulo-four line count and that is reset during each vertical retrace interval by an edge of one of the separated vertical synchronizing pulses from the sync separator 18.

The sync separator 18 also supplies separated horizontal synchronizing pulses H to a burst gate 26. The burst gate 26 gates the color burst portions of the separated chroma signal C (each of which occurs a prescribed interval after a corresponding horizontal synchronizing pulse) to a 3.58 MHz color subcarrier oscillator 28, to be used in the automatic frequency and phase control (AFPC) of the oscillator 28. The color subcarrier oscillator 28 generates a 3.58 MHz continuous-wave (CW) carrier, which is frequency- and phase-locked in quadrature with the color burst signal, or a sampled-data digital description of such a signal. A 180° phase shift circuit 30 responds to the output signal of the oscillator 28 to generate a signal opposite in polarity to that output signal, and an inverting amplifier may be used for the 180° phase shift circuit 30.

The modulo-two line counter 22 generates an output signal is a logic ONE on odd horizontal scan lines and is a logic ZERO on even horizontal scan lines, as ones of those scan lines consecutive in time are consecutively counted. This output signal is exclusively OR'ed with the frame-identifying more significant bit of the count output from the modulo-four field counter 20 by an exclusive-OR gate 21 to generate the control signal used for controlling a multiplexer 32. The multiplexer 32 responds to select alternately the color subcarrier at 90° and 270° as respectively provided by the oscillator 28 and the 180° phase shift circuit 30, thereby to provide a line-by-line phase-alternating carrier PAC. A phase-shifter 36 phase shifts the PAC by N degrees relative to the phase of the PAC, N being an arbitrarily prescribed number. The PAC supplied from the phase shifter 36 is further phase shifted by −90° (i.e. advanced 90° in phase) by a phase shifter 38.

The motion signal M and the control signal G supplied from the luma processor 12 are preferably lowpass line-combed within the luma processor 12. In any case, preferably the rectified frame-to-frame changes in the luminance signal are lowpass spatially filtered to extend their influence in the vertical and the horizontal directions in a procedure called "motion spreading" that results in what is called a "spread" motion signal. A modulator 40 modulates the PAC supplied from the phase shifter 36 in accordance with a first auxiliary signal AUX1 that is one of the signals M and G. A modulator 42 modulates the PAC supplied from the phase shifter 38 in accordance with a second auxiliary signal AUX2 that is the other of the signals M and G. In each case, the nature of the modulation is balanced amplitude modulation, so an orthogonal pair of quadrature amplitude modulation (QAM) sidebands are generated by the modulators 40 and 42, which QAM sidebands are linearly combined in an adder 44 to generate a PAC with complex amplitude modulation. The amplitude modulation (AM) sidebands or quadrature amplitude modulation (QAM) sidebands of the PAC are a phase-alternated signal referred to as a "PAS" in the remainder of this specification.

The PAC with complex amplitude modulation is supplied from the adder 44 to a further adder 46, there to be added to the processed chroma signal C' supplied from the chroma processor 6. The output of adder 46 is an augmented chroma signal comprised of the chroma signal, encoded with chroma information (in two quadrature phases in NTSC), and the PAC with complex amplitude modulation by the M and G signals. The magnetic tapes currently used in the industry are limited-bandwidth and accordingly require that the augmented chroma signal be down-converted so as to translate it into the so-called color-under format. Accordingly, the augmented chroma signal from the adder 46 is remodulated to translate its spectrum to be below the luma FM signal with which it is subsequently frequency-multiplexed. Typically, the color-under carrier is at 629 KHz ($=40\,f_h$) in the VHS system.

The means to generate the signals in color-under format will now be described. The augmented chroma signal from the adder 46 is supplied to a first input of a modulator 48. The second input to the modulator 48 is a 4.21 MHz carrier signal supplied via a bandpass filter (BPF) 50 from the output of another modulator 52. The modulator 52 has two inputs: a 90° phase CW color subcarrier from the oscillator 28, and a 629 KHz ($-40\,f_h$) carrier supplied from the output of a 90°-phase-shift-per-horizontal-scan-line shifter 54. The modulator 52 accordingly generates 2.95 MHz and 4.21 MHz sidebands. The BPF 50 passes only the 4.21 MHz sidebands to the modulator 48.

The modulation products of the modulator 48 have the chroma signal and the M and G signals modulated on sidebands 3.58 MHz above and below the 4.21 MHz carrier supplied via the BPF 50. A lowpass filter (LPF) 56 passes only the lower-frequency, 629 KHz sidebands, which are collectively referred to in this specification and the claims which follow it as a composite under signal.

The phase shifter 54 receives descriptions of the 629 KHz sinusoidal CW carrier from an oscillator 58, which oscillator has automatic frequency and phase control (AFPC) for locking to the horizontal sync pulses H separated from the digital composite video signal by the sync separator 18. The modulo-four line count from the counter stages 22 is used together with the modulo-two field count from the field counter 20 to select which of 0°–, 90°–, 180° and 270°– phase responses to the 629 KHz from the oscillator 58 is applied to the modulator 52 during successive scan lines. This is a procedure similar to that used in prior-art VHS video cassette recorders.

Figure 2:
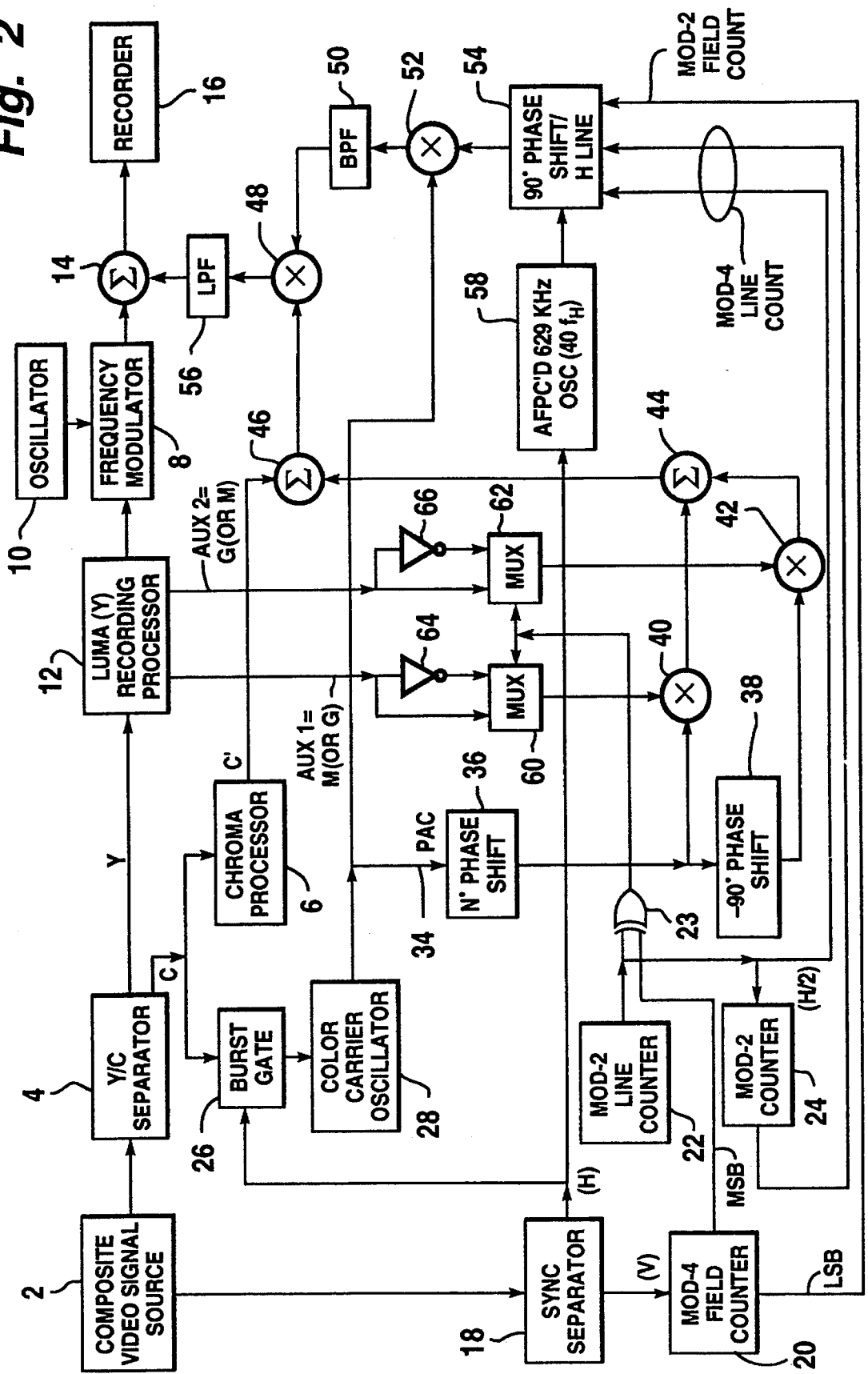
FIG. 2 is a block diagram of color-under recording or transmission electronics that are a variant of those shown in FIG. 1 and are also constructed in accordance with an aspect of the invention.

FIG. 2 shows a variant of the FIG. 1 color-under record or transmitter electronics in which the phase shift network 36 continuously receives the same phasing of 3.58 MHZ subcarrier from one horizontal scan line to the next, as supplied from the color carrier oscillator 28. The 180° phase shift circuit 30 and the multiplexer 32 of FIG. 1 are dispensed with in the FIG. 2 color-under record or transmitter electronics. Line-to-line inversion of the polarity of the AUX1 signal supplied to the digital multiplier 40 is used to cause the line-to-line inversion of 3.58 MHZ subcarrier phasing in the PAS generated as its product output signal for application to the adder 44. Similarly, line-to-line inversion of the polarity of the AUX2 signal supplied to the digital multiplier 42 is used to cause the line-to-line inversion of 3.58 MHZ subcarrier phasing in the PAS generated as its product output signal for application to the adder 44. The exclusive-OR gate 23 controls a multiplexer 60 for selecting the polarity of the AUX1 signal supplied to the digital multiplier 40, and the exclusive-OR gate 23 also controls a multiplexer 62 for selecting the polarity of the AUX2 signal supplied to the digital multiplier 42. The multiplexer 60 at a first of its inputs and a polarity-inverter 64 receive the AUX1 signal from the luma recording processor 12, and the multiplexer 60 receives the AUX1 signal in opposite-polarity at a second of its inputs from the phase-inverter 64. The multiplexer 62 at a first of its inputs and a polarity-inverter 66 receive the AUX2 signal from the luma recording processor 12, and the multiplexer 62 receives the AUX1 signal in opposite-polarity at a second of its inputs from the phase-inverter 66.

The recording or transmitter electronics as shown in FIGS. 1 and 2 are suited for realization largely in the analog regime. The luma recording processor 12 employs digital filtering and must include an analog-to-digital converter for its input signal as supplied by a luma/chroma separator 4 performing luma/chroma filtering, preferably with comb filtering, in the analog domain. The chroma processor 6 also employs digital filtering and must include an analog-to-digital converter for its input signal. Many of the mixing procedures done with modulators in the analog regime are carried out linearly, in balanced form, quite readily in the digital regime using digital four-quadrant multipliers. Accordingly, the color-under recording or transmitter electronics can be constructed using digital circuitry to a greater extent.

Figure 3:
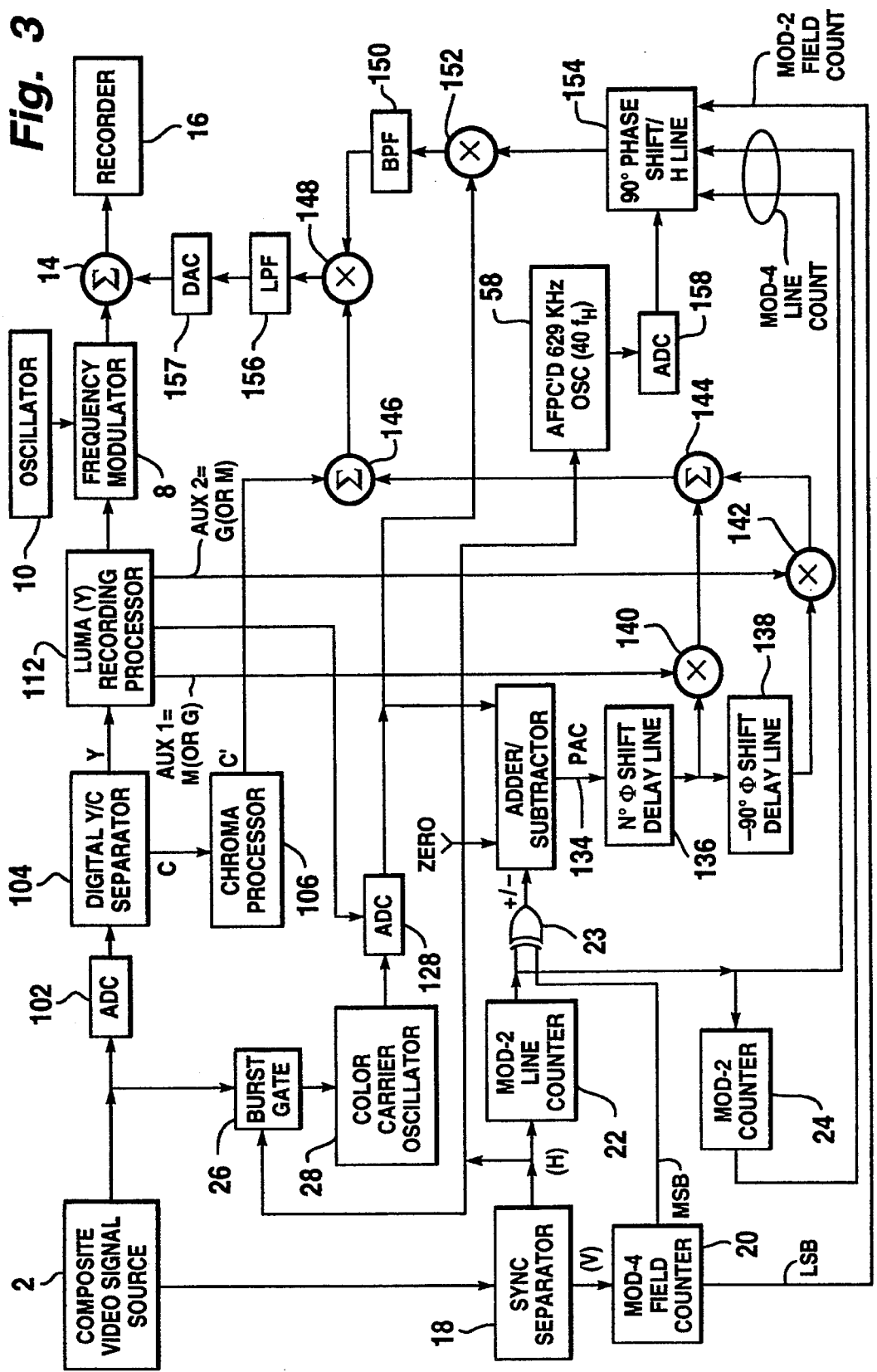
FIGS. 3 and 4 are block diagrams of color-under recording or transmission electronics that are variants of those shown in FIGS. 1 and 2, respectively, which employ digital electronics in their construction in accordance with an aspect of the invention.

FIG. 3 shows a modification of the FIG. 1 recording or transmitter electronics that uses digital circuitry to a greater extent. The analog composite video signal from the source 2 is digitized by an analog-to-digital converter 102 for application to a digital luma/chroma separator 104. The digital luma/chroma separator 104 supplies digital separated chrominance signal to a chroma processor 106 that includes a digital filter for removing from the resulting digitized separated chroma the components falling into the Fukinuki hole that are likely to cause cross-color problems, but does not include an analog-to-digital converter for the chroma signal supplied to that digital filter or a digital-to-analog converter for converting the filter response C' to analog form. The digital luma/chroma separator 104 supplies digital separated luminance signal to a luma recording processor 112 that does not include an analog-to-digital converter for that luma signal. Nor does the luma recording processor 112 include digital-to-analog converters for the M and G signals it supplies as the AUX1 and AUX2 signals for encoding in the second under signal. The luma recording processor 112, as described in detail in U.S. Pat. No. 5,113,262, includes a clock oscillator locked in frequency and phase to the 640th harmonic of the horizontal scan line frequency. This 10 MHz clock oscillator times the sampling of the analog composite video signal from the source 2 by the analog-to-digital converter 102 when digitizing that composite video signal.

The burst gate 26 receives analog input signal from composite video signal as supplied by the source 2, at a point before the digitization of that signal by the analog-to-digital converter 102, since it is generally simpler to realize the local color carrier oscillator 28 in the analog regime as an crystal oscillator with analog AFPC circuitry. The 10 MHz clock oscillator in the luma recording processor 112 can time the sampling of the 3.58 MHz color subcarrier from the oscillator 28 by an analog-to-digital converter 128 when digitizing that color subcarrier.

The analog-to-digital converter 128 supplies a sampled-data digital description of a continuous 3.58 MHz carrier wave in two's complement form to a digital adder/subtractor 132 operated as a selective complementor. Adder/subtractor 132 selectively adds the digitized 3.58 MHz carrier wave to arithmetic zero or subtracts it from arithmetic zero as controlled by the exclusive-OR gate 23 response applied to the add/subtract control input of the digital adder/subtractor, and supplies the resulting digital PAC to the bus 134. Generally considered, the adder/subtractor 132 performs in the digital regime the same function as the phase shifter 30 and multiplexer 32 perform in the FIG. 1 electronics.

The digital PAC from the adder/subtractor 132 is phase shifted N degrees by a clocked delay line 136, to supply carrier signal to a four-quadrant digital multiplier 140. The digital PAC is further phase shifted another 90° by another clocked delay line 138 and subtracted from zero in a subtractor 139, to supply carrier signal to to a four-quadrant digital multiplier 142. Alternatively, the carrier signals for the multipliers 140 and 142 could be supplied from read-only memories as will be described further on in this specification, with reference to FIG. 4.

Generally considered, the four-quadrant digital multipliers 140, 142, 148 and 152 in the FIG. 3 electronics correspond in function with the modulators 40, 42, 48 and 52 in the FIG. 1 electronics. Digital adders 144 and 146 in the FIG. 3 electronics correspond in function with the adders 44 and 46 in the FIG. 1 electronics, which can be considered to be analog adders. Digital filters 150 and 156 in the FIG. 3 electronics correspond in function with the filters 50 and 56 in the FIG. 1 electronics, which can be considered to be analog filters. One acquainted with digital design will understand that there are compensating digital delays in various connections to compensate for latent delays in the digital elements 140, 142, 144, 146, 148, 150, 152 and 156.

The 629 kHz carrier applied to the four-quadrant digital multiplier 152 must be digitized. This could be done with an analog-to-converter located after the 90°-phase-shift-per-horizontal-scan-line shifter 54 as shown in FIG. 1, but is shown in FIG. 3 as being done with an analog-to-converter 158 digitizing the oscillations from the AFPC'd 629 kHz oscillator 58 for application to a 90°-phase-shift-per-horizontal-scan-line shifter 154 that replaces the phase shifter 54. The 90°-phase-shift-per-horizontal-scan-line shifter 154 can comprise a tapped clocked delay line with taps at 0°, 90°, 180° and 270°; a multiplexer for selecting shifter output signal responsive to digitized 629 kHz from one of the four taps: and logic circuitry for controlling the multiplexer. Alternatively, where the oscillator 58 is of the type generating a digitized 629 kHz serrasoid supplied as read addressing to a read-only memory storing a sinusoid look-up-table, the 90° phase shift per horizontal scan line can be arranged for by selectively adding offsets to the digitized 629 kHz serrasoid. In still other arrangements the 629 kHz carrier applied to the four-quadrant digital multiplier 152 may be a square wave, rather than a sinusoid.

The 629 KHz sidebands supplied to the analog adder 14 to be linearly combined with the analog frequency-modulated luminance carrier supplied from the frequency modulator 8, thus implementing a frequency-multiplexing procedure, have to be in analog form. A digital-to-analog converter 157 converts the composite color-under signals from the LPF 156 to analog form.

Figure 4:
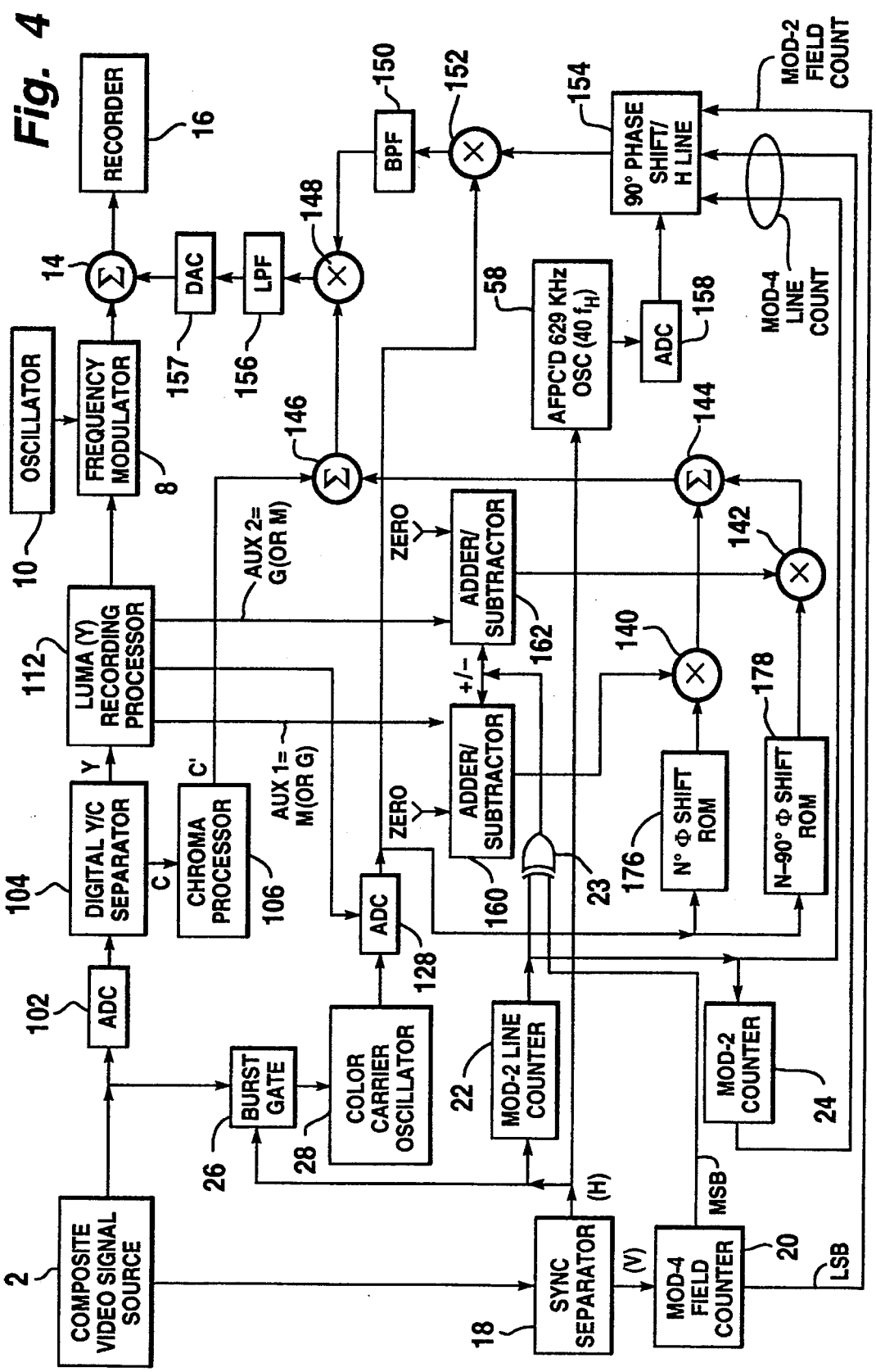

FIG. 4 shows a modification of the FIG. 2 recording or transmitter electronics that uses digital circuitry to a greater extent. The FIG. 4 electronics uses a number of elements that correspond to those in FIG. 3 and are identified by the same numbers. The luma recording processor 112 supplies sampled-data digital descriptions of M and G signals, as different ones of the signals AUX1 and AUX2.

The signals AUX1 and AUX2 are supplied to digital adder/subtractors 160 and 162, respectively, each operated as a selective complementor. The adder/subtractor 160 selectively adds the digital AUX1 signal to arithmetic zero or subtracts it from arithmetic zero as controlled by counter 22 output applied to the add/subtract control input of the digital adder/subtractor 160, and supplies the result to the four-quadrant digital multiplier 140. The adder/subtractor 160 selectively adds the digital AUX1 signal to arithmetic zero or subtracts it from arithmetic zero as controlled by counter 22 output applied to the add/subtract control input of the digital adder/subtractor 160, and supplies the result to the four-quadrant digital multiplier 140. Generally considered, the adder/subtractors 160 and 162 perform in the digital regime the same function as the multiplexers 60 and 62 and the inverting amplifiers 64 and 66 perform in the FIG. 2 electronics.

The digitized 3.58 MHz color carrier from the analog-to-digital converter 128 is supplied as read addresses to read-only memories 176 and 178. The ROM 176 supplies N° phase-shifted response as carrier signal to the four-quadrant digital multiplier 140. The ROM 178 supplies (N −90)° phase-shifted response as carrier signal to the four-quadrant digital multiplier 142.

In a modification of the FIG. 4 electronics, the ROMs 176 and 178 are dispensed with, and the carrier signals for the multipliers 140 and 142 are generated using elements similar to those shown in the FIG. 3 electronics. The phase of the digitized 3.58 MHz color carrier from the analog-to-digital converter 128 is shifted N degrees by clocked delay line 136, to supply carrier signal to the four-quadrant digital multiplier 140. The phase of the digitized 3.58 MHz color carrier is further shifted another 90° by clocked delay line 138 and subtracted from zero in subtractor 139, to supply carrier signal to to a four-quadrant digital multiplier 142.

Those skilled in this art will appreciate that the processing of the phase-alternating carrier (PAC) to be modulated with the M and G auxiliary signals is analogous to the modulation of 33° and 123° phases of a color subcarrier with I and Q chroma components respectively to generate the chroma signal. Thus, the modulated auxiliary signals of the present invention are in quadrature with each other, analogous to the I and Q signals of the conventional chroma signal which also are in quadrature with each other.

Figures 5, 6:
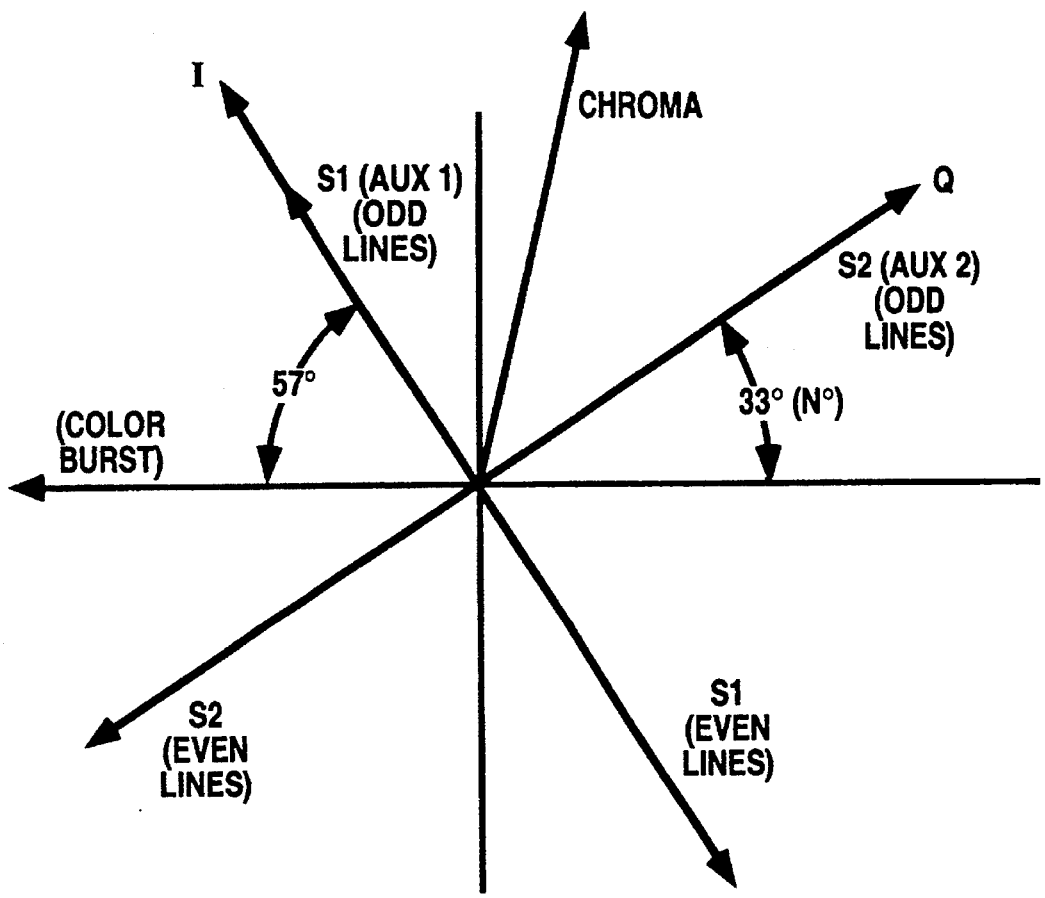

The operation of the system of FIG. 1 will be further explained in conjunction with the vector diagrams of FIG. 5 showing possible relative positions of the I and Q vectors and of the vectors of the auxiliary signals AUX1 and AUX2. The number N of degrees provided by the phase shifter 32 is selected such that the phase angles of the signals AUX1 and AUX2 respectively supplied from the modulators 40 and 42, as correspond to respective ones of the M and G vectors, are the same as the phase angles of the I and Q signals, respectively. As mentioned above, N can be any desired value. The diagram would have to be more complex to illustrate the other possible values of N; provision of such additional diagram(s) is not considered necessary for an understanding of the operation of the system by one skilled in this art.

FIG. 5 shows that the position of the I and Q vectors remain constant relative to the chroma burst vector, but nevertheless it should be understood that the chroma burst vector exhibits staggered spatial phasing from line to line. However, because the PACs carrying the auxiliary signals AUX1 and AUX2 alternate phasing line-to-line respective to the color subcarrier, the auxiliary signals AUX1 and AUX2 are in-phase with the I and Q signal on odd lines, and out-of-phase on even lines, as shown in FIG. 5.

FIG. 6 of the drawing is a Table I tabulating the temporal phase values of the NTSC color subcarrier and of the phase-alternating carrier of like frequency disclosed in this specification. In conventional operation, according to the specifications of the NTSC, the 3.58 MHz color subcarrier is not phase-alternating, which is to say its temporal phase is continuous from line to line. However, the 3.58 MHz color subcarrier has an odd number of half cycles per scan line, causing it to start with an additional 180° offset on each successive line being scanned. This offset is sometimes thought of as staggered spatial phasing of chroma from line to line. At the start of the first and second field on lines 1 and 263 respectively of video frame one, the temporal phase of the color subcarrier is at 0°. At the start of the first and second field of frame two, however, the temporal phase of the color subcarrier is at −180°. The temporal phase of the PAC, moreover, it should be understood, is at 0° at the start of each field of frames 1 and 2. There is no staggered spatial phasing of PAC information from line to line.

FIG. 7 of the drawing is a Table II that tabulates the temporal phases not only of the 3.58 MHz color subcarrier and of the 3.58 MHz phase-alternating carrier (PAC), but also the temporal phases of those signals as respectively remodulated to 629 kHz as well. An analysis of the phase progression of the color-under carrier at 629 KHz depends on an understanding of the VHS standards which specify the phase angle of 629 KHz carrier to be incrementally retarded by 90° per horizontal scan line for field 1, and then reversing the process, to be incrementally advanced by 90° per horizontal scan line for field 2. As indicated in Table II, the PAC under carrier is in-phase with the chroma color-under carrier on odd lines, and 180° out-of-phase on the even lines for the frame 1. This is due to the constrained alternation of the PAC carrier phase as described above. Table II indicates that on any two given adjacent lines in a frame, the two 629 KHz carriers are always 180° out-of-phase on one line, and in-phase on the other line. The relative position of the I and Q vectors and the auxiliary signal vectors AUX1 and AUX2 remains the same for the color-under mode as shown in FIG. 5. It should be understood that Table II refers to the carriers without modulation.

In practice, from the standpoint of simplest and cheapest recording and playback electronics, it is preferable that the phase shifter 36 in the FIG. 1 or FIG. 2 record electronics be replaced by direct connection, which rotates the PAC vectors so they fall on the in-phase and quadrature-phase axes. Since the color subcarrier oscillator 16 is frequency- and phase-locked in quadrature with the color burst signal at 180° phasing, the oscillator 16 generates a 3.58 MHz continuous wave carrier at 90° phasing. When the phase shifter 36 is replaced by direct connection, the modulator 40 receives the 3.58 MHz continuous wave carrier at 90° phasing during a first set of alternate scan lines and receives the 3.58 MHz continuous wave carrier at 270° phasing during a second set of alternate scan lines time-interleaved with the first set. When the phase shifter 36 is replaced by direct connection, the phase shifter 38 supplies the modulator 42 with 3.58 MHz continuous wave carrier at 0° phasing during the first set of alternate scan lines and with 3.58 MHz continuous wave carrier at 180° phasing during the second set of alternate scan lines. In the FIG. 3 record electronics the PAC from the adder/subtractor 132 can be applied directly to the multiplier 140 as carrier signal and directly to the clocked delay line 138 as input signal, dispensing with the clocked delay line 136 in a measure analogous to replacing the phase shifter 36 by direct connection in the FIG. 1 record electronics. In the FIG. 4 record electronics the digitized color subcarrier from the analog-to-digital converter can be applied directly to the multiplier 140 as carrier signal and directly to the ROM 178 as read addressing, dispensing with the ROM 176 in a measure analogous to replacing the phase shifter 36 by direct connection in the FIG. 2 record electronics. When the phase shifter 36 is replaced by direct connection in the FIGS. 1 or 2 record electronics, or analogous measures are taken in the FIGS. 3 or 4 record electronics, a corresponding phase shifter 136 in the playback electronics now to be described with reference to FIG. 8 is also replaced by direct connection.

Figure 8:
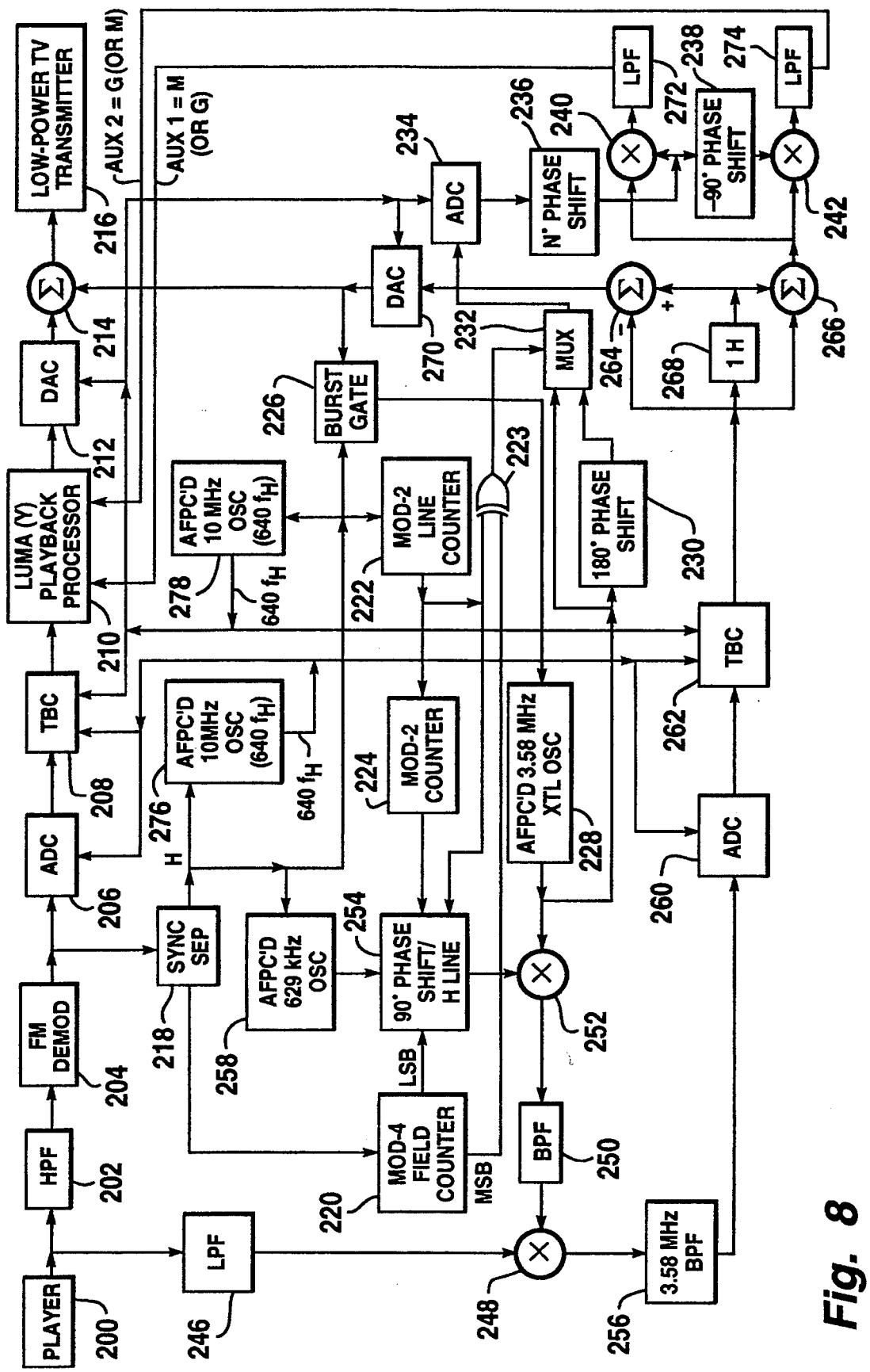
FIG. 8 is a block diagram showing color-under playback or receiver electronics constructed in accordance with an aspect of the invention and provided with circuitry for separating the color-under signal and second under signal components from a complex under signal that is retrieved from a video tape recording or received from a transmitter.

FIG. 8 shows a block diagram of the decoder or playback system as may be used to implement the invention. The FM luminance carrier and the 629 KHz carriers modulated with the chroma and the M and G auxiliary signals are supplied as a playback signal from a video tape player 200. A highpass filter 202 separates the FM luma signal from the playback signal for application to an FM detector 204, usually of a pulse-counting type. The FM detector 204 supplies folded-luminance signal to an analog-to-digital converter 206 for digitization. The digitized folded-luminance signal is supplied to a time-base corrector 208, which supplies time-base corrected, digitized folded-luminance signal to luminance playback processing circuitry 210. The luminance playback processing circuitry 210 is generally of the type described U.S. Pat. No. 5,113,262, but more specifically considered is modified so that the reemphasis of the upper frequencies of the luma signal is carried out responsive to the G auxiliary signal retrieved during playback as described in detail in U.S. patent application Ser.No. 08/008, 813 filed 25 Jan. 1993 by C. H. Strolle et alii and entitled ADAPTIVE DEEMPHASIS AND REEMPHASIS OF HIGH FREQUENCIES IN VIDEO TAPE RECORDING, UTILIZING A RECORDED CONTROL SIGNAL. U.S. patent application Ser.No. 08/008,813 is a continuation-in-part of a similarly titled, now abandoned U.S. patent application serial No. 07/604,494 filed 26 Oct. 1990 by C. H. Strolle et alii. The digital full-spectrum luminance signal from the luminance playback processing circuitry 210 is converted back to analog form by a digital-to-analog converter 212. The resulting analog full-spectrum luminance signal is supplied to an analog adder 214, there to be combined with chrominance signal to form a composite video signal. This composite video signal is supplied to a low-power TV transmitter 216 of a type suitable for furnishing low-power television signals to a TV receiver.

A sync separator 218 separates vertical synchronizing pulses in the folded-luminance signal supplied from the FM detector 204 to supply V signal to a modulo-four field counter 220 and separates vertical synchronizing pulses in that folded-luminance signal to supply an H signal to a modulo-two line counter 222. The modulo-two line count from the counter stage 222 is supplied to a further modulo-two counter stage 224 that together with the counter stage 222 generates a modulo-four line count. A modulo-two field count, which is supplied as one of the bits of output signal from the modulo-four field counter 220, is used to control head-switching in the video cassette player 200, just as in conventional VHS recording.

A lowpass filter 246 separates the 629 KHz color-under sidebands and auxiliary-signal-under sidebands from the playback signal for application to a modulator 248, there to be heterodyned with a selectively phase-shifted 4.21 MHz carrier selected to the modulator 248 by a bandpass filter 250. The augmented color-under carrier is upconverted with a bandpass filter 256 selecting the resulting sidebands of 3.58 MHz suppressed carrier to an analog-to-digital converter 260 for digitization. The digitized augmented chrominance signal is supplied from the converter 260 to a time-base corrector 262.

Separated horizontal synchronizing pulses supplied by the sync separator 218 are used in the automatic frequency and phase control (AFPC) of an oscillator 258 supplying 629 KHz ($=40f_h$) sinusoidal carrier to a phase shifter 254. A modulo-two field count from the field counter 220 is used together with the modulo-four line count supplied by the counter stages 222 and 224 to determine which of 0°–, 90°–, 180°–and 270°– phase responses to the 629 KHz from the oscillator 258 is applied to the modulator 252 during successive scan lines.

Since the phase shifter 254 also receives 629 KHz sinusoidal CW carrier from the oscillator 258, which is under control of the horizontal sync pulses H separated from the digital composite video signal by the sync separator 218, the selectively phase-shifted 629 KHz carrier supplied from the phase shifter 254 to the modulator 252 is accordingly line-locked to the folded-luminance signal. The modulator 252 heterodynes the selectively phase-shifted 629 KHz carrier with 3.58 MHz sinusoidal CW carrier from a color subcarrier oscillator 228 to generate selectively phase-shifted carriers at 2.95 MHz and 4.21 MHz. The bandpass filter 250 selects selectively phase-shifted 4.21 MHz carrier for application to the modulator 248.

The time-base corrected composite chrominance signal from the time-base corrector 262 is applied to the subtrahend (−) input of a subtractor 264, to one input of an adder 266, and to the input of a 1H clocked delay line 268. The delayed response of 1H delay line 268 provides the minuend input of the subtractor 264 and a further input of the adder 266.

The subtractor 264 and the 1H delay line 268 combine to provide a bandpass line-comb filter that removes M and G auxiliary signal information from the chroma signal supplied as difference output signal from the subtractor 264. This separated chroma signal is supplied to a digital-to-analog converter 270. Converter 270 supplies analog separated chroma signal to the analog adder 214 to be combined with the analog full-spectrum luminance signal to regenerate composite video signal for application to the low-power TV transmitter 216. In video cassette players that are combined with a TV receiver in apparatus known as a "TV/VCR combo", the analog full-spectrum luminance signal from digital-to-analog converter 212 will be supplied directly to the color matrixing circuitry of the TV receiver; and the analog chrominance signal from digital-to-analog converter 270 will be supplied to suitable color demodulator circuitry to obtain color difference signals also to be supplied to the color matrixing circuitry of the TV receiver. Suitable color demodulation apparatus for a TV/VCR combo is described in U.S. Pat. No. 5,083,197 issued 21 Jan. 1992 to J. W. Ko and C. B. Patel and entitled APPARATUS FOR RESTOR-ING THE CORRECT PHASE RELATION OF THE CHROMA AND LUMINANCE SIGNALS PASSED THROUGH SEPARATE PATHS.

The digital-to-analog converter 270 also supplies analog separated chroma signal to a burst gate 226. The burst gate 226 responds to horizontal synchronizing pulses separated by the sync separator 218, to selectively apply to the automatic frequency- and phase-control circuitry of the local color subcarrier oscillator 228 the color bursts occurring a short time after each such horizontal sync pulse. The oscillator 228 is a crystal-controlled oscillator, so its AFPC is primarily used for controlling the phase of the 3.58 MHz sinusoidal CW carrier it generates, for locking that phase in quadrature with the separated color burst supplied from the burst gate 226.

The 90° 3.58 MHz carrier from the oscillator 228 is supplied to a 180° phase shift circuit 230 to generate a 270° 3.58 MHz carrier. An exclusive-OR gate 223 responds to the frame-identifying more significant bit of the count from the modulo-four field counter 220 and the output of the modulo-two line counter 222, to generate an output signal for controlling a multiplexer 232. This signal alternates between logic ZERO and logic ONE on consecutve horizontal scan lines within a field. The multiplexer 232 responds to select alternately the color subcarrier at 90° and 270° as respectively provided by the oscillator 228 and the 180° phase shift circuit 230, thereby to provide a phase-alternating carrier (PAC) to a bus 234. A phase-shifter 236 phase shifts the PAC by N degrees relative to the phase of the PAC on the line 234, N being the arbitrarily prescribed number determining the phase shift in degrees afforded by the phase-shifter 236 during recording. The PAC supplied from the phase shifter 236 is further phase shifted by −90° (i.e. advanced 900 in phase) by a phase shifter 238. The elements 230, 232, 234, 236 and 238 used for playback are similar to the elements 30, 32, 34, 36 and 38 used for recording, and the possible design variations are the same for both sets of elements.

The adder 266 and the 1H delay line 268 combine to provide a lowpass line-comb filter that removes chroma-related information from the M and G auxiliary signal information supplied as sum output signal from the adder 266. The complex amplitude modulation of the 3.58 MHz color subcarrier just by auxiliary signals, AUX1 and AUX2, is recovered at the output of adder 266. Modulators 240 and 242 synchronously detect the complex amplitude modulation sidebands comprising the adder 266 output signal in accordance with the PACs respectively provided modulators 240 and 242 from the phase-shifter 236 (or, in the case of N being zero degrees, directly from the analog-to-digital converter 234) and from the phase shifter 238. A lowpass filter 272 responds to the modulator 240 output signal, suppressing the image sidebands flanking the second harmonic of color subcarrier in its response, to regenerate the AUX1 signal supplied to the modulator 40 during recording. A lowpass filter 274 responds to the modulator 242 output signal, suppressing the image sidebands flanking the second harmonic of color subcarrier in its response, to regenerate the AUX2 signal supplied to the modulator 42 during recording. The regenerated AUX1 and AUX2 signals are supplied to the luma playback processor 210 as respective ones of the M and G signals that processor uses in unfolding the folded-spectrum signal and reemphasizing the unfolded upper luma frequencies to regenerate the luminance signal component of the composite video signal originally supplied for recording.

The modulo-four line count provided by the counter stages 222 and 224 is reset to prescribed value by an edge of each separated vertical synchronizing pulse supplied from the sync separator 218. So, synchronizing the frame count from the counter 220 with the frame count from the counter 20 will synchronize the phasing of the PAC signal generated for application to the bus 234 during playback with the PAC signal generated for application to the bus 34 during recording. However, in order for this to be done, information concerning the frame count from the counter 20 must be included in the signal recorded on the video tape and recovered during playback to synchronize the frame count from .the counter 220. Since the M and G signals that are recorded are each always of one polarity, incorrect frame synchronization of the count supplied from the counter 220 will be evidenced within no more than a field time by reversals of each of the M and G signals from its proper polarity. This observation is used in one method for correcting the count stored in the counter 220, in which method the reversal of either of the M and G signals from its proper polarity is detected and used to initiate procedures that lower the count by one. Alternatively, information concerning the frame count from the counter 20 can be encoded in the vertical retrace interval of the signal recorded on the video tape, recovered from the signal played back from the video tape and then used to synchronize the counter 220.

The horizontal synchronizing pulses separated by the sync separator 218 are used in the automatic frequency and phase control (AFPC) of an oscillator 276 generating clocking signals for the analog-to-digital converters 206 and 260 and for the writing of digital memories respectively included in the time-base correctors 208 and 262. The oscillator 276 has a relatively short time constant AFPC, so as to generate "nervous" clocking signals that closely track any variations in the time-base of played back signals. The oscillator 276 generates oscillations of a frequency well above Nyquist rate for the full-spectrum luminance signal. These oscillations are counted in the oscillator 276 AFPC circuitry, for furnishing write addresses to random-access memories in the time-base correctors 208 and 262. The counting of the oscillations is also done to implement a frequency division procedure that generates a feedback signal at a frequency close to horizontal scan rate, which feedback signal is compared in the oscillator 276 AFPC circuitry to the horizontal synchronizing pulses separated by the sync separator 218 in order to generate an error signal for locking the oscillator 276 oscillations to a high harmonic of line frequency.

Rather than using the separate 629 KHz oscillator 258 shown in FIG. 8, a 629 KHz square wave can be taken from the counter circuitry of the oscillator 276 for application to the phase shifter 254. This square wave, which alternates between zero and one, has a DC pedestal of one-half. The complement of the phase-shifted square wave from the phase shifter 254 can be used as a sign bit associated with a magnitude bit that is invariably ONE, thereby to generate in two's complement arithmetic a phase-shifted square wave with zero DC pedestal.

The horizontal synchronizing pulses separated by the sync separator 218 are also used in the automatic frequency and phase control (AFPC) of an oscillator 278. Oscillations from the oscillator 278 time clocking signals for sample-and-hold circuits in the digital-to-analog converters 212 and 270. The oscillator 278 oscillations are counted in its AFPC circuitry, for furnishing read addresses to random-access memories in the time-base correctors 208 and 262. The counting of the oscillator 278 oscillations is also done to implement a frequency division procedure that generates a feedback signal at a frequency close to horizontal scan rate, which feedback signal is compared in the oscillator 278 AFPC circuitry to the horizontal synchronizing pulses separated by the sync separator 218 in order to generate an error signal for locking the oscillator 278 oscillations to the same high harmonic of line frequency that the oscillator 276 is. The oscillator 278 has a relatively long time constant AFPC, however, so as to generate stable clocking signals that track long-time-average variations in the time-base of played back signals.

The operation of the time-base correctors 208, 262 and of the AFPC'd oscillators 276 and 278 is explained in greater detail in U.S. patent application Ser. No. 07/839,542 filed 24 Feb. 1992 by Jung Wan Ko et alii, entitled TIME-BASE CORRECTION IN A VIDEO RECORDING PLAYBACK SYSTEM and assigned to Samsung Electronics Co., Ltd. The derivation of 629 kHz carrier from the AFPC'd oscillator 276 is explained in greater detail in U.S. patent application Ser. No. 07/861,580 filed 24 Feb. 1992 by Jung Wan Ko et alii, entitled NERVOUS CLOCK SIGNAL GENERATOR FOR VIDEO RECORDER and assigned to Samsung Electronics Co., Ltd.

The recorder 16 of FIG. 1 or 2 and the player 200 of FIG. 8 often are combined so as to use one tape transport. In less expensive VCRs, in which the capability of playback during recording is sacrificed, the elements 18, 20, 22, 23, 24, 26, 28, 30, 32, 34, 36, 38, 50, 52, 54 and 58 of FIG. 1 can, through appropriate switching, be utilized as the elements 218, 220, 222, 223, 224, 226, 228, 230, 232, 234, 236, 238, 250, 252, 254 and 258, respectively, of FIG. 8.

In VCRs which employ very low tape speeds time-base stability is sometimes poor enough to impair separation of the PAC modulation sidebands from the chrominance sidebands by line-comb filtering when both sets of sidebands have the same suppressed-carrier frequency. Phase modulation of each set of sidebands will undesirably result in crosstalk of that set of sidebands into the other set, so the two sets of sidebands can no longer be completely separated from each other using line-comb filtering. The crosstalk into the chrominance signal is concealed in the television picture recreated from that chrominance signal, much as cross-luminance is in a television receiver receiving broadcast TV signals, and does not present a problem of much significance. The cross-chrominance crosstalk into the upconverted second under signal is a noticeable problem in a video recording system, such as that described in U.S. Pat. No. 5,113,262, where folded-spectrum luminance signal retrieved during playback from a video tape is adaptively filtered during its unfolding responsive to a motion signal M synchronously detected from the upconverted second under signal. Choosing a PAC carrier frequency that is a lower multiple of half horizontal scan line frequency has been found to improve separation of the PAC modulation sidebands from the chrominance sidebands by line-comb filtering, as described generally in U.S. patent application Ser. No. 07/787,690 filed 4 Nov. 1991 by the inventors hereof and others and entitled "SYSTEM FOR RECORDING AND REPRODUCING A WIDE BANDWIDTH VIDEO SIGNAL VIA A NARROW BANDWIDTH MEDIUM".

Figure 9:
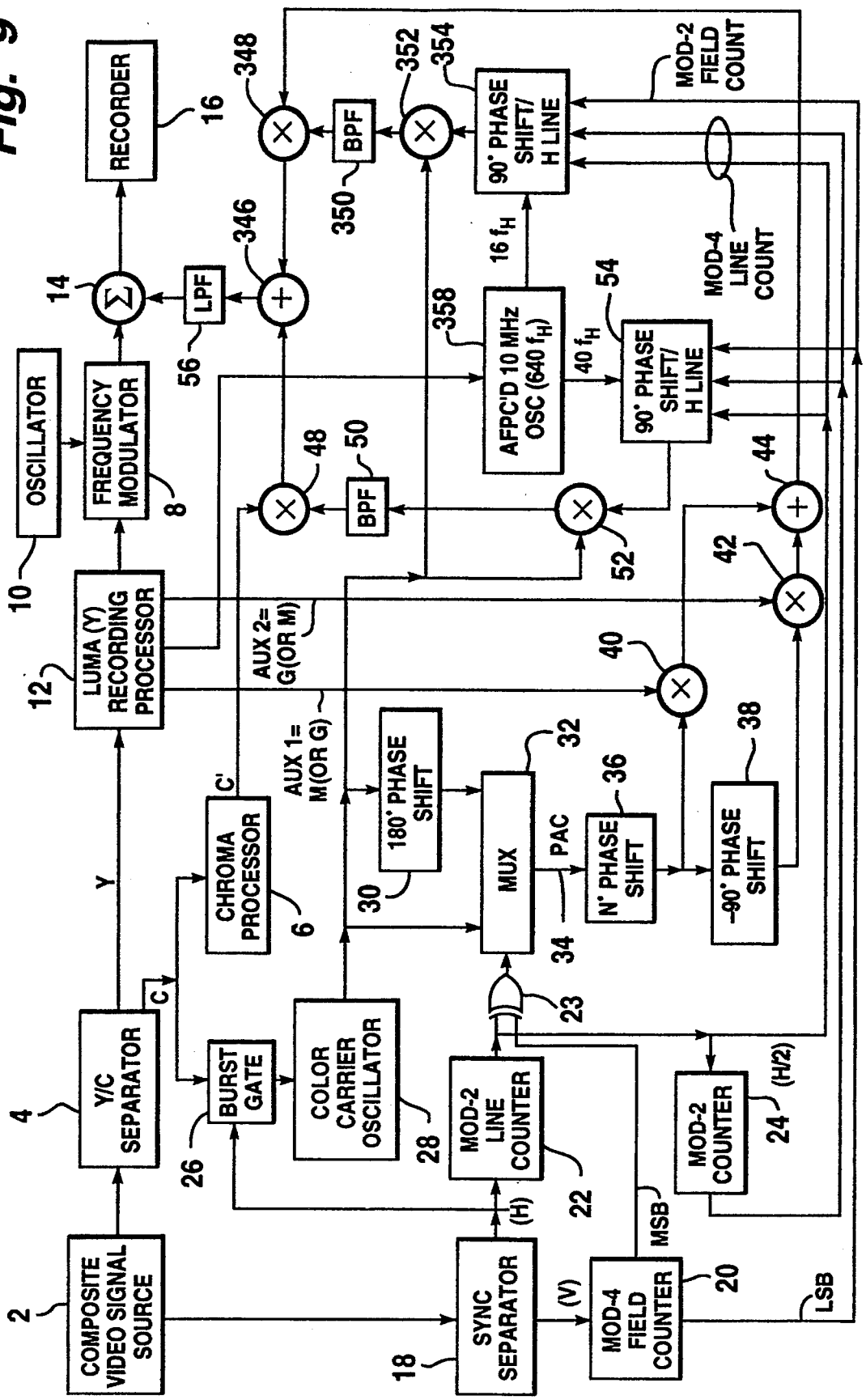
FIG. 9 is a block diagram showing a modification that can be made to the FIG. 1 or FIG. 2 recording or transmitter electronics when the second under signal is to have a different frequency than the color-under signal.

FIG. 9 shows a modification that can be made to the FIG. 1 or FIG. 2 recording electronics that provides for generation of the second under signal at sixteen times horizontal scan line frequency, or about 251.6 kHz. The AFPC'd 629 kHz ($=40f_h$) oscillator 58 is replaced by an AFPC'd 10 MHz ($=640f_h$) oscillator 358, which supplies its 10 MHz output signal to the luma recording processor 12 to clock the digitization of the luminance signal Y therein. The oscillator 358 includes counter circuitry dividing its 10 MHz output signal by 640 to develop 15.725 kHz signals for synchronously detecting the separated horizontal synchronizing pulses H from the sync separator 18, so as to generate error signal for its AFPC. From a point in this counter circuitry, the oscillator 358 supplies 629 kHz (=40$f_h$) square waves to the phase shifter 54, and from another point in this counter circuitry, the oscillator 358 supplies 252 kHz (=16$f_h$) square waves to a 90°-phase-shift-per- horizontal-scan-line shifter 354.

In the FIG. 9 recording electronics, as in the recording electronics of FIG. 1 or FIG. 2, the 90°-phase-shift-per-horizontal-scan-line shifter 54 supplies 629 kHz signal in a selected one of four phases to a modulator 52 to be heterodyned with 3.58 MHz color carrier from the color carrier oscillator 28 to generate a 4.21 MHz carrier selected by the bandpass filter 50. The adder 46 is not used in the FIG. 9 recording electronics. Only the processed chrominance sidebands C' from the chroma processor 6 are heterodyned with the 4.21 MHz carrier in the modulator 48 to generate a color-under signal supplied to an adder 346 for being linearly combined with a second under signal in a frequency-multiplexing procedure that generates a composite under signal for application to the low-pass filter 56. As in the recording electronics of FIG. 1 or FIG. 2, the response of filter 56 to the composite under signal is supplied to the adder 14 to have the FM luma signal frequency-multiplexed therewith for generating a video signal for recording by the recorder 16.

In the FIG. 9 recording electronics the 90°-phase-shift-per-horizontal-scan-line shifter 354 supplies 252 kHz signal in a selected one of four phases to a modulator 352 to be heterodyned with 3.58 MHz color carrier from the color carrier oscillator 28 to generate a 3.83 MHz carrier selected by the bandpass filter 350 for application to a modulator 348. In the modulator 348 the 3.83 MHz carrier is mixed with the QAM 3.58 MHz sidebands of the PAS supplied as sum output signal from the adder 44. The resulting signal includes in a lower band thereof the second under signal supplied to the adder 346 for being linearly combined with color-under signal in the frequency-multiplexing procedure that generates a composite under signal for application to the low-pass filter 56.

The recording electronics of FIG. 1 or of FIG. 2 can be modified by dispensing with the phase shifter 54, applying the 629 kHz carrier from the oscillator 58 directly to the modulator 52, and supplying the modulator 52 with 3.58 MHz carrier from the color carrier oscillator 28, not directly, but rather via a 90°-phase-shift-per-horizontal-scan-line shifter controlled similarly to the phase shifter 54. In such a modification of the FIG. 1 recording electronics, the 90°-phase-shift-per-horizontal-scan-line shifter can comprise a tapped delay line supplying 3.58 MHz in four phases to a multiplexer for selection therefrom, and this same tapped delay line can supply the two opposite-phase 3.58 MHz carriers to the multiplexer 32 for selection to the bus 34. The FIG. 9 recording electronics can be modified by dispensing with the phase shifters 54 and 354, applying the 629 kHz carrier from the oscillator 58 directly to the modulator 52, applying the 252 kHz carrier from the oscillator 358 directly to the modulator 352, and supplying the modulators 52 and 352 with 3.58 MHz carrier from the color carrrier oscillator 28, not directly, but rather via a 90°-phase-shift-per-horizontal-scan-line shifter controlled similarly to the phase shifters 54 and 354.

In another, alternative modification of the FIG. 9 recording electronics, which embodies the invention in one of its aspects, the line by line alternation of 3.58 MHz carrier phase in the suppressed-carrier AM sidebands supplied from the modulators 40 and 42 is dispensed with. The 90°-phase-shift-per-horizontal-scan-line shifter 354 is replaced by another phase shifter that responds to the same control signals with phase shift changes that supplant the line by line alternation of 3.58 MHz carrier phase in the suppressed-carrier AM sidebands supplied from the modulators 40 and 42 and subsequent 90°-phase-shift per horizontal scan line, but supplies the same second under signal to the modulator 352 as the phase shifter 354 does in the FIG. 9 recording electronics.

The embodiments of the invention shown in FIGS. 1–4 and 9 of the drawing first alternate the phasing of the second under carrier from one line to the next, with the resulting PAC being subsequently encoded with one or two auxiliary signals to form the PAS. It will be apparent to those skilled in this art that the process can be reversed. Thus, the carrier may be first encoded with the desired auxiliary signals and subsequently the phasing of the modulated carrier can be alternated from one line to the next. In other regards, though, the process described above will be followed.

Figure 10:
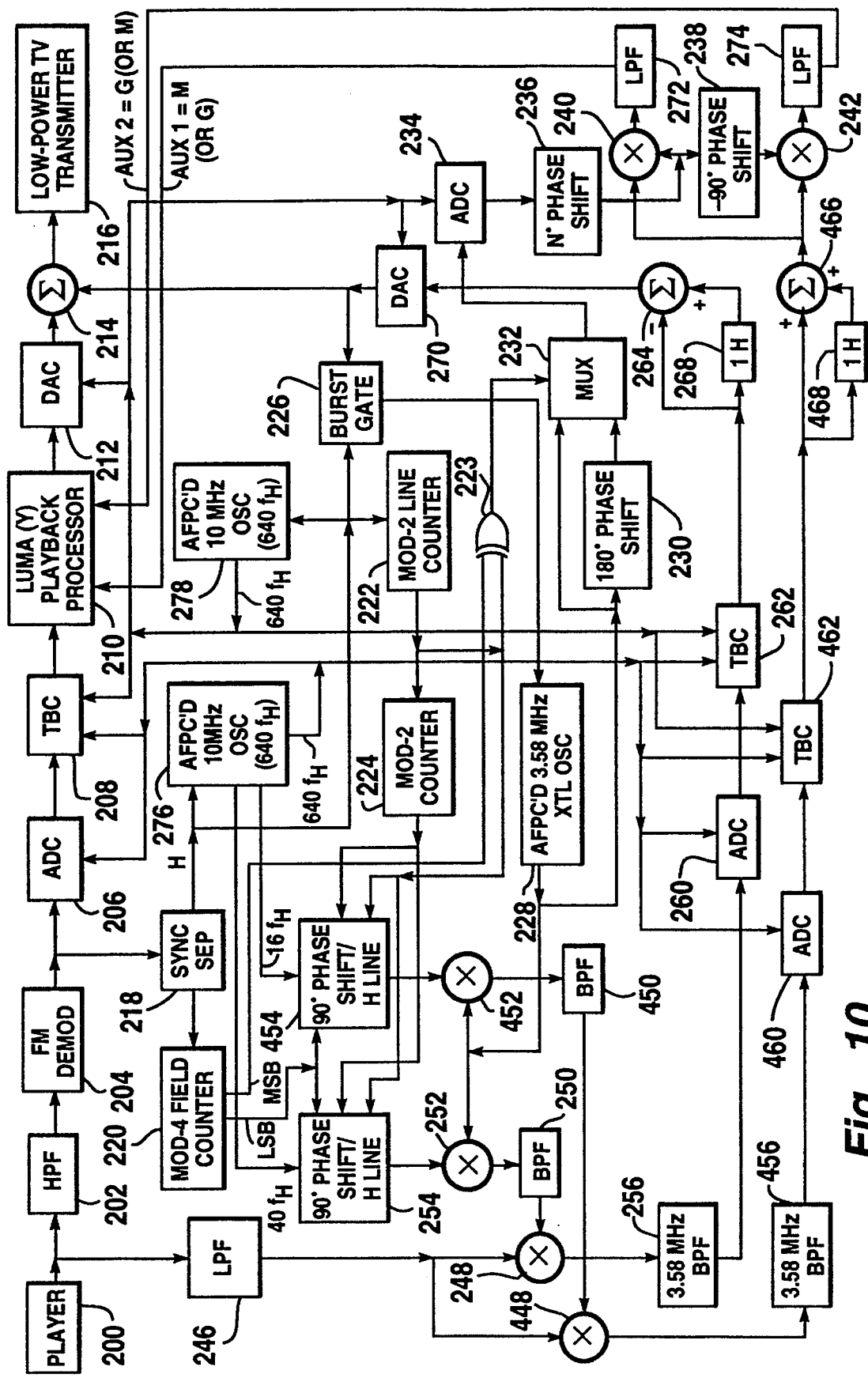
FIG. 10 is a block diagram of color-under playback or receiver electronics constructed in accordance with an aspect of the invention, for use when the second under signal is to have a different frequency than the color-under signal.

Referring to the recording circuitry of any of FIGS. 1–4 and 9 or modifications thereof, the polarity of the FM signal supplied by the frequency modulator 8 has no effect on the polarity of the signal detected by the FM demodulator 204 in the playback circuitry of either of the FIGS. 8 and 10 or modifications thereof. Consequently, the frequency-multiplexing of the folded luminance signals from the luma recording processor 12 with the composite under signal can be carried out using a subtractor rather the adder 14, using the folded luminance signal as subtrahend input signal to the subtractor, without affecting the operation of the system. In the appended claims the term "linearly combining" refers generally to adding and to subtracting.

FIG. 10 playback electronics are a modification of the FIG. 8 playback electronics, suited for recovering the AUX1 and AUX2 signals modulating a 252 kHz second under signal in the video signal recovered during playback of a video tape recorded using the FIG. 1 modified per FIG. 9, the FIG. 2 recording electronics modified per FIG. 9, or other recording electronics generating a similar video signal for recording. Rather than using the separate 629 KHz oscillator 258 shown in FIG. 8, a 629 kHz square wave is taken from the counter circuitry of the oscillator 276 for application to the phase shifter 254. The bandpass line-comb filter comprising the subtractor 264 and the 1H delay line 268 suppresses upconverted second under signal in the response supplied from the subtractor 264, but remnants of the upconverted second under signal no longer overlap the center frequencies of the recovered chrominance signal C. The remnants of the upconverted second under signal are no longer centered in frequency at 3.58 MHz, but are transposed downward 378 kHz in frequency. The adder 266 is not used in the FIG. 10 playback electronics, and the second under signal is recovered by means other than lowpass line-comb filtering of the time-base corrector 262 output signal.

A 252 kHz square wave is taken from the counter circuitry of the oscillator 276 for application to a 90°-phase-shift-per-horizontal-scan-line shifter 454, which provides phase shifts to the 252 kHz square wave that change in accordance with the phase shifts provided to the 629 kHz square wave by the phase shifter 154. The output signal from the phase shifter 454 is supplied to a modulator 452 for mixing with 3.58 Mhz color subcarrier from the oscillator 228 to generate a 3.83 MHz carrier in a selected one of four phases and its image. This 3.83 MHz carrier is selected by a bandpass filter 450 for application to a modulator 448 for heterodyning with the composite under signal response of the lowpass filter 246. A bandpass filter 456 recovers QAM sidebands with 3.58 MHz suppressed carrier, which QAM sidebands encode the AUX1 and AUX2 signals. These QAM sidebands are digitized by an analog-to-digital converter 460, which is clocked by the oscillator 276. The digitized QAM sidebands are supplied to a time-base corrector 462 which includes a random-access memory furnished write and read addresses in parallel with random-access memories in the time-base correctors 208 and 262. The time-base corrector 462 supplies time-base corrected digitized QAM sidebands encoding the AUX1 and AUX2 signals to a lowpass line-comb filter comprising a digital adder 466 for differentially responding to its input signal and to that input signal as delayed for one horizontal scan line interval by a 1H clocked delay line 468. The lowpass line-comb filter suppresses upconverted color-under signal in the response supplied from the subtractor 466 to the modulators 240 and 242. Remnants of upconverted color-under signal in the response supplied from the subtractor 466 are no longer centered in frequency at 3.58 MHz, but are transposed upward 378 kHz in frequency. The modulators 240 and 242 synchronously detect the AUX1 and AUX2 signals respectively from the 252 kHz QAM sidebands supplied from the adder 466. The lowpass filters 272 and 274 used after synchronous detection reject any response to the remnants of upconverted color-under signal.

In a variant of the FIG. 10 playback electronics, 629 kHz and 252 kHz square waves are taken from the counter circuitry of the oscillator 278 for direct application to the modulators 252 and 452, and the phase shifters 254 and 454 are dispensed with. Instead, a 90°-phase-shift-Per-horizontal-scan-line shifter is introduced between the 3.58 MHz oscillator 228 and each of the modulators 252 and 452.

Figure 11:
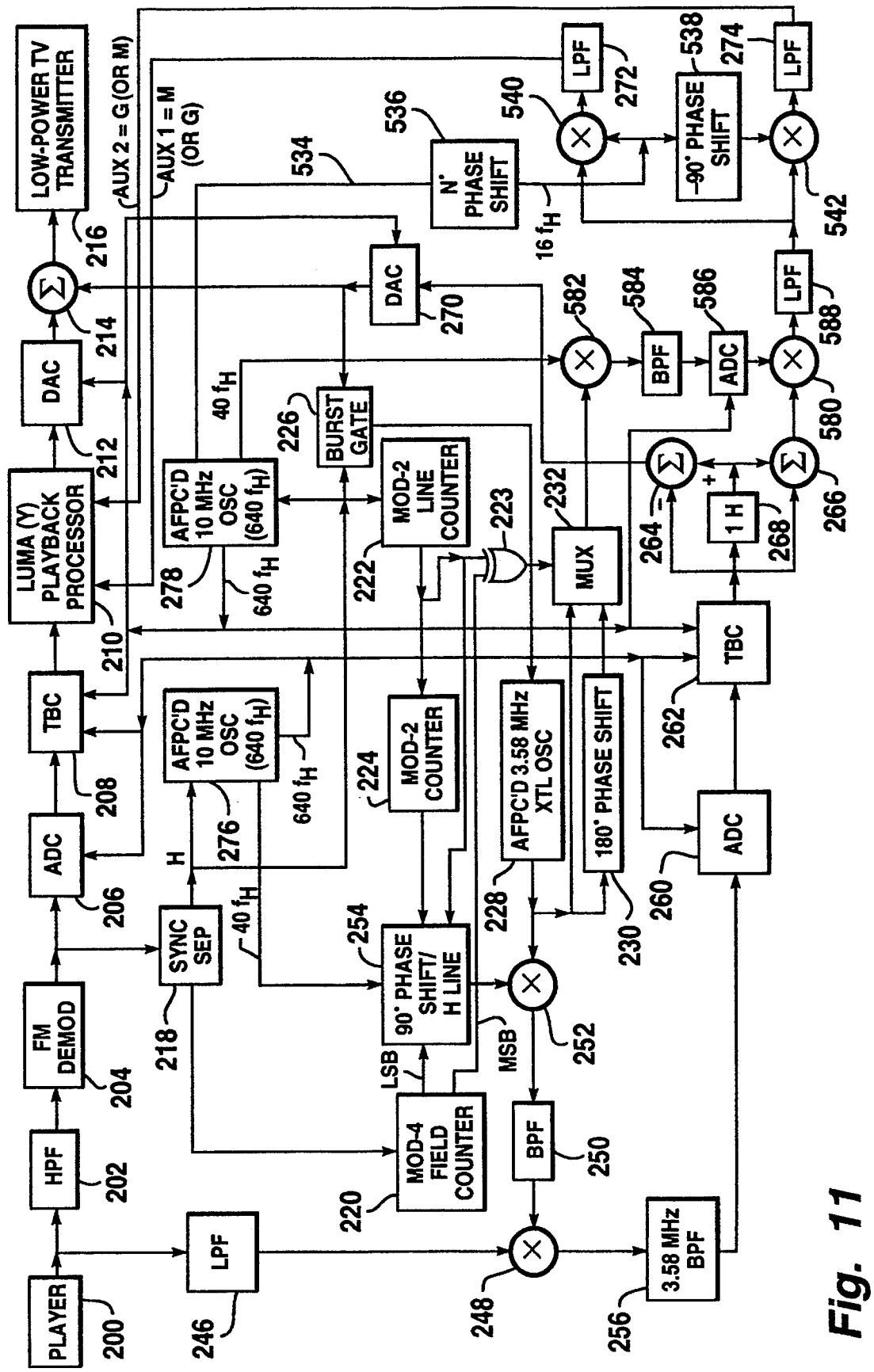
FIG. 11 is a block diagram showing a modification that can be made to the FIG. 8 color-under playback or receiver electronics when the second under signal is to have a different frequency than the color-under signal.

FIG. 11 shows a modification that can be made to the FIG. 8 playback electronics so as to recover the AUX1 and AUX2 signals modulating a 252 kHz second under signal in the video signal recovered during playback of a video tape recorded using the FIG. 1 modified per FIG. 9, the FIG. 2 recording electronics modified per FIG. 9, or other recording electronics generating a similar video signal for recording. The FIG. 8 playback electronics modified per FIG. 11 use the upconverting modulator 248, the bandpass filter 256, the analog-to-digital converter 260, the time-base corrector 262 and the 1H delay line 268 for the upconverted second under signal, as well as for the chrominance sidebands C upconverted from the color-under signal, rather than processing the upconverted second under signal with corresponding additional elements 448, 458, 460, 462 and 468.

The circuitry following the adder 266 is changed in the modification per FIG. 11. The adder 266 supplies its sum output signal to a modulator 580, which comprises a 4-quadrant digital multiplier, to be heterodyned with a stable 4.21 MHz carrier to regenerate the second under signal in time-base corrected form. The stable 4.21 MHz carrier is generated by a modulator 582 mixing 3.58 MHz carrier from the oscillator 228 with a 629 kHz (= 40 $f_H$) square wave extracted from the counter circuitry of the AFPC'd oscillator 278. A bandpass filter 584 separates the stable 4.21 MHz carrier from its image, for digitization by an analog-to-digital converter 586 before its application to the modulator 580. A lowpass filter 588 (or, alternatively, a bandpass filter centered at 252 kHz) suppresses the image accompanying the time-base corrected second under signal from the modulator 580 as applied to modulators 540 and 542. The modulators 540 and 542, each of which comprises a respective 4-quadrant digital multiplier, synchronously demodulate that signal to generate responses that include the A UX1 and A UX2 signals, respectively. The modulators 540 and 542 supply their responses to the lowpass filters 272 and 274, respectively, which suppress the images accompanying the AUX1 and AUX2 signals. The image-free AUX1 and AUX2 signals, respective ones of which describe the M and G signals, are supplied to the luma playback processor 210.

In-quadrature 252 kHz carriers supplied to the modulators 540 and 542 are derived in the following manner. Read addresses from the counter circuitry of the AFPC'd oscillator 278 are supplied via a bus 534 to a read-only memory 536 to access a look-up table, for generating digitized samples of a 252 kHz sine wave with an N° phase shift that are applied as carrier signal to the modulator 540 and as input signal to a clocked digital delay line 538. The clocked digital delay line 538 supplies digitized samples of a 252 kHz cosine wave with an (N-90)° phase shift that are applied as carrier signal to the modulator 542. Alternatively, the clocked digital delay line 538 can be replaced by a read-only memory storing a look-up table supplied read addresses from the output of the ROM 536 or from the counter circuitry of the AFPC'd oscillator 278 as appears on the bus 534.

FIG. 12 shows an average detector 290 for responding to a PAS with only one auxiliary signal encoded therein, as separated by the lowpass line-comb filter comprising the adder 266 and the 1H delay line 268, or by the lowpass line-comb filter comprising the adder 466 and the 1H delay line 468. The output signal from the lowpass line-comb filter is supplied to the average detector 290, which comprises an absolute-value detector 292 and a lowpass filter 294 in cascade connection thereafter. The absolute-value detector 292 may be realized in read-only memory (ROM). Alternatively, assuming the adder 266 (or 466) sum output signal is in two's complement arithmetic, the absolute-value detector 292 may be realized by a battery of two-input exclusive-OR gates having the most significant (sign) bit of the adder 266 (or 466) sum output signal applied to their first inputs and having respective ones of the remaining bits of the adder 266 (or 466) sum output signal applied to their second inputs. The selectively one's complemented signal from the battery of exclusive-OR gates then has the most significant (sign) bit of the adder 266 (or 466) sum output signal added to it to generate the absolute value of the adder 266 (or 466) sum output signal. The lowpass filter 294 responds to the absolute value of the adder 266 (or 466) sum output signal for providing its average as the detected auxiliary signal.

While the recording electronics of the invention have been described as modulating a 3.58 MHz carrier and subsequently downconverting the results to generate the 629 KHz color-under carrier and the 252 or 629 KHz second under carrier, recording electronics embodying the invention can be constructed wherein the color under carriers are directly modulated using balanced modulators. A carrier that is an odd multiple of half scan line frequency can be generated and amplitude-modulated by the M and G signals to generate QAM sidebands more simply by using such direct method. Moreover, for systems such as PAL, and Beta tape format, and similar systems where the chroma carrier is encoded with different phase relationships than as described above for the VHS format, the invention would be embodied in such systems with the second under carrier exhibiting line-to-line alternation of carrier phasing respective to that chroma carrier.

Next, with reference to the FIGS. 13a through 13f, the processing of the chrominance and motion signals, so as to provide a composite under signal comprising in addition to a color-under signal a second under signal with lower carrier frequency, will be described in more detail. Currently, this is the preferred way of implementing the system of the present invention for compatibility with the conventional VHS format.

FIG. 13a shows a chrominance/motion combining circuit according to a VHS format-compatible embodiment, which is similar to that shown in FIG. 9 but modulates the amplitude of only a single phase of a 252 kHz carrier in accordance with a spread motion signal M. The chrominance sidebands C of a suppressed 3.58 MHz color subcarrier are supplied as modulating signal input to a modulator 600 to heterodyne with a 4.21 MHz four-phase carrier to generate a 629 kHz color-under signal. A burst emphasis circuit 605 is in cascade connection after the modulator 600, for boosting the level of the color-under signal during the burst interval. The spread motion signal M from a luma recording processor similar to the processor 12 in FIG. 9 is supplied as modulating signal input to a modulator 610 and modulated on a 252 kHz four-phase carrier to generate a second under signal component having a horizontal frequency of 252 kHz, the phase of which carrier shifts forward or backward 90° per line in alternate fields in a fashion complementary to that of the 629 kHz color-under carrier customarily used in VHS recording. The color-under signal from the burst emphasis circuit 605 and the second under signal from the modulator 610 are additively combined in an adder 620 to form the composite under signal and attendant image frequencies. The output signal from the adder 620 is then filtered by a horizontal lowpass filter (HLPF) 630 having a cutoff frequency of around 1.2–1.3 MHz, which suppresses the image frequencies. If the image-free composite under signal from the adder 620 is digital in nature, it is supplied to a digital-to-analog converter for conversion to analog form. The image-free composite under signal is supplied in analog form to the adder 14 in FIG. 9 to be frequency multiplexed with the frequency-modulated luma carrier, thereby to generate the frequency multiplex signal supplied to the recorder 16.

Figures 13D, 13E:
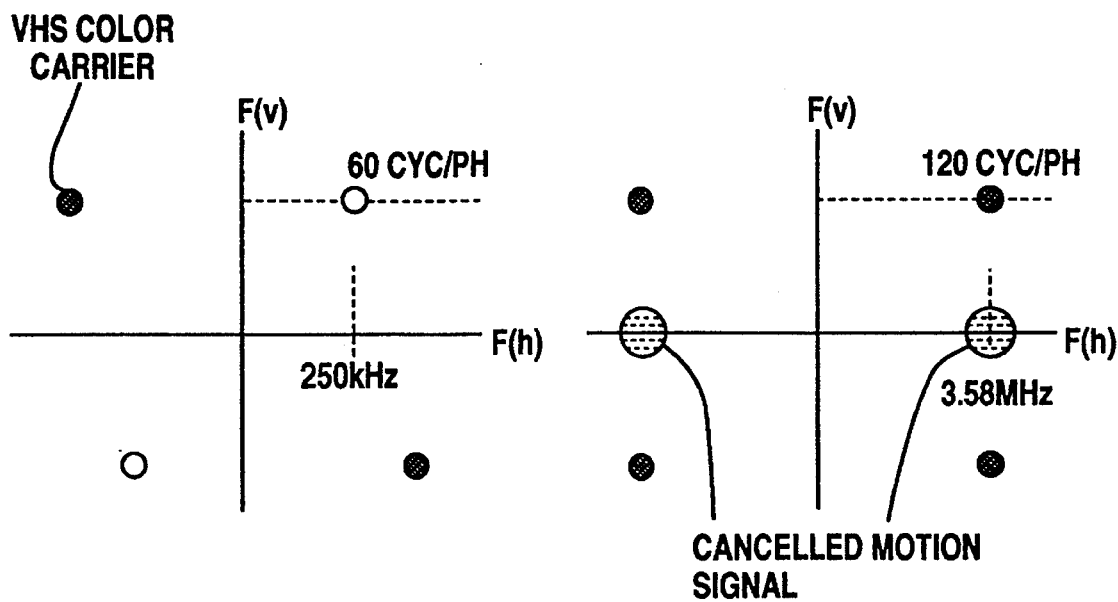
FIG. 13d is a two-dimensional spatial-frequency plot diagram, each point of which has vertical spatial frequency F(v) as ordinate and has horizontal spatial frequency F(h) as abscissa, showing the relationship between a VHS format color-under carrier and the encoded motion signal in an odd track (channel)
FIG. 13e is a diagram illustrating phase opposition cancellation of the reproduced encoded motion signal in a conventional VCR.

The two-dimensional spatial-frequency plot diagram of FIG. 13b depicts the relationship between the motion signal M and the NTSC chrominance information. As a consequence of the phase shifting of the color-under carrier in the VHS format, a two 5 dimensional (horizontal and vertical frequency) spectral analysis of the VHS format's 629 KHz color carrier shows that on even tracks (fields) it occupies the first and third quadrants and on odd tracks (fields) it occupies the second and fourth quadrants, as respectively depicted in the two-dimensional spatial-frequency plot diagrams of FIGS. 13c and 13d. Thus, it may be seen that on even tracks the second and fourth quadrants of the VHS format 629 MHz color-under carrier are normally vacant, that is, not utilized for signal carriage, while on odd tracks the first and third quadrants are vacant.

In accordance with the present invention as exemplarily embodied for compatibility with conventional VHS format recording and reproduction apparatus, during the encoding processing in the FIG. 13a chrominance/motion combining circuit, the spread motion signal M is modulated on a carrier and combined with the down-converted VHS color-under signal so that the modulated motion signal appears in the second and fourth quadrants left vacant by the VHS-format amplitude-modulation of 629 KHz color-under carrier on even tracks, and in the first and third quadrants left vacant by the VHS-format amplitude-modulation of 629 KHz color-under carrier on odd tracks, to produce the composite under signal C+M. The phase shifting of the 252 KHz four-phase carrier of the second under signal forward or backward by 90° per line in alternate fields in fashion complementary to that of the 629 VHS KHz color-under carrier arranges for this to happen. In those fields (tracks) where the color-under carrier occupies the first and third quadrants, the AM sidebands encoding the motion signal M occupy the second and fourth quadrants, while in opposite fields (tracks) the color-under carrier and the AM sidebands encoding the motion signal M reverse the respective quadrants in which they appear. The down-converted AM sidebands encoding the chrominance signal C supplied from the modulator 600 via burst emphasis or gating circuitry 605 and the the AM sidebands encoding the motion signal M from modulator 610 are input to respective signal inputs of an adder 620 to be combined into the resultant composite under signal or chrominance-plus-motion signal C+M. The chrominance-plus-motion signal C+M output from the adder 620 thus contains the chrominance information C as well as the spread motion signal information M modulated on a four-phase carrier by occupying complementary quadrants of the carrier and alternating between even and odd quadrants in alternate fields.

The choice of the 252 KHz carrier frequency for the motion signal reduces the possibility of interference with the flyback; however, it is also possible to modulate the motion information on a 629 KHz carrier like the chroma, as was done in the apparatus of 15 FIGS. 1–4, so long as the quadrants occupied by the respective signals are complementary, as described above.

Figure 13F:
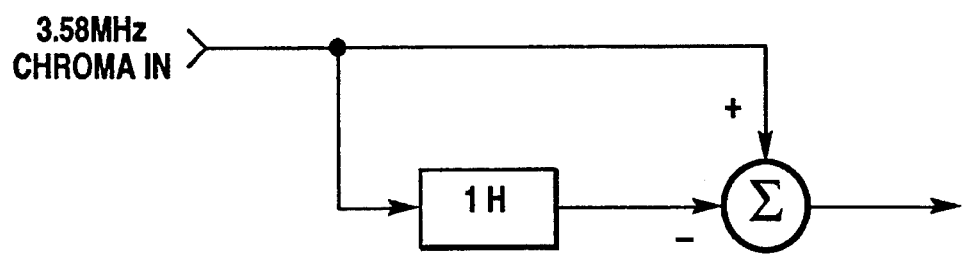

As is well known, in playback processing according to the VHS format, the reproduced 629 KHz color-under carrier is up-converted to 3.58 MHz by reversing the heterodyning process employed on the record side. As shown in FIG. 13f, conventional VCRs typically employ a vertical highpass comb filter (line comb filtering) in a bandpass amplification processing of the recovered 3.58 MHz chrominance subcarrier after the up-conversion, to cancel out the luminance and adjacent-track crosstalk signals from the chroma. Thus, as shown graphically in FIG. 13e, during reproduction or playback the AM sidebands encoding the spread motion signal M will be canceled by the line combing, since they are in phase at corresponding points along adjacent horizontal scan lines. Only the AM sidebands encoding the chrominance signal component C, being 180° out of phase at corresponding points along adjacent horizontal scan lines, appear in the response from the chroma comb filter in such a conventional VCR when playing back an encoded recording. So, even though the encoded motion signal will be reproduced from the tape during playback, it will be filtered out of the chroma signal in a conventional VCR during playback processing and will not generate any noise or interference in the reproduced image.

Thusfar, the separation of the set of AM sidebands encoding chrominance information component C and the set of AM sidebands encoding motion information component M from each other has been described as being done using line comb filters after the upconversion of the under signals. The line comb filters shown in the playback elecronics of FIGS. 8, 10 and 11 combine current upconversion results from one line back. However, for completely correct vertical registration of luminance and chrominance information, line comb filters are required that combine current upconversion results with upconversion results of one line back and of two lines back, in (1/4): (−1/2): ( 1/4) ratio for separating the chrominance QAM sidebands, and in (fra 1/4): (1/2): (1/4) ratio for separating the AM or QAM sidebands encoding auxiliary signals. Improving the FIG. 10 playback electronics to use such line comb filters requires storage capability for an additional two lines of samples- that is, for four lines of samples in all. Improving the FIG. 10 playback electronics to use such line comb filters requires storage capability for an additional line of samples —that is, for two lines of samples in all —but there is undesirable complication in the synchronous detection of the two auxiliary signals AUX1 and AUX2.

A quadrature selective filter (QSF) will now be described which can separate the two sets of AM sidebands that respectively encode chrominance signals and auxiliary signals while the two sets of AM sidebands are still in the form of under signals. This filter allows the combining of the current composite under signal with the composite under signals of one line back and of two lines back, thereby to secure completely correct vertical registration of luminance and chrominance information, and its storage requirements are little more than two lines of composite under signal samples. The separated color-under signal and second under signal can then be separately upconverted and synchronously detected, without any undesirable complication in the synchronous detection of the two auxiliary signals AUX1 and AUX2.

Figure 14A:
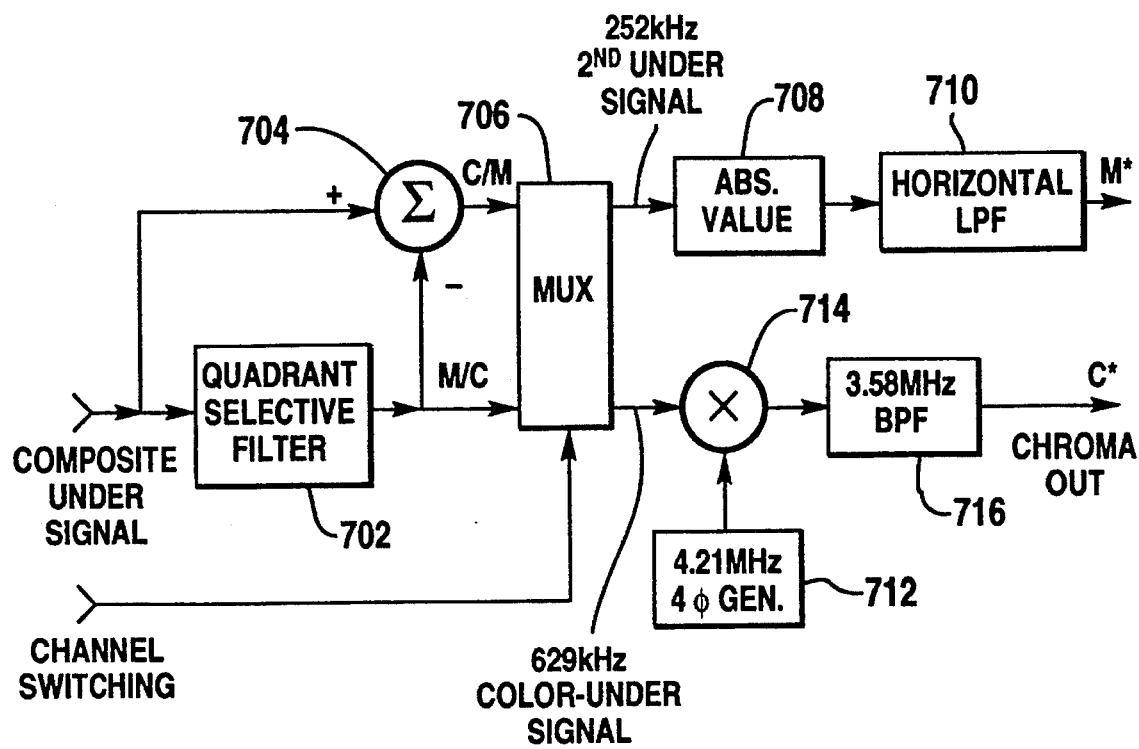
FIG. 14a is a block diagram of a chrominance/motion signal separation circuit embodying the invention in one of its aspects.
Figure 14B:
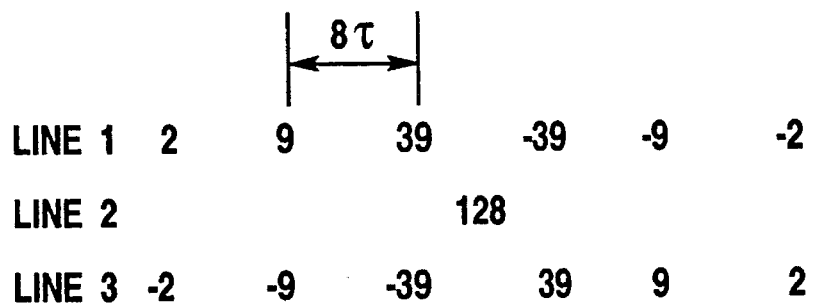
FIG. 14b shows the coefficients of a digitally implemented quadrant selective filter forming part of the FIG. 14a chrominance/motion signal separation circuit.
Figure 14C:
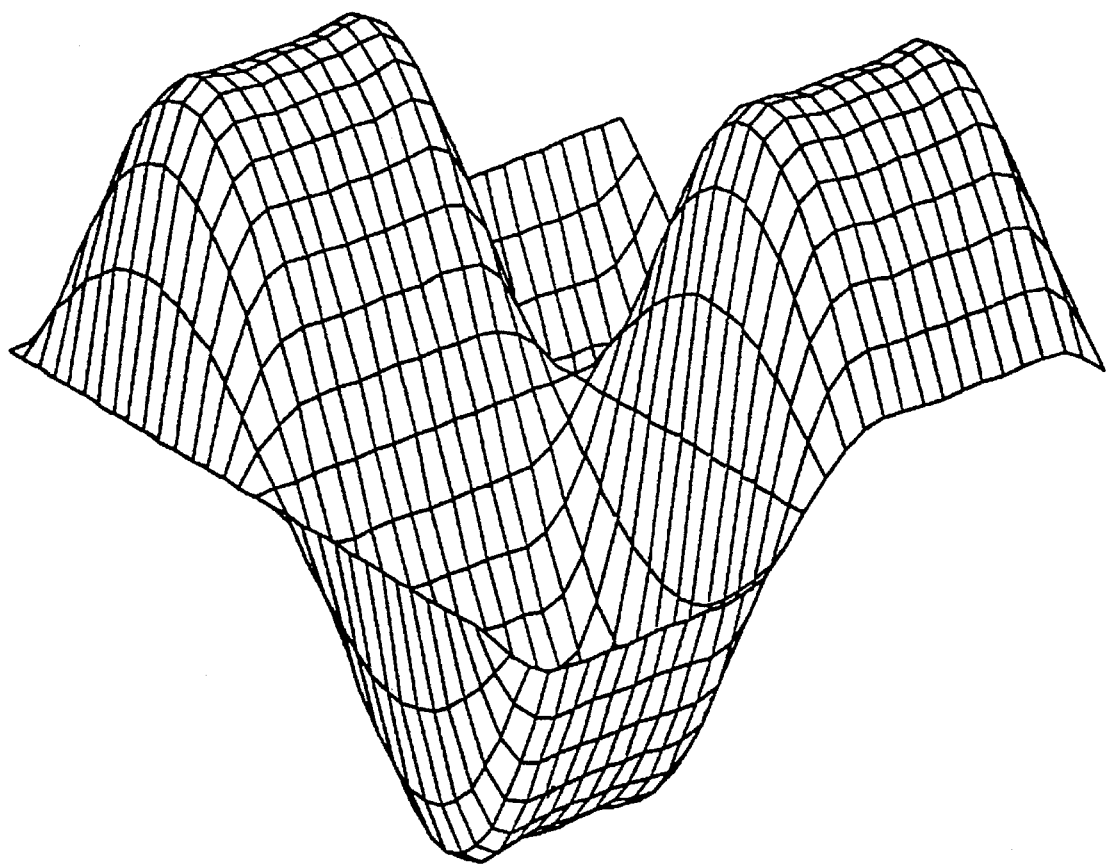
FIG. 14c is a three-dimensional plot of the spatial frequency response of the FIG. 14b quadrant selective filter.
Figure 14D:
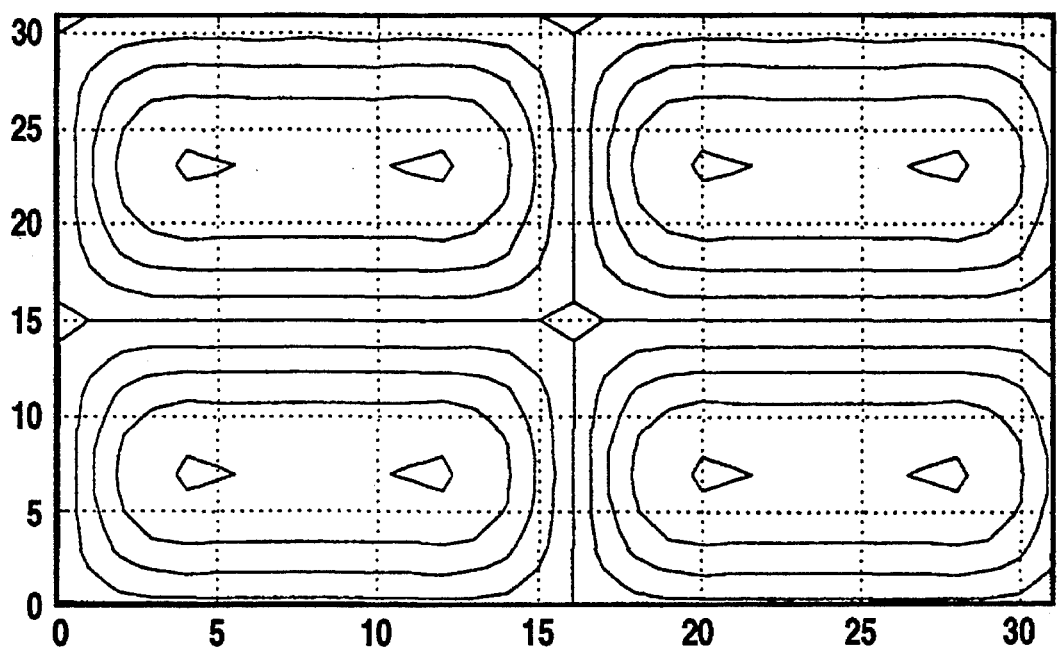
FIG. 14d is a two-dimensional plot taken across the horizontal midplane of the three-dimensional plot in FIG. 14c.
Figure 14E:
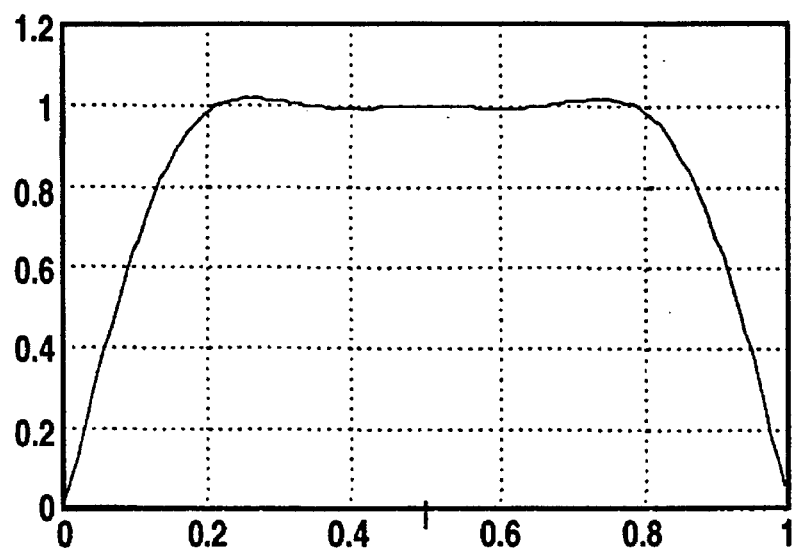
FIG. 14e is a selectivity plot of the horizontal frequency response of the FIG. 14b quadrant selective filter.

The description of the QSF is with reference to FIGS. 14a through 14e. As shown in FIG. 14a, the chrominance-plus-motion signal (C+M)* from a composite-under-signal time-base corrector 700 is applied to the input of a quadrant selective filter (QSF) 702 and also to the minuend input of a subtractor 704. QSF 702 selects between odd and even quadrants of the time-base-corrected (C+M)* signal and may be implemented by a diagonal filter with 2H of delay and having four unique coefficients and a structure as shown in FIG. 14b. The spatial frequency response of QSF 702 is shown in FIGS. 14c and 14d, where the negative (lower) peaks represent zero amplitude or stop bands and the positive (upper) peaks represent pass bands. FIG. 14e shows the horizontal frequency response or selectivity of QSF 702, centered On 629 KHz. The bandwidth of the pass region is approximately 1 MHz, providing 500 kHz bandwidth for each sideband for maintaining good chroma response. Since the filtering coefficients in the QSF 702 are not changed from field to field, it will be appreciated that for those reproduced tracks (i.e. fields) from the encoded recorded videotape in which the chrominance component of the signal (C+M)* is in a quadrant of QSF 702 with the positive peaks (passbands), the filter will pass only the chrominance component, while in the next track (field) only the motion signal component will be passed. Accordingly, QSF 702 passes the motion component or the chroma component, depending on whether the track being decoded is odd or even.

For each track (field/channel) reproduced by the player 200, QSF 702 will pass either the C* or the M* component of the reproduced composite (C+M)* signal to its output, depending on which component is located in the pass region of QSF 702 during that track. The output of QSF 702 is supplied to the subtrahend input of subtractor 704 in order to obtain the opposite signal component, M* or C*, by differencing the filter output against the composite (C+M)* signal applied at the minuend input of subtractor 704. The output of of QSF 702 (i.e., M* or C*) and the output of subtractor 704 (i.e., C* or M*) are supplied to respective inputs of a multiplexer (MUX) 706 having a pair of inputs and a pair of outputs which are switched at the field rate of 30 Hz under control of a signal (e.g. field pulse or channel-1/channel-2 switching signal) which may be generated in known manner by a conventional head switching circuit (not shown) for the playback heads of the player 200, or by conventional channel switching circuitry associated with playback preamplifier circuits. One output of MUX 706 therefore will continuously provide only the separated chrominance component C* for each track/channel reproduced, while the other output of MUX 706 will continuously provide only the separated motion signal component M*.

The separated motion signal component M*, still modulated on a 252 KHz carrier, is supplied to the input of an absolute-value circuit 708 which may be conveniently implemented by a full wave rectifier. The output of the absolute-value circuit 708 is supplied to the input of a horizontal lowpass filter (HLPF) 710 which cuts off at about 500 KHz and can be implemented with fifteen taps. It will be appreciated that the order of the absolute-value circuit 708 and HLPF 710 may be reversed if desired without affecting the resultant signal. The recovered spread motion signal M* output from HLPF 710 is supplied to the motion signal input of the luminance playback processing circuitry 210 for controlling the motion-adaptive filtering of the unfolded luminance signal, as taught in U.S. Pat. No. 5,113,262.

Figure 15:
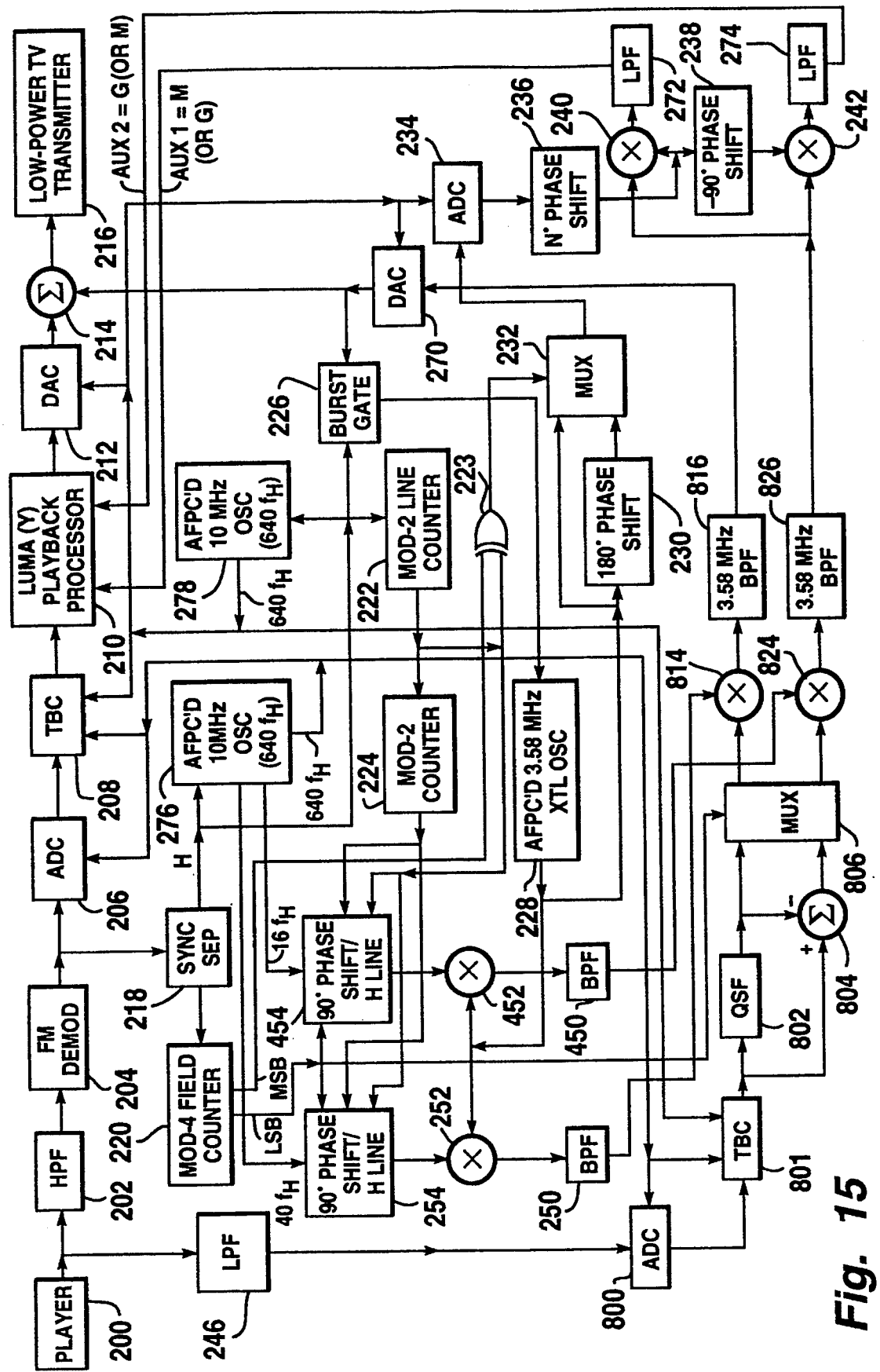
FIG. 15 is a block diagram of color-under playback or receiver electronics constructed in accordance with an aspect of the invention, for use when the second under signal is to have a different frequency than the color-under signal, in which electronics the color-under and second under signals are separated from each other before their being upconverted.

The color-under signal separated by the MUX 706 may be supplied directly to a digital-to-analog converter to be converted to an analog signal which is then processed by a conventional VHS chroma recovery circuit in known manner to obtain the 3.58 MHz NTSC chroma component. This may in fact be preferable from the viewpoint of chroma phase control processing during picture search and still modes, which is somewhat more complex to perform digitally. However, the color-under signal separated by the MUX 706 may be also be digitally processed by a digital implementation of a conventional VHS chroma recovery circuit, as shown in FIG. 14a. The FIG. 14a chroma recovery circuit comprises a generator 712 of 4.21 MHz four-phase carrier in digital form, a modulator 712 (e.g., a digital multiplier) for heterodyning the 629 kHz color-under signal separated by the MUX 706 with the 4.21 MHz four-phase carrier, and a 3.58 MHz bandpass filter (BPF) 716 to pass the resulting 3.58 MHz chroma, while suppressing the higher-frequency image. The chrominance component may be filtered further for removing residual up-conversion carrier and modulation byproducts, and processed for burst de-emphasis if desired. The recovered digital 3.58 chrominance sub-carrier component signal may then be converted to an analog NTSC chroma component signal. Alternatively, the recovered digital 3.58 chrominance sub-carrier component signal may be linearly combined with the recovered digital luminance component signal to form a recovered digital composite video signal, which is then converted to an analog NTSC composite video signal. In a TV/VCR combo the recovered digital 3.58 chrominance sub-carrier component signal may be synchronously detected in the digital regime, to recover digital color-difference signals. These digital color-difference signals can be converted to analog color-difference signals or can each be combined with digital luminance signal to form digital color signals that are converted to red, green and blue analog color signals FIG. 15 playback electronics are a modification of the FIG. 10 playback electronics, in which modification the color-under and second under signals are separated from each other before their being upconverted. In the FIG. 15 playback electronics the composite under signal separated by the lowpass filter 246 is digitized at 640 times line rate by an analog-to-digital converter 800 for application to a time-base corrector 801. The time-base-corrected digital composite under signal from the time-base corrector 801 is applied as input signal to a quadrature selective filter 802 and as minuend input signal to a digital subtractor 804, which receives QSF 802 output signal as its subtrahend input signal. A multiplexer 806 receives the QSF 802 output signal and the difference output signal from the subtractor 804 as its input signals, selecting them each to one of modulators 814 and 824, as controlled by modulo-two field count received from the modulo-four field counter 220. The modulator 814 is a digital multiplier for multiplying the color-under signal separated thereto by the multiplexer 806, multiplying it with a 4.21 MHz four-phase carrier supplied thereto via the bandpass filter 250, thereby to generate a product signal comprising the recovered chrominance signal C* and its image. A bandpass filter 816 with 3.58 MHz center frequency separates the recovered chrominance signal C* from its image, for application to the digital-to-analog converter 270. That is, the modulator 814 and the bandpass filter 816 upconvert the color-under signal to generate the recovered chrominance signal C*. The 15 elements 802, 804, 806, 814 and 816 correspond to the elements 702, 704, 706, 714 and 716 of FIG. 14a both in construction and in operation.

A modulator 824 and a bandpass filter 826 upconvert the second under signal to generate a recovered phase-alternated signal PAS*. The modulator 824 is a digital multiplier for multiplying the second under signal separated thereto by the multiplexer 806, multiplying it with a 3.83 MHz four-phase carrier supplied thereto via the bandpass filter 450, thereby to generate a product signal comprising the QAM sidebands encoding the AUX1 and AUX2 signals. These QAM sidebands PAS* are accompanied by a higher-frequency image, which is suppressed by the bandpass filter 826, which has a 3.58 MHz center frequency. The image-free bandpass filter 826 response PAS* is supplied to the modulators 240 and 242, which synchronously detect the AUX1 and AUX2 signals for application to the luma playback processor 210.

The read-only memories (ROMs) used in the invention may be programmable read-only memories (PROMs) or may be of the type in which the look-up tables stored therein are permanently stored.

While the invention has been described in regard to particular embodiments useful in video recording systems of the general type described in U.S. Pat. No. 5,113,262, other applications will be readily apparent to those skilled in this art. For example, a digital audio signal can be the signal used to modulate the PAC. That audio signal can be a frequency multiplexed signal of one or more audio signals. The possibility of such other applications should be borne in mind when considering the scope of the appended claims.

Appendix

The specification and drawing of U.S. patent application Ser. No. 07/787,690 filed 4 Nov. 1991; entitled SYSTEM FOR RECORDING AND REPRODUCING A WIDE BANDWIDTH VIDEO SIGNAL VIA A NARROW BANDWIDTH MEDIUM; and assigned to Samsung Electronics Co., Ltd., are appended hereto for purposes of incorporation into the foregoing specification. The specification and drawing of U.S. patent application Ser. No. 08/008,813 filed 25 Jan. 1993; entitled ADAPTIVE DEEMPHASIS AND REEMPHASIS OF HIGH FREQUENCIES IN VIDEO TAPE RECORDING, UTILIZING A RECORDED CONTROL SIGNAL; and assigned to Samsung Electronics Co., Ltd., are also appended hereto for purposes of incorporation into the foregoing specification.

What is claimed is:

1. A system for processing a video signal having horizontal scan lines and having a chroma carrier modulated with chroma information, said system comprising:

means, responsive to said chroma carrier, for generating a first unmodulated phase alternating carrier of essentially constant amplitude, wherein said first unmodulated phase alternating carrier and said chroma carrier are in a first timing relationship during each of a first set of alternate scan lines and are in a second timing relationship 180° out-of-phase respective to said first timing relationship during each of a second set of alternate scan lines, said 180° being respective to cycles of said chroma carrier;

means for supplying a first auxiliary signal at a frequency lower than a frequency of said first unmodulated phase alternating cartier, said first auxiliary signal not having its polarity switched between each scan line and a succeeding scan line;

a first modulator, responding to said first auxiliary signal and to said first unmodulated phase alternating carrier supplied thereto as respective input signals thereof, for generating a first modulated carrier in which said first auxiliary signal is modulated on said first unmodulated phase alternating carrier; and means for adding said first modulated carrier to said chroma carrier modulated with said chroma information at a given phase angle.

2. A system according to claim 1, further comprising means for adding a second auxiliary signal to a second modulated phase alternating carrier to produce a second modulated corner, wherein said first and second modulated carriers respectively include said first and second auxiliary signals.

3. A system according to claim 2, wherein said first auxiliary signal is a digital audio signal and said second auxiliary signal is a motion indicating signal.

4. A system according to claim 1, wherein said first auxiliary signal is a digital audio signal.

5. A system according to claim 4, wherein said digital audio signal comprises a frequency multiplexed signal of one or more audio signals.

6. A system according to claim 1, wherein said first auxiliary signal is a signal indicative of motion in said video signal.

7. A system as set forth in claim 1, wherein said means for adding said first modulated carrier to said chroma carrier modulated with said chroma information at said given phase angle is of such type that there is not in any scan line a quadrature relationship between said first modulated carrier and said chroma carrier modulated with said chroma information.

8. A system as set forth in claim 2, wherein said means for adding said first modulated carrier to said chroma carrier modulated with said chroma information at said given phase angle is of a type generating a sum signal wherein said first modulated carrier is advanced 57° respective to said second modulated carrier during each scan line of a respective first set of alternate scan lines in each field, and said first modulated carrier is delayed 33° respective to said second modulated carrier during each scan line of a respective second set of alternate scan lines in each field, said respective first and second sets of alternate scan lines interleaving with each other in time.

9. A system according to claim 1, further comprising:

means, responsive to said chroma carrier, for generating a second unmodulated phase alternating carrier of essentially constant amplitude and of a same frequency as said first unmodulated phase alternating carrier;

means for supplying a second auxiliary signal at a frequency lower than a frequency of said second unmodulated phase alternating carrier, said second auxiliary signal not having its polarity switched between each scan line and the succeeding scan line;

a second modulator, responding to said second auxiliary signal and to said second unmodulated phase alternating carrier supplied thereto as respective input signals thereof, for generating a second modulated carrier in which said second auxiliary signal is modulated on said second unmodulated phase alternating carrier; and means for adding said second modulated carrier to said chroma carrier modulated with said chroma information at a phase angle in quadrature with said given phase angle.

10. A system according to claim 9, wherein said means, responsive to said chroma carrier, for generating said second unmodulated phase alternating carrier of essentially constant amplitude comprises a read-only memory.

11. A system according to claim 9, wherein said means, responsive to said chroma carrier, for generating said second unmodulated phase alternating carrier of essentially constant amplitude comprises a delay line having an input connection to which said first unmodulated phase alternating carrier of essentially constant amplitude is applied, said delay line having an output connection to said second modulator, and exhibiting delay between its said input and output connections such that said second unmodulated phase alternating carrier is supplied at its output connection in quadrature phasing respective to said first unmodulated phase alternating carrier.

12. A system according to claim 1, wherein said means, responsive to said chroma carrieh for generating said first unmodulated phase alternating carrier of essentially constant amplitude comprises a read-only memory.

13. A video signal processing system having a chroma carrier modulated with chroma information, said system comprising:

means responsive to said chroma carrier for generating a phase alternating carrier of a same frequency as said chroma carrier, whereby said phase alternating carrier and said chroma carrier are in phase during each scan line in a first set of alternate scan lines and are 180° out-of-phase in a second set of alternate scan lines time interleaved with said first set of alternate scan lines;

means for modulating a first auxiliary signal on said phase alternating carrier to produce a phase alternating modulated carrier;

means for adding said phase alternating modulated carrier to said chroma carrier modulated with said chroma information at a given phase angle to generate a sum signal; and modulating means for generating in response to said sum signal, a composite under signal comprised of a color under signal and a second under signal, a carrier of said color-under signal which changes 90° in phase in a first sense each successive line of odd-numbered fields and changes 90° in phase in a second sense opposite said first sense each successive line of even-numbered fields, and a carrier of said second under signal which changes 90° in phase in said second sense each successive line of said odd-numbered fields and changes 90° in phase in said first sense each successive line of said even-numbered fields.

14. A video signal processing system as set forth in claim 13, wherein said modulating means is of a type for generating in response to said sum signal, said composite under signal comprised of said color-under signal generated in response to said chroma carrier modulated with said chroma information and of said second under signal generated in response to said phase alternating modulated carrier, said color-under signal having said carrier that regresses 90° in phase each successive line of said odd-numbered fields and progresses 90° in phase each successive line of said even-numbered fields, and said second under signal having said carrier that progresses 90° in phase each successive line of said odd-numbered fields and regresses 90° in phase each successive line of said even-numbered fields.

15. A method of operating a video signal processing system, for processing a video signal having as components thereof a luminance signal and a chroma carrier modulated with chroma information, comprising the steps of:

generating in response to said chroma carrier a first phase alternating carrier of a same frequency as said chroma carrier, but with line to line phase inversion of 180° relative to said chroma carrier, whereby said first phase alternating carrier is 180° out of phase relative to said chroma carrier in alternate lines of each field and is in-phase relative to said chroma carrier in the intervening alternate lines of each field;

modulating said first phase alternating carrier by a first auxiliary signal, thereby to generate a first modulated phase alternating carrier; and adding, at a given phase angle, said first modulated phase alternating carrier to said chroma carrier modulated with chroma information, thereby to generate an augmented chrominance signal.

16. A method according to claim 15, comprising a further step of:

generating, in response to said augmented chrominance signal, a composite under signal comprising:

a color-under signal, which is generated responsive to said chroma carrier modulated with chroma information, and which regresses 90° in phase each successive line of a first field of each frame and progresses 90° in phase each successive line of a second field of each frame; and a second under signal, which is generated responsive to said first modulated phase alternating carrier, and which progresses 90° in phase each successive line of the first field of each frame and regresses 90° in phase each successive line of the second field of each frame.

17. A method according to claim 15, comprising the further steps of:

generating a second phase alternating carrier of the same frequency as said chroma carrier;

modulating said second phase alternating carrier by a second auxiliary signal, thereby to generate a second modulated phase alternating carrier; and including said second modulated phase alternating carrier in said augmented chrominance signal by adding it thereinto at a phase angle in quadrature to said given phase angle.

18. A method according to claim 17, comprising a further step of:

generating, in response to said augmented chrominance signal, a composite under signal comprising:

a color-under signal, which is generated responsive to said chroma carrier modulated with chroma information, and which regresses 90° in phase each successive line of a first field of each frame and progresses 90° in phase each successive line of a second field of each frame; and a second under signal, which is generated responsive to said first and second modulated phase alternating carriers, and which progresses 90° in phase each successive line of the first field of each frame and regresses 90° in phase each successive line of the second field of each frame.

19. A method according to claim 18, further comprising steps of: generating said first auxiliary signal in response to frame to frame changes in a luminance signal; and generating said second auxiliary signal in response to an upper frequency content of said luminance signal.

20. A method according to claim 15, comprising the further step of: generating said first auxiliary signal in response to frame to frame changes in a luminance signal, which are indicative of motion in a video scene.

21. A system having signals derived along parallel lines sequentially scanned at a prescribed scan line rate in each of a sequence of fields, said system comprising apparatus for conveying modulation of first and second carriers to a remote position, said apparatus comprising means for encoding a modulated first carrier and a modulated second carrier, neither of said first and second carriers being a carrier for the other, said apparatus further comprising:

a source of said modulated first carrier, said first carrier being of a frequency that is an odd multiple of one-half said prescribed scan line rate, such that in its unmodulated state it is 180° out of phase at corresponding points along consecutive scan lines, a source of said modulated second carrier, said second carrier also being of said frequency that is said odd multiple of one-half said prescribed scan line rate, but having its phase reversed from line to line such that in its unmodulated state it is in phase at corresponding points along consecutive scan lines, and adding means for adding together said modulated first carrier and said modulated second carrier such that there is not a quadrature relationship between them; said system further comprising means for separating said modulated first carrier from said modulated second carrier, said means for separating comprising:

one-H delay means for providing a delay of one scan line between an input connection thereof from said remote point and an output connection thereof, means for additively combining signals from the input and the output connections of said one-H delay means thereby to generate a signal corresponding to the modulation of said second carrier, and means for differentially combining signals from the input and the output connections of said one-H delay means thereby to generate a signal corresponding to the modulation of said first carrier.

22. A system having signals descriptive of consecutive image frames each scanned along parallel lines, said system including apparatus for conveying modulation of first and second carriers to a remote point, said first carrier and said second carrier being of frequencies both of which are either an odd multiple or an even multiple of one-half a prescribed scan line rate and the phase of one of said first and second carriers being reversed from line to line, one of said first and second carriers being such that in its unmodulated state it is in phase at corresponding points along consecutive scan lines, and the other of said first and second carriers being such that in its unmodulated state it is 180° out of phase at corresponding points along consecutive scan lines, said apparatus comprising:

means for encoding a modulated first carrier and a modulated second carrier, said encoding means comprising:

a source of said modulated first carrier comprising first and second phases of said first carrier that are in quadrature phase relationship with each other and that are amplitude modulated with respective modulating signals, a source of said modulated second carrier, and means for linearly combining said modulated first carrier and said modulated second carrier to generate a combined signal; and means for conveying representation of said combined signal to said remote point; said system further comprising means for separating said modulated first carrier from said modulated second carrier, said means for separating comprising:

one-H delay means for providing a delay of one scan line between an input connection thereof from said remote point and an output connection thereof;

means for additively combining signals from the input and the output connections of said one-H delay means, thereby to generate a signal corresponding to the modulation of said second carrier; and means for differentially combining signals from the input and the output connections of said one-H delay means, thereby to generate a signal corresponding to the modulation of said first carrier.

23. In a system having signals derived along parallel lines sequentially scanned at a prescribed scan line rate in each of a sequence of fields, apparatus for conveying modulation of first and second carriers to a remote position, wherein said first and second carriers have the same frequency, said apparatus comprising means for encoding a modulated first carrier and a modulated second carrier, said apparatus further comprising:

a source of said modulated first carrier, said first carrier being of a frequency that is an odd multiple of one-half said prescribed scan line rate, such that in its unmodulated state it is 180° out of phase at corresponding points along consecutive scan lines, a source of said modulated second carrier, said second carrier also being of said frequency that is said odd multiple of one-half said prescribed scan line rate, but having its phase reversed from line to line such that in its unmodulated state it is in phase at corresponding points along consecutive scan lines, and adding means for adding together said modulated first carrier and said modulated second carrier such that there is not a quadrature relationship between them, thereby to form a combined signal.

24. Apparatus as set forth in claim 23, wherein:

said modulated first carrier and said modulated second carrier have quadrature components thereof respectively modulated with first and second auxiliary signals.

25. Apparatus according to claim 23, wherein said first carrier is a color subcarrier of an NTSC system.

26. Apparatus according to claim 25, further comprising means for conveying representations of said modulated first and second carriers to said remote point comprising:

means for modulating said combined signal supplied by said adding means with signals having a frequency different from a frequency of either of said first and second carriers to produce the representation of said modulated first and second carriers at a different frequency;

recording means coupled to record signals provided by said modulating means;

means for producing carrier waves having a same phase relationship with respect to the same lines as the modulated first carrier and the modulated second carrier.

27. Apparatus as set forth in claim 23, wherein said adding means for adding together said modulated first carrier and said modulated second carrier is of a type wherein in said combined signal from said adding means said modulated first carrier is advanced 57° respective to said modulated second carrier during each scan line of a respective first set of alternate scan lines in each field and is delayed 33° respective to said modulated second carrier during each scan line of a respective second set of alternate scan lines in each field, said first and second sets of alternate scan lines interleaving with each other in time.

28. Apparatus as set forth in claim 23, further comprising:

a source of a third carrier shifted in phase by 90° in a first direction each consecutive scan line of each field, shifted in phase by an additional 180° at a beginning of each consecutive field, and otherwise unmodulated; and a modulator for mixing said combined signal and said third carrier to generate a modulator output signal.

29. In a system having signals descriptive of consecutive image frames each scanned along parallel lines, apparatus for conveying modulation of first and second carriers to a remote position, said first carrier and said second carrier being of the same frequency which is either an odd multiple or an even multiple of one-half of a prescribed scan line rate, and the phase of one of said first and second carriers being reversed from line to line, one of said first and second carriers being such that in its unmodulated state it is in phase at corresponding points along consecutive scan lines, and the other of said first and second carriers being such that in its unmodulated state it is 180° out of phase at corresponding points along consecutive scan lines, said apparatus including means for encoding a modulated first carrier and a modulated second carrier, comprising:

a source of said modulated first carrier comprising first and second phases of said first carrier that are in quadrature phase relationship with each other and that are amplitude modulated with respective modulating signals;

a source of said modulated second carrier, and means for linearly combining said modulated first carrier and said modulated second carrier to generate a combined signal.

30. Apparatus as set forth in claim 29, wherein said first carrier is such that in its unmodulated state it is 180° out of phase at corresponding points along consecutive scan lines.

31. Apparatus as set forth in claim 30, wherein said respective modulating signals of said first and second phases of said first carrier that are in said quadrature phase relationship with each other are color difference signals.

32. Apparatus as set forth in claim 29, wherein said first carrier is such that in its unmodulated state it is in phase at corresponding points along consecutive scan lines.

33. Apparatus as set forth in claim 29, wherein said source of said modulated second carrier comprises:

first and second phases of said second carrier that are in said quadrature phase relationship with each other and that are amplitude modulated with said respective modulating signals.

34. Apparatus as set forth in claim 29, wherein said means for linearly combining said modulated first carrier and said modulated second carrier combines them in non-quadrature phasing.

35. Apparatus as set forth in claim 29, further comprising:

a source of a third carrier shifted in phase by 90° in a first direction each consecutive scan line of each field, shifted in phase by an additional 180° at a beginning of each consecutive field, and otherwise unmodulated; and a modulator for mixing said combined signal and said third carrier to generate a modulator output signal.

36. A video signal processor, for processing a video signal having as components thereof a luminance signal and a chroma carrier modulated with chroma information, said video signal processor comprising:

means for generating a phase alternating carrier of a same frequency as said chroma carrier, but with line to line and frame to frame phase inversion of 180° relative to said chroma carrier, comprising:

means for modulating an amplitude of said phase alternating carrier in accordance with a first auxiliary signal to generate a modulated phase alternating carrier;

means for adding said modulated phase alternating carrier at a given phase angle to said chroma carrier modulated with said chroma information, thereby to provide a sum signal in which said chroma carrier modulated with said chroma information is combined with said modulated phase alternating carrier; and first modulating means for generating in response to said sum signal, combined modulated color-under and second under carriers corresponding respectively to said chroma carrier modulated with said chroma information and to said modulated phase alternating carrier.

37. (Amended). In combination with the video signal processor of claim 36:

second modulating means for generating a first signal comprising said chroma carrier modulated with said chroma information combined with said modulated phase alternating carrier in response to said combined modulated color-under and second under carriers; and separating means for line comb filtering, said separating means being responsive to said first signal for separating therefrom respective reproductions of said chroma carrier modulated with said chroma information and said modulated phase alternating carrier.

38. A combination according to claim 37, wherein said separating means comprising:

a one-H delay line having an input terminal to which said first signal is applied and having an output terminal for supplying said first signal delayed by a duration of a horizontal scan line;

a first summer subtracting said first signal supplied to the input terminal of said one-H delay line and as supplied from the output terminal of said one-H delay line, thereby to reproduce said chroma carrier modulated with said chroma information, separated from said modulated phase alternating carrier; and a second summer subtracting said first signal supplied to the input terminal of said one-H delay line and as supplied from the output terminal of said one-H delay line, thereby to reproduce said phase alternating carrier modulated with said first auxiliary signal, separated from said chroma carrier modulated with said chroma information.

39. A video signal processor according to claim 38, further comprising means for demodulating said first auxiliary signal, as reproduced by said second summer.

40. A video signal processor according to claim 36, wherein said means for generating said phase alternating carrier of the same frequency as said chroma carrier further comprises:

means for modulating a quadrature phasing of said phase alternating carrier by a second auxiliary signal; and means for combining said quadrature phasing of said phase alternating carrier as modulated by said second auxiliary signal, with said phase alternating carrier as modulated by said first auxiliary signal.

41. A video signal processor according to claim 40, in combination with:

second modulating means for generating a first signal comprising said chroma carrier modulated with said chroma information combined with said modulated phase alternating carrier in response to said combined modulated color-under and second under carriers;

means for bandpass line comb filtering said first signal, thereby to separate said chroma carrier modulated with said chroma information; and means for lowpass line comb filtering said first signal, thereby to separate said modulated phase alternating carrier.

42. The combination of claim 41, wherein said means for bandpass line comb filtering said first signal differentially combines a current response of said second modulating means with said current response delayed for a duration of a horizontal scanning line, and wherein said means for lowpass line comb filtering said first signal additively combines the current response of said second modulating means with said current response delayed for the duration of said horizontal scanning line.

43. The combination of claim 41, further comprising:

means for synchronously detecting said first auxiliary signal from said modulated phase alternating carrier separated by said means for lowpass line comb filtering, and means for synchronously detecting said second auxiliary signal from said modulated phase alternating carrier separated by said means for lowpass line comb filtering.

44. In a system having a plurality of signals derived along parallel lines sequentially scanned at a prescribed scan line rate in each of a sequence of video fields, said video fields being consecutively numbered for purposes of claiming in order of their occurrence, apparatus comprising:

respective sources of a first carrier, a modulated first carrier, a second carrier and a modulated second carrier, said first carrier being generated as a first multiple of one-half said prescribed scan line rate such that in its unmodulated state said first carrier is 180° out of phase at corresponding points along consecutive scan lines within a same video field, said second carrier being generated as a second multiple of one-half said prescribed scan line rate such that in its unmodulated state said second carrier is in phase at corresponding points along consecutive scan lines within the same video field, said first carrier being modulated by at least one of said plurality of signals, said second carrier being modulated by at least one other of said plurality of signals;

means for linearly combining said modulated first carrier and said modulated second carrier, thereby to generate a combined signal;

a source of a third carrier, shifted in phase by 90° in a first sense each consecutive scan line of each odd-numbered video field, shifted in phase by 90° in a second sense each consecutive scan line of each even-numbered video field, shifted to a prescribed phasing at a beginning of each consecutive field, and otherwise unmodulated, said first and second senses of shift in phase being opposite to each other; and a first modulator for mixing said combined signal and said third carrier to generate a first modulator output signal.

45. Apparatus as set forth in claim 44, further comprising:

means for filtering said first modulator output signal for separating a lower-frequency set of sidebands from an upper-frequency set of sidebands;

a frequency modulator for modulating a frequency of a fourth carrier in accordance with still another of said plurality of signals to form a frequency-modulation signal extending over a frequency band higher in frequency than said lower-frequency set of sidebands; and means for linearly combining said lower-frequency set of sidebands with said frequency-modulation signal, thereby to generate a frequency-multiplexed signal.

46. Apparatus as set forth in claim 44, wherein said first carrier is an odd multiple of one-half said prescribed scan line rate and in its unmodulated state is 180° out of phase at corresponding points along consecutive scan lines within the same video field.

47. Apparatus as set forth in claim 46, said modulated first carrier being a suppressed carrier with respective first and second sets of quadrature amplitude modulation sidebands respectively descriptive of a first and a second of said plurality of signals.

48. Apparatus as set forth in claim 47, wherein said second carrier is an odd multiple of one-half said prescribed scan line rate, the phase of said second carrier being reversed from line to line, such that in its unmodulated state said second carrier is in phase at corresponding points along consecutive scan lines.

49. Apparatus as set forth in claim 48, said modulated second carrier being a suppressed carrier with a third set of amplitude modulation sidebands descriptive of a third of said plurality of signals.

50. Apparatus as set forth in claim 49, further comprising: means for filtering said first modulator output signal for separating a lower-frequency set of sidebands from an upper-frequency set of sidebands;

a frequency modulator for modulating a frequency of a fourth carrier in accordance with still another of said plurality of signals to form a frequency-modulation signal extending over a frequency band higher in frequency than said lower-frequency set of sidebands; and means for linearly combining said lower-frequency set of sidebands with said frequency-modulation signal.

51. Apparatus as set forth in claim 48, said modulated second carrier being a suppressed carrier with respective first and second sets of quadrature amplitude modulation sidebands respectively descriptive of a third and a fourth of said plurality of signals.

52. Apparatus as set forth in claim 51, further comprising:

means for filtering said first modulator output signal for separating a lower-frequency set of sidebands from an upper-frequency set of sidebands;

a frequency modulator for modulating a frequency of a fourth carrier in accordance with a fifth of said plurality of signals to form a frequency-modulation signal extending over a frequency band higher in frequency than said lower-frequency set of sidebands; and means for linearly combining said lower-frequency set of sidebands with said frequency-modulation signal.

53. Apparatus as set forth in claim 48, wherein said first multiple of one-half said prescribed scan line rate is the same as said second multiple of one-half said prescribed scan line rate, and said first and second carriers are the same in frequency within each horizontal scan line.

54. Apparatus as set forth in claim 44, wherein said second carrier is an odd multiple of one-half said prescribed scan line rate, the phase of said second carrier being reversed from line to line, such that in its unmodulated state said second carrier is in phase at corresponding points along consecutive scan lines.

55. Apparatus as set forth in claim 54, said modulated second carrier being a suppressed carrier with a set of amplitude modulation sidebands descriptive of said one other of said plurality of signals.

56. Apparatus as set forth in claim 54, said modulated second carrier being a suppressed carrier with respective first and second sets of quadrature amplitude modulation sidebands respectively descriptive of a pair of other of said plurality of signals.

57. Apparatus as set forth in claim 44, further comprising:

means for filtering said first modulator output signal for separating a lower-frequency set of sidebands from an upper-frequency set of sidebands;

a frequency modulator for modulating a frquency of a fourth carrier in accordance with still another of said plurality signals to form a frequency-modulation signal extending over a frequency band higher in frequency than said lower-frequency set of sidebands;

means for linearly combining said lower-frequency set of sidebands with said frequency-modulation signal, thereby to generate a frequency-multiplexed signal; and means for recording said frequency-multiplexed signal on a recording medium.

58. Apparatus as set forth in claim 57, in combination with additional apparatus comprising:

means for reproducing said frequency-multiplexed signal from said recording medium to generate a reproduced frequency-multiplexed signal;

frequency-selective filtering means responsive to the reproduced frequency-multiplexed signal for separating therefrom a reproduced lower-frequency set of sidebands and a reproduced frequency-modulation signal extending over said frequency band higher in frequency than said lower-frequency set of sidebands;

means for demodulating from said reproduced frequency-modulation signal a reproduced said still another signal;

means for regenerating said third carrier to produce a regenerated third carrier;

a second modulator for mixing said reproduced lower-frequency set of sidebands and the regenerated third carrier to generate a second modulator output signal; and means for bandpass line comb filtering said second modulator output signal, thereby to separate a reproduced modulated first carrier free of response to said modulated second carrier.

59. The combination of claim 58, wherein said first and second carriers are the same in frequency within each horizontal scan line, and wherein said additional apparatus further comprises:

means for lowpass line comb filtering said second modulator output signal, thereby to separate a reproduced modulated second carrier.

60. The combination of claim 59, wherein said additional apparatus further comprises:

means for detecting an amplitude of said reproduced modulated second carrier.

61. The combination of claim 59, wherein said additional apparatus further comprises:

means for synchronously detecting an amplitude of two orthogonal phases of said reproduced modulated second carrier.

62. The combination of claim 58, wherein said additional apparatus further comprises:

means for lowpass line comb filtering said second modulator output signal, thereby to generate a lowpass line comb filter response in which said reproduced modulated first carrier is suppressed; and means for detecting an amplitude of said lowpass line comb filter response.

63. The combination of claim 58, wherein said additional apparatus further comprises:

means for lowpass line comb filtering said second modulator output signal, thereby to generate a lowpass line comb filter response in which said reproduced modulated first carrier is suppressed; and means for synchronously detecting an amplitude of two orthogonal phases of said lowpass line comb filter response.

64. The combination of claim 58, wherein said additional apparatus further comprises:

a third modulator for mixing said reproduced lower-frequency set of sidebands and a fifth carrier to generate a third modulator output signal; and means for lowpass line comb filtering said third modulator output signal, thereby to separate a reproduced modulated second carrier.

65. The combination of claim 64, wherein said additional apparatus further comprises:

means for synchronously detecting an amplitude of two orthogonal phases of said reproduced modulated second carrier.

66. Apparatus as set forth in claim 57, in combination with additional apparatus comprising:

means for reproducing said frequency-multiplexed signal from said recording medium to generate a reproduced frequency-multiplexed signal;

frequency-selective filtering means responsive to the reproduced frequency-multiplexed signal for separating therefrom a reproduced lower-frequency set of sidebands and a reproduced frequency-modulation signal extending over said frequency band higher in frequency than said lower-frequency set of sidebands;

means for demodulating from said reproduced frequency-modulation signal a reproduced said still other signal; and means, including quadrature selective filtering providing complementary first and second responses to the reproduced lower-frequency set of sidebands, for separating therefrom signals respectively descriptive of said modulated first carrier and of said modulated second carrier.

67. The combination of claim 66, wherein said additional apparatus further comprises:

means for regenerating said third carrier to produce a regenerated third carrier;

a second modulator for mixing said signal descriptive of said modulated said carrier and the regenerated third carrier to generate a second modulator output signal; and means for filtering said second modulator output signal, thereby to separate a reproduced modulated first carrier from an image thereof.

68. The combination of claim 67, wherein said additional apparatus further comprises:

means for detecting an amplitude of said signal descriptive of said modulated second carrier, thereby reproducing said one other of said plurality of signals.

69. The combination of claim 67, wherein said additional apparatus further comprises:

means for generating a fifth carrier;

a third modulator for mixing said signal descriptive of said modulated second carrier and said fifth carrier to generate a third modulator output signal which yields a reproduced modulated second carrier and its image; and means for synchronously detecting an amplitude of two orthogonal phases of said reproduced modulated second carrier.

70. A system for conveying a plurality of signals descriptive of consecutive image frames each scanned along parallel lines; said system comprising:

means for generating a combined signal comprising amplitude modulation sidebands of a first carrier and amplitude modulation sidebands of a second carrier, apparatus for conveying said combined signal to a remote position, means for bandpass line comb filtering said combined signal as conveyed to said remote position for separating said amplitude modulation sidebands of said first carrier substantially unaccompanied by said amplitude modulation sidebands of said second carrier, and means for lowpass line comb filtering said combined signal as conveyed to said remote position for separating said amplitude modulation sidebands of said second carrier substantially unaccompanied by said amplitude modulation sidebands of said first carrier; said apparatus for generating said combined signal comprising:

means for supplying a first set of said amplitude modulation sidebands of said first carrier, said first carrier being generated as a first multiple of one-half of a prescribed scan line rate, such that in its unmodulated state said first carrier is 180° out of phase at corresponding points along consecutive scan lines within a same video field, and said first carrier having an amplitude of a first phasing thereof modulated in accordance with a first of said plurality of signals descriptive of said consecutive image frames each scanned along parallel lines, thereby giving rise to the first set of said amplitude modulation sidebands of said first carrier;

means for supplying a first set of said amplitude modulation sidebands of said second carrier, said second carrier being generated as a second multiple of one-half said prescribed scan line rate, such that in its unmodulated state said second carrier is in phase at corresponding points along consecutive scan lines within the same video field, and said second carrier having an amplitude of a first phasing thereof modulated in accordance with a second of said plurality of signals descriptive of said consecutive image frames each scanned along parallel lines, thereby giving rise to the first set of said amplitude modulation sidebands of said second carrier; and means for linearly combining the first sets of said amplitude modulation sidebands of said first carrier and of said second carrier for inclusion in said combined signal.

71. The system set forth in claim 70, wherein said means for generating said combined signal further comprises:

means for supplying a second set of said amplitude modulation sidebands of said first carrier, said first carrier having the amplitude of a second phasing thereof modulated in accordance with a third of said plurality of signals descriptive of said consecutive image frames each scanned along parallel lines, thereby giving rise to the second set of said amplitude modulation sidebands of said first carrier, said first and second phasings of said first carrier being in quadrature with each other; and means for linearly combining the second set of said amplitude modulation sidebands of said first carrier with the first sets of said amplitude modulation sidebands of said first carrier and of said second carrier for inclusion in said combined signal.

72. The system set forth in claim 70, wherein said for generating said combined signal further comprises:

means for supplying a second set of said amplitude modulation sidebands of said second carrier, said second carrier having the amplitude of a second phasing thereof modulated in accordance with a third of said plurality of signals descriptive of said consecutive image frames each scanned along parallel lines, thereby giving rise to the second set of said amplitude modulation sidebands of said second carrier, said first and second phasings of said second carrier being in quadrature with each other; and means for linearly combining the second set of said amplitude modulation sidebands of said second carrier with the first sets of amplitude modulation sidebands of said first carrier and of said second carrier for inclusion in said combined signal.

73. The system set forth in claim 70, wherein said means for generating said combined signal further comprises:

means for supplying a second set of amplitude modulation sidebands of said first carrier, said first carrier having the amplitude of a second phasing thereof modulated in accordance with a third of said plurality of signals descriptive of consecutive image frames each scanned along parallel lines, thereby giving rise to the second set of amplitude modulation sidebands of said first carrier, said first and second phasings of said first carrier being in quadrature with each other;

means for supplying a second set of amplitude modulation sidebands of said second carrier, said second carrier having the amplitude of a second phasing thereof modulated in accordance with a third of said plurality of signals descriptive of consecutive image frames each scanned along parallel lines, thereby giving rise to the second set of amplitude modulation sidebands of said second carrier, said first and second phasings of said second carrier being in quadrature with each other; and means for linearly combining the second sets of amplitude modulation sidebands of said first carrier and of said second carrier with the first sets of amplitude modulation sidebands of said first carrier and of said second carrier for inclusion in said combined signal.

74. The system set forth in claim 70, wherein said first carrier in its unmodulated state in an odd multiple of one-half said prescribed scan line rate the phasing of which changes continuously within each horizontal scan line without break in its continuous change, either from horizontal scan line to horizontal scan line or from video field to video field; and wherein said second carrier in its unmodulated state is an odd multiple of one-half said prescribed scan line rate the phasing of which changes continuously within each horizontal scan line, but is switched 180° between image frames and between horizontal scan lines within each image frame.

75. The system set forth in claim 74, having at said remote position:
 one-H delay means for providing a delay of one scan line between an input connection thereof, to which said combined signal is conveyed, and an output connection thereof;
 means for differentially combining signals from the input and the output connections of said one-H delay means, included together with said one-H delay means within said means for bandpass line comb filtering; and
 means for additively combining signals from the input and the output connections of said 37 one-H delay means, included together with said one-H delay means within said means for lowpass line comb filtering.

76. Apparatus for generating a frequency multiplexed signal encoding a plurality of signals descriptive of consecutive image frames, each scanned along spatially interleaved parallel lines of two consecutive video fields, said apparatus comprising:
 means for modulating, in accordance with a first of said plurality of signals descriptive of said consecutive image frames, an amplitude of a first carrier to generate a modulated first carrier, said first carrier regressing 90° in phase each successive line of a first field of each frame and progressing 90° in phase each successive line of a second field of each frame;
 means for modulating, in accordance with a second of said plurality of signals descriptive of said consecutive image frames, an amplitude of a second carrier to generate a modulated second carrier, said second carrier progressing 90° in phase each successive line of the first field of each frame and regressing 90° in phase each successive line of the second field of each frame; and
 means for linearly combining the modulated first carrier and the modulated second carrier for inclusion in said frequency multiplexed signal.

77. Apparatus as set forth in claim 76, further comprising:
 means for modulating, in accordance with a third of said plurality of signals descriptive of said consecutive image frames, an amplitude of a third carrier to generate a modulated third carrier, said third carrier having a same frequency as said first carrier and being in a fixed quadrature phase relationship with said first carrier; and
 means for linearly combining the modulated third carrier with the modulated first carrier and the modulated second carrier for inclusion in said frequency multiplexed signal.

78. Apparatus as set forth in claim 77, further comprising:
 means for modulating, in accordance with a fourth of said plurality of signals descriptive of said consecutive image frames, a frequency of a fourth carrier to generate a modulated fourth carrier; and
 means for linearly combining the modulated fourth carrier with the modulated first carrier, the modulated second carrier and the modulated third carrier for inclusion in said frequency multiplexed signal.

79. Apparatus as set forth in claim 76, further comprising:
 means for modulating, in accordance with a third of said plurality of signals descriptive of said consecutive image frames, an amplitude of a third carrier to generate a modulated third carrier, said third carrier having a same frequency as said second carrier and being in a fixed quadrature phase relationship with said second carrier; and
 means for linearly combining the modulated third carrier with the modulated first carrier and the modulated second carrier for inclusion in said frequency multiplexed signal.

80. Apparatus as set forth in claim 76, further comprising:
 means for modulating, in accordance with a third of said plurality of signals descriptive of the consecutive image frames, an amplitude of a third carrier to generate a modulated third carrier, said third carrier having a same frequency as said first carrier and being in a fixed quadrature phase relationship with said first carrier;
 means for modulating, in accordance with a fourth of said plurality of signals descriptive of said consecutive image frames, an amplitude of a fourth carrier to generate modulated forth carrier, said fourth carrier having a same frequency as said second carrier and being in a fixed quadrature phase relationship with said second carrier; and
 means for linearly combining the modulated third carrier and the modulated fourth carrier with the modulated first carrier and the modulated second carrier for inclusion in said frequency multiplexed signal.

81. Apparatus as set forth in claim 80, further comprising:
 means for modulating, in accordance with a fifth of said plurality of signals descriptive of said consecutive image frames, a frequency of a fifth carrier to generate a modulated fifth carrier; and
 means for linearly combining the modulated fifth carrier with the modulated first carrier, the modulated second carrier, the modulated third carrier and the modulated fourth carrier for inclusion in said frequency multiplexed signal.

82. A video signal processing system, for processing a video signal having as components thereof a luminance signal and chroma sidebands of a suppressed chrominance carrier, said video signal processing system comprising:
 means for generating a first carrier having a same phase at corresponding points in each of the scan lines of each of a succession of image fields;
 means for modulating an amplitude of a first phasing of said first carrier with a first auxiliary signal for generating first amplitude-modulation sidebands of said first carrier;
 means for linearly combining said first amplitude-modulation sidebands of said first carrier with said chroma sidebands, within a combined signal; and
 first downconverting means for generating in response to said combined signal, a composite under signal comprised of:
 a color-under signal generated in response to said chroma sidebands, and regressing 90° in phase each successive line of a first field of each frame and progressing 90° in phase each successive line of a second field of each frame; and a second under signal generated in response to said first amplitude-modulation sidebands of said first carrier, and progressing 90° in phase each successive line of the first field of each frame and regressing 90° in phase each successive line of the second field of each frame.

83. A video signal processing system as set forth in claim 82, further comprising:

a frequency modulator for modulating a frequency of a second carrier in accordance with said luminance signal to form a frequency-modulation signal extending over a frequency band higher in frequency than a frequency band in which said composite under signal reposes;

means for linearly combining said composite under signal with said frequency-modulation signal to generate a frequency-multiplexed signal; and means for conveying said frequency-multiplexed signal to a remote position.

84. A video signal processing system as set forth in claim 83, further comprising:

means for generating a lowpass filter response to said frequency-multiplexed signal as conveyed to said remote position, thereby separating said composite under signal from said frequency-modulation signal;

upconverting means responsive to said composite under signal as separated for regenerating said combined signal;

a lowpass line-comb filter, responding to said combined signal as regenerated by said upconverting means, to recover said amplitude-modulation sidebands of said first carrier; and detector means for detecting variation in an amplitude of the amplitude-modulation sidebands of said first carrier, thereby to recover said first auxiliary signal.

85. A video signal processing system as set forth in claim 84, further comprising:

means for generating a highpass filter response to said frequency-multiplexed signal as conveyed to said remote position, thereby separating said frequency-modulation signal from said composite under signal;

means for demodulating said frequency-modulation signal as separated, thereby to obtain a demodulation result; and means for processing said demodulation result as controlled by said first auxiliary signal from said detector means, thereby to recover said luminance signal.

86. A video signal processing system as set forth in claim 85 further comprising:

a bandpass line-comb filter, responding to said combined signal as regenerated by said upconverting means, to recover said chroma sidebands;

means for linearly combining said luminanee signal, as recovered by said means for processing said demodulation result, with said chroma sidebands, as recovered by said bandpass line-comb filter, thereby to generate a composite video signal; and a television transmitter for modulating a picture carrier in accordance with said composite video signal.

87. A video signal processing system as set forth in claim 83, further comprising:

means for generating a lowpass filter response to said frequency-multiplexed signal, thereby separating said composite under signal from said frequency-modulation signal;

means, including a quadrature-selective filter, for responding to said lowpass filter response to said frequency-multiplexed signal to reproduce Separately, said color-under signal as a reproduced color-under signal and said second under signal as a reproduced second under signal;

first upconverting means responsive to the reproduced color-under signal for regenerating said chroma sidebands; and detector means for detecting variation in an amplitude of the reproduced second under signal, thereby to recover said first auxiliary signal.

88. A video signal processing system as set forth in claim 87, further comprising:

means for generating a highpass filter response to said frequency-multiplexed signal, thereby separating said frequency-modulation signal from said composite under signal;

means for demodulating said frequency-modulation signal as thus separated, thereby to obtain a demodulation result; and means for processing said demodulation result, as controlled by said first auxiliary signal. and a second auxiliary signal supplied from said detector means, thereby to generate said luminanee signal as a reproduced luminance signal.

89. A video signal processing system as set forth in claim 88, wherein said means for responding to said lowpass filter response to said frequency-multiplexed signal to reproduce said color-under signal and said second under signal separately from each other comprises:

a sync separator responsive to the reproduced luminance signal for separating synchronizing pulses therefrom;

a counter responsive to the separated synchronizing pulses for counting image fields;

said quadrature-selective filter being of a type with fixed filter coefficients having an input connection for receiving said lowpass filter response to said frequency-multiplexed signal, said quadrature-selective filter having a first output connection for supplying a response that reproduces said color-under signal during selected fields and that otherwise reproduces said second under signal, and having a second output connection for supplying a response that reproduces said second under signal during selected fields and that otherwise reproduces said color-under signal; and a multiplexer having first and second input connections from respective ones of the first and second output connections of said quadrature-selective filter, the first input connection having respective output connections at which said color-under and second under signals are respectively supplied in response to selection controlled by the count of image fields by said counter.

90. A video signal processing system as set forth in claim 89, wherein said quadrature-selective filter for responding to said lowpass filter response to said frequency-multiplexed signal to reproduce said color-under signal and said second under signal separately from each other comprises:

a component quadrature-selective filter having an input connection for receiving said lowpass filter response to said frequency-multiplexed signal and having a single output connection for supplying to the first input connection of said multiplexer said response that reproduces said color-under signal during selected fields and that otherwise reproduces said second under signal; and means for differentially combining the response from the single output connection of said component quadrature-selective filter with said lowpass filter response to said frequency-multiplexed signal as delayed to match the latency of said component quadrature-selective filter, thereby to supply to the second input connection of said multiplexer said response that reproduces said second under signal during selected fields and that otherwise reproduces said color-under signal.

91. A video signal processing system as set forth in claim 88, further comprising:

a bandpass line-comb filter passing said chroma sidebands from an output signal of said first upconverting means and rejecting an upconverted said second under signal in a bandpass line-comb filter response therefrom;

means for linearly combining said reproduced luminance signal, as generated by said means for processing said demodulation result, with said chroma sidebands, as recovered by said bandpass line-comb filter, thereby to generate a composite video signal; and a television transmitter for modulating a picture carrier in accordance with said composite video signal.

92. A video signal processing system as set forth in claim 82, further comprising:

means for modulating an amplitude of a first phasing of said second carrier with a second auxiliary signal for generating second amplitude-modulation sidebands of said second carrier, said first and first phasings of said second carrier being in quadrature with each other; and means for linearly combining said second amplitude-modulation sidebands of said first carrier with said first amplitude-modulation sidebands of said first carrier and with said chroma sidebands, in said combined signal, so said first and said second amplitude-modulation sidebands of said first carrier are orthogonal to each other, and so said second under signal is generated responsive to both said first and said second amplitude-modulation sidebands of said first carrier.

93. A video signal processing system as set forth in claim 92 further comprising:

a frequency modulator for modulating a frequency of a second carrier in accordance with said luminance signal to form a frequency-modulation signal extending over a frequency band higher in frequency than a frequency band in which said composite under signal reposes; and means for linearly combining said composite under signal with said frequency-modulation signal to generate a frequency-multiplexed signal.

94. A video signal processing system as set forth in claim 93, wherein said suppressed chrominance carrier and said second carrier are of the same frequency, said video signal processing system further comprising:

means for generating a lowpass filter response to said frequency-multiplexed signal, thereby separating said composite under signal from said frequency-modulation signal;

upconverting means responsive to said composite under signal as separated for regenerating said combined signal;

a lowpass line-comb filter, responding to said combined signal as regenerated by said upconverting means, to recover said first and said second amplitude-modulation sidebands of said first carrier; and means for synchronously detecting said first and said second amplitude-modulation sidebands of said first carrier as recovered to regenerate said first and said second auxiliary signals.

95. A video signal processing system as set forth in claim 94, further comprising:

means for generating a highpass filter response to said frequency-multiplexed signal, thereby separating said frequency-modulation signal from said composite under signal;

means for demodulating said frequency-modulation signal as separated, thereby to obtain a demodulation result; and means for processing said demodulation result, as controlled by said first and said second auxiliary signals supplied from said means for synchronously detecting, thereby to recover said luminance signal.

96. A video signal processing system as set forth in claim 95, further comprising:

a bandpass line-comb filter, responding to said combined signal as regenerated by said upconverting means, to recover said chroma sidebands;

means for linearly combining said luminance signal, as recovered by said means for processing said demodulation result, with said chroma sidebands, as recovered by said bandpass line-comb filter, thereby to generate a composite video signal; and a television transmitter for modulating a picture carrier in accordance with said composite video signal.

97. A video signal processing system as set forth in claim 93, further comprising:

means for generating a lowpass filter response to said frequency-multiplexed signal, thereby separating said composite under signal from said frequency-modulation signal;

first upconverting means, responsive to said composite under signal as separated by said means for generating said lowpass filter response to said frequency-multiplexed signal, for regenerating said first and said second amplitude-modulation sidebands of said first carrier together with an upconverted color under signal as an output signal therefrom;

a lowpass line-comb filter passing said first and said second amplitude-modulation sidebands of said first carrier from the output signal of said first upconverting means and rejecting said upconverted color under signal in a lowpass line-comb filter response therefrom; and means for synchronously detecting said first and said second amplitude-modulation sidebands of said first carrier as recovered to regenerate said first and said second auxiliary signals.

98. A video signal processing system as set forth in claim 97, further comprising:

means for generating a highpass filter response to said frequency-multiplexed signal, thereby separating said frequency-modulation signal from said composite under signal;

means for demodulating said frequency-modulation signal as thus separated, thereby to obtain a demodulation result; and means for processing said demodulation result, as controlled by said first and said second auxiliary signals supplied from said means for synchronously detecting, thereby to recover said luminance signal.

99. A video signal processing system as set forth in claim 98, further comprising:

second upconverting means, responsive to said composite under signal as separated by said means for generating said lowpass filter response to said frequency-multiplexed signal, for regenerating said chroma sidebands together with an upconverted second under signal as an output signal therefrom;

a bandpass line-comb filter passing said chroma sidebands from the output signal of said second upconverting means and rejecting said upconverted second under signal in a bandpass line-comb filter response therefrom;

means for linearly combining said luminance signal, as recovered by said means for processing said demodulation result, with said chroma sidebands, as recovered by said bandpass line-comb filter, thereby to generate a composite video signal; and a television transmitter for modulating a picture carrier in accordance with said composite video signal.

100. A video signal processing system as set forth in claim 93, further comprising:

means for generating a lowpass filter response to said frequency-multiplexed signal, thereby separating said composite under signal from said frequency-modulation signal;

upconverting means responsive to said composite under signal as separated for regenerating said chroma sidebands together with an upconverted second under signal as an output signal therefrom;

a lowpass line-comb filter passing said upconverted second under signal from the output signal of said upconverting means and rejecting said chroma sidebands in a lowpass line-comb filter response therefrom; and means, responsive to said upconverted second under signal from said lowpass line-comb filter, for synchronously detecting said first and said second auxiliary signals.

101. A video signal processing system as set forth in claim 100, wherein said means for detecting said first and said second auxiliary signals comprises:

a local color oscillator included in said upconverting means for generating oscillations at a frequency the same as that of said suppressed chrominance carrier;

means for separating color bursts from said chroma sidebands passed by a bandpass line-comb filter;

means for phase-locking the oscillations from said local color oscillator to those separated color bursts;

means, responsive to the oscillations from said local color oscillator, for generating a phase alternating carrier that has a frequency the same as that of said suppressed chrominance carrier, but is switched in phase from one scan line to the next in each image field so as to have the same phase at corresponding points in each of the scan lines of each of a succession of image fields;

second downconverting means for downconverting said upconverted second under signal in accordance with said phase alternating carrier to generate a second downconverted signal with amplitude-modulation sidebands, said second downconverting means being included within said means for detecting said first and said second auxiliary signals; and means for synchronously detecting two orthogonal sets of said amplitude-modulation sidebands of said second downconverted signal to regenerate said first and said second auxiliary signals.

102. A video signal processing system as set forth in claim 100, further comprising:

means for generating a highpass filter response to said frequency-multiplexed signal, thereby separating said frequency-modulation signal from said composite under signal;

means for demodulating said frequency-modulation signal as separated, thereby to obtain a demodulation result; and means for processing said demodulation result, as controlled by said first and said second auxiliary signals supplied from said means for synchronously detecting, thereby to recover said luminance signal.

103. A video signal processing system as set forth in claim 102, further comprising:

a bandpass line-comb filter passing said chroma sidebands from the output signal of said upconverting means and rejecting said upconverted second under signal in a bandpass line-comb filter response therefrom;

means for linearly combining said luminance signal, as recovered by said means for processing said demodulation result, with said chroma sidebands, as recovered by said bandpass line-comb filter, thereby to generate a composite video signal; and a television transmitter for modulating a picture carrier in accordance with said composite video signal.

104. A video signal processing system as set forth in claim 93, further comprising:

means for generating a lowpass filter response to said frequency-multiplexed signal, thereby separating said composite under signal from said frequency-modulation signal;

means including a quadrature-selective filter for responding to said lowpass filter response to said frequency-multiplexed signal to reproduce separately, said color-under signal as a reproduced color-under signal and said second under signal as a reproduced second under signal;

first upconverting means responsive to the reproduced color-under signal for regenerating said chroma sidebands; and means, responsive to the reproduced second under signal for synchronously detecting said first and said second auxiliary signals.

105. A video signal processing system as set forth in claim 104 further comprising:

means for generating a highpass filter response to said frequency-multiplexed signal, thereby separating said frequency-modulation signal from said composite under signal;

means for &modulating said frequency-modulation signal as separated, thereby to obtain a demodulation result; and means for processing said demodulation result, as controlled by said first and said second auxiliary signals supplied from said means for synchronously detecting, thereby to generate said luminance signal as a reproduced luminance signal.

106. A video signal processing system as set forth in claim 105, wherein said means for responding to said lowpass filter response to said frequency-multiplexed signal to reproduce said color-under signal and said second under signal separately from each other comprises:

a sync separator responsive to the reproduced luminance signal for separating synchronizing pulses therefrom;

a counter responsive to the separated synchronizing pulses for counting image fields;

said quadrature-selective filter being of a type with fixed filter coefficients having an input connection for receiving said lowpass filter response to said frequency-multiplexed signal said quadrature-selective filter, having a first output connection for supplying a response that reproduces said color-under signal during selected fields and that otherwise reproduces said second under signal, and having a second output connection for supplying a response that reproduces said second under signal during selected fields and that otherwise reproduces said color-under signal; and a multiplexer having first and second input connections from respective ones of the first and second output connections of said quadrature-selective filter the first, having respective output connections at which said color-under and second under signals are respectively supplied in response to selection controlled by the count of image fields by said counter.

107. A video signal processing system as set forth in claim 106, wherein said quadrature-selective filter for responding to said lowpass filter response to said frequency-multiplexed signal to reproduce said color-under signal and said second under signal separately from each other comprises:

a component quadrature-selective filter having an input connection for receiving said lowpass filter response to said frequency-multiplexed signal and having a single output connection for supplying to the first input connection of said multiplexer said response that reproduces said color-under signal during selected fields and that otherwise reproduces said second under signal; and means for differentially combining the response from the single output connection of said component quadrature-selective filter with said lowpass filter response to said frequency-multiplexed signal as delayed to match the latency of said component quadrature-selective filter, thereby to supply to the second input connection of said multiplexer said response that reproduces said second under signal during selected fields and that otherwise reproduces said color-under signal.

108. A video signal processing system as set forth in claim 105 further comprising:

a bandpass line-comb filter passing said chroma sidebands from an output signal of said first upconverting means and rejecting an upconverted second under signal in a bandpass line-comb filter response therefrom;

means for linearly combining said reproduced luminance signal, as generated by said means for processing said demodulation result, with said chroma sidebands, as recovered by said bandpass line-comb filter, thereby to generate a composite video signal; and a television transmitter for modulating a picture carrier in accordance with said composite video signal.

109. A frequency-multiplexed signal manifested in electrical form, said frequency-multiplexed signal comprising:

in a first frequency band, a first carrier wave modulated by a video signal descriptive of line by line horizontal scanning of a succession of image fields, said line by line horizontal scanning taking place during horizontal trace intervals having horizontal retrace intervals interspersed therewith, identified for purpose of claiming by consecutive ordinal numbers assigned in order of their occurrence; and, in a second frequency band different from said first frequency band, an accompanying signal comprising at least one set of amplitude modulation sidebands of a second carrier wave that is a multiple of half horizontal scan line frequency, that regresses 90° in phase each successive scan line of each odd-numbered image field and progresses 90° in phase each successive scan line of each even-numbered image field, and that is amplitude modulated during said horizontal retrace intervals; and at least one set of amplitude modulation sidebands of a third carrier wave that is a multiple of half horizontal scan line frequency, that progresses 90° in phase each successive scan line of each said odd-numbered image field and regresses 90° in phase each successive scan line of each said even-numbered image field, and that is amplitude modulated during said horizontal retrace intervals.

110. Electronic apparatus for processing said frequency-multiplexed signal as set forth in claim 109, said electronic apparatus comprising:

a frequency-selective filter for separating components of said frequency-multiplexed signal in said second frequency band from components of said frequency-multiplexed signal in said first frequency band;

means for heterodyning the components of said frequency-multiplexed signal in said second frequency band as separated by a converting carrier, which said converting carrier is said multiple of half horizontal scan line frequency that regresses 90° in phase each successive scan line of each said odd-numbered image field and that progresses 90° in phase each successive scan line of each said even-numbered image field;

a frequency-selective filter for passing a desired set of sidebands resulting from said heterodyning and for suppressing an undesired image set of sidebands resulting from said heterodyning;

a bandpass line-comb filter responding to a response of said frequency-selective filter for supplying a set of amplitude modulation sidebands being in accordance with the amplitude modulation of said second carrier wave and being unaffected by the amplitude modulation of said third carrier wave;

a lowpass line-comb filter responding to the response of said frequency-selective filter for supplying a set of amplitude modulation sidebands being in accordance with the amplitude modulation of said third carrier wave and being unaffected by the amplitude modulation of said second carrier wave; and detector means for detecting variation in an amplitude of the set of amplitude-modulation sidebands from said lowpass line-comb filter.

111. Electronic apparatus for processing said frequency-multiplexed signal as set forth in claim 110, said electronic apparatus comprising:

a frequency-selective filter for separating components of said frequency-multiplexed signal in said second frequency band from components of said frequency-multiplexed signal in said first frequency band;

means including a quadrature-selective filter for responding to the components of said frequency-multiplexed signal in said second frequency band as thus separated to reproduce said amplitude modulation sidebands of said second carrier wave and to reproduce said amplitude modulation sidebands of said third carrier wave, said amplitude modulation sidebands of said second carrier wave being reproduced separately from said amplitude modulation sidebands of said third carrier wave, and said amplitude modulation sidebands of said third carrier wave being reproduced separately from said amplitude modulation sidebands of said second carrier wave;

means for heterodyning reproduced amplitude modulation sidebands of said second carrier wave as separated by a converting carrier, which said converting carrier is said multiple of half horizontal scan line frequency that regresses 90° in phase each successive scan line of each said odd-numbered image field and that progresses 90° in phase each successive scan line of each said even-numbered image field;

a frequency-selective filter for passing a desired set of sidebands resulting from said heterodyning and for suppressing an undesired image set of sidebands resulting from said heterodyning;

detector means for detecting variation in art amplitude of said amplitude modulation sidebands of said third carrier wave.

112. A frequency-multiplexed signal as set forth in claim 109, wherein a frequency of said first carrier wave is modulated by said video signal descriptive of said line by line horizontal scanning of said succession of image fields in a frequency-modulation signal, said second carrier wave is a color-under signal, and said third carrier wave is a second under signal.

113. Electronic apparatus for processing said frequency-multiplexed signal as set forth in claim 112, said electronic apparatus comprising:

means for generating a lowpass filter response to said frequency-multiplexed signal, thereby separating from said frequency-modulation signal a composite under signal comprising said color-under signal and said second under signal;

upconverting means for generating a product signal by heterodyning said lowpass filter response with a converting carrier that is said multiple of half horizontal scan line frequency equal to a color carrier frequency plus a frequency of said second carrier wave, that regresses 90° in phase each successive scan line of each said odd-numbered image field, and that progresses 90° in phase each successive scan line of each said even-numbered image field;

an image-rejecting filter for supplying a response to said product signal in which an image of said color carrier frequency and frequencies surrounding that image frequency are suppressed;

a lowpass line-comb filter responding to said image-rejecting filter response to recover a set of amplitude-modulation sidebands; and detector means for detecting variation in an amplitude of said set of amplitude-modulation sidebands, thereby to recover at least a first auxiliary signal.

114. Electronic apparatus as set forth in claim 113, said electronic apparatus further comprising:

means for generating a highpass filter response to said frequency-multiplexed signal, thereby separating from said composite under signal said frequency-modulation signal;

means for demodulating said frequency-modulation signal as separated, thereby to obtain a demodulation result; and means for processing said demodulation result as controlled by said first auxiliary signal s from said detector means, thereby to recover a luminance signal.

115. Electronic apparatus as set forth in claim 114, further comprising:

a bandpass line-comb filter responding to said image-rejecting filter response to recover chrominance-descriptive amplitude-modulation sidebands therefrom;

means for linearly combining said luminanee signal, as recovered by said means for processing said demodulation result, with said chrominance-descriptive amplitude-modulation sidebands as recovered by said bandpass line-comb filter, thereby to generate a composite video signal; and a television transmitter for modulating a picture carrier in accordance with said composite video signal.

116. Electronic apparatus for processing said frequency-multiplexed signal as set forth in claim 112, wherein said color-under signal and second under signal have respective suppressed carriers of a same frequency as each other, said electronic apparatus comprising:

means for generating a lowpass filter response to said frequency-multiplexed signal, thereby separating a composite under signal comprising said color-under signal and said second under signal from said frequency-modulation signal;

means including a quadrature-selective filter for responding to said lowpass filter response to said frequency-multiplexed signal to reproduce said color-under signal and said second under signal separately from each other;

first upconverting means responsive to a reproduced color-under signal for regenerating chroma sidebands; and detector means for detecting variation in an amplitude of a reproduced second under carrier, thereby to recover a first auxiliary signal.

117. Electronic apparatus as set forth in claim 116, further comprising:

means for generating a highpass filter response to said frequency-multiplexed signal, thereby separating said frequency-modulation signal from said composite under signal;

means for demodulating said frequency-modulation signal as separated, thereby to obtain a demodulation result; and means for processing said demodulation result, as controlled by said first auxiliary signal and a second auxiliary signal supplied from said detector means, thereby to generate said luminanee signal as a reproduced luminanee signal.

118. Electronic apparatus as set forth in claim 117, wherein said means for responding to said lowpass filter response to said frequency-multiplexed signal to reproduce said color-under signal and said second under signal separately from each other comprises:

a sync separator responsive to the reproduced luminance signal for separating synchronizing pulses therefrom;

a counter responsive to the separated synchronizing pulses for counting image fields;

said quadrature-selective filter being of a type with fixed filter coefficients having an input connection for receiving said lowpass filter response to said frequency-multiplexed signal, having a first output connection for supplying a response that reproduces said color-under signal during selected fields and that otherwise reproduces said second under signal, and having a second output connection for supplying a response that reproduces said second under signal during selected fields and that otherwise reproduces said color-under signal; and a multiplexer having first and second input connections from respective ones of the first and second output connections of said quadrature-selective filter the first, having respective output connections at which said color-under and second under signals are respectively supplied in response to selection controlled by the count of image fields by said counter.

119. Electronic apparatus as set forth in claim 118, wherein said quadrature-selective filter for responding to said lowpass filter response to said frequency-multiplexed signal to reproduce said color-under signal and said second under signal separately from each other comprises:

a component quadrature-selective filter having an input connection for receiving said lowpass filter response to said frequency-multiplexed signal and having a single output connection for supplying to the first input connection of said multiplexer said response that reproduces said color-under signal during selected fields and that otherwise reproduces said second under signal; and means for differentially combining the response from the single output connection of said component quadrature-selective filter with said lowpass filter response to said frequency-multiplexed signal as delayed to match the latency of said component quadrature-selective filter, thereby to supply to the second input connection of said multiplexer said response that reproduces said second under signal during selected fields and that otherwise reproduces said color-under signal.

120. Electronic apparatus as set forth in claim 117, further comprising:

a bandpass line-comb filter passing said chroma sidebands from an output signal of said first upconverting means and rejecting an upconverted second under signal in a bandpass line-comb filter response therefrom;

means for linearly combining said luminance signal, as recovered by said means for processing said demodulation result, with said chroma sidebands, as recovered by said bandpass line-comb filter, thereby to generate a composite video signal; and a television transmitter for modulating a picture carrier in accordance with said composite video signal.

121. Electronic apparatus for processing said frequency-multiplexed signal as set forth in claim 112, wherein said color-under signal and said second under signal have respective suppressed carriers of a same frequency as each other, said electronic apparatus comprising:

means for generating a lowpass filter response to said frequency-multiplexed signal, thereby separating from said frequency-modulation signal a composite under signal comprising said color-under signal and said second under signal;

upconverting means for generating a product signal by heterodyning said lowpass filter response with a converting carrier that is said multiple of half horizontal scan line frequency equal to a color carrier frequency plus a frequency of said second carrier wave, that regresses 90° in phase each successive scan line of each said odd-numbered image field, and that progresses 90° in phase each successive scan line of each said even-numbered image field;

an image-rejecting filter for supplying a response to said product signal in which an image of said color carrier frequency and frequencies surrounding that image frequency are suppressed, said response including chrominance-descriptive amplitude-modulation sidebands of a chrominance carrier accompanied by color bursts, a first further set of amplitude-modulation sidebands, and a second further set of amplitude-modulation sidebands in quadrature with said first further set of amplitude-modulation sidebands;

a lowpass line-comb filter responding to said response supplied from said image-rejecting filter to recover said first further set of amplitude-modulation sidebands and said second further set of amplitude-modulation sidebands in quadrature therewith;

a local color oscillator included in said upconverting means for generating oscillations at a frequency the same as that of said chrominance carrier of said chrominance-descriptive amplitude-modulation sidebands and of said color bursts accompanying said chrominance-descriptive amplitude-modulation sidebands;

means for separating said color bursts from said chrominance-descriptive amplitude-modulation sidebands;

means for phase-locking the oscillations from said local color oscillator to those separated color bursts;

means, responsive to the oscillations from said local color oscillator, for generating a phase alternating carrier that has a frequency the same as that of a suppressed chrominance carrier, but is switched in phase from one scan line to the next in each image field to have a same phase at corresponding points in each of the scan lines of each of said succession of image fields;

means for synchronously detecting a first auxiliary signal from said first further set of amplitude-modulation sidebands recovered by said lowpass line-comb filter responsive to a prescribed phasing of said phase alternating carrier; and means for synchronously detecting a second auxiliary signal from said second further set of amplitude-modulation sidebands recovered by said lowpass line-comb filter responsive to a phasing of said phase alternating carrier that is in quadrature with said prescribed phasing.

122. Electronic apparatus as set forth in claim 121, said electronic apparatus further comprising:

means for generating a highpass filter response to said frequency-multiplexed signal, thereby separating from said composite under signal said frequency-modulation signal;

means for demodulating said frequency-modulation signal as separated, thereby to obtain a demodulation result; and means for processing said demodulation result as controlled by at least the first of said first and second auxiliary signals, thereby to recover a luminance signal.

123. Electronic apparatus as set forth in claim 122, further comprising:

a bandpass line-comb filter responding to said response supplied from said image-rejecting filter to recover chrominance-descriptive amplitude-modulation sidebands therefrom;

means for linearly combining said luminance signal, as recovered by said means for processing said demodulation result, with said chrominance-descriptive amplitude-modulation sidebands as recovered by said bandpass line-comb filter, thereby to generate a composite video signal; and a television transmitter for modulating a picture carrier in accordance with said composite video signal.

124. Electronic apparatus for processing said frequency-multiplexed signal as set forth in claim 112, said electronic apparatus comprising:

means for generating a lowpass filter response to said frequency-multiplexed signal, thereby separating from said frequency-modulation signal a composite under signal comprising said color-under signal and said second under signal;

first upconverting means for generating a first product signal by heterodyning said lowpass filter response with a first converting carrier that is equal to a color carrier frequency plus a frequency of said third carrier wave, that regresses 90° in phase each successive scan line of each said odd-numbered image field, and that progresses 90° in phase each successive scan line of each said even-numbered image field;

a first image-rejecting filter for supplying a response to said first product signal in which an image of said color carrier frequency and frequencies surrounding that image frequency are suppressed, said first image-rejecting filter response comprising chrominance-descriptive amplitude-modulation sidebands of a chrominance carrier accompanied by color bursts;

second upconverting means for generating a second product signal by heterodyning said lowpass filter response with a second converting carrier that is equal to said color carrier frequency plus a frequency of said second carrier wave, that regresses 90° in phase each successive scan line of each said odd-numbered image field, and that progresses 90° in phase each successive scan line of each said even-numbered image field;

a second image-rejecting filter for supplying a response to said second product signal in which the image of said color carrier frequency and frequencies surrounding that image frequency are suppressed, said second image-rejecting filter response comprising a first further set of amplitude-modulation sidebands, and a second further set of amplitude-modulation sidebands in quadrature with said first further set of amplitude-modulation sidebands;

a lowpass line-comb filter responding to said response supplied from said second image-rejecting filter to recover said first further set of amplitude-modulation sidebands and said second further set of amplitude-modulation sidebands in quadrature therewith;

a local color oscillator included in said first and second upconverting means for generating oscillations at a frequency the same as that of a suppressed chrominance carrier of said chominance-descriptive amplitude-modulation sidebands and of said color bursts accompanying said chrominance-descriptive amplitude-modulation sidebands;

means for separating said color bursts from said response supplied from said first image-rejecting filter;

means for phase-locking the oscillations from said local color oscillator to those separated color bursts;

means, responsive to the oscillations from said local color oscillator, for generating a phase alternating carrier that has a frequency the same as that of said suppressed chrominance carrier, but is switched in phase from one scan line to the next in each image field to have a same phase at corresponding points in each of the scan lines of each of said succession of image fields;

means for synchronously detecting a first auxiliary signal from said first further set of amplitude-modulation sidebands recovered by said lowpass line-comb filter responsive to a prescribed phasing of said phase alternating carrier; and means for synchronously detecting a second auxiliary signal from said second further set of amplitude-modulation sidebands recovered by said lowpass line-comb filter responsive to a phasing of said phase alternating carrier that is in quadrature with said prescribed phasing.

125. Electronic apparatus for processing said frequency-multiplexed signal as set forth in claim 112, said electronic apparatus comprising:

means for generating a highpass filter response to said frequency-multiplexed signal, thereby separating said frequency-modulation signal from a composite under signal comprised of said color under signal and said second under signal;

means for demodulating said frequency-modulation signal as separated, thereby to obtain a demodulation result; and means for processing said demodulation result as controlled by at least a first of first and second auxiliary signals, thereby to recover a luminance signal.

126. Electronic apparatus as set forth in claim 125, further comprising:

a bandpass line-comb filter responding to an image-rejecting filter response to recover chrominance-descriptive amplitude-modulation sidebands therefrom;

means for linearly combining said luminance signal, as recovered by said means for processing said demodulation result, with said chrominance-descriptive amplitude-modulation sidebands as recovered by said bandpass line-comb filter, thereby to generate a composite video signal; and a television transmitter for modulating a picture carrier in accordance with said composite video signal.

127. Electronic apparatus for processing said frequency-multiplexed signal as set forth in claim 112, said electronic apparatus comprising:

means for generating a lowpass filter response to said frequency-multiplexed signal, thereby separating from said frequency-modulation signal a composite under signal comprising said color-under signal and said second under signal;

upconverting means for generating a product signal by heterodyning said lowpass filter response with a convening carrier that is said multiple of half horizontal scan line frequency equal to a color carrier frequency plus a frequency of said second carrier wave, that regresses 90° in phase each successive scan line of each said odd-numbered image field, and that progresses 90° in phase each successive scan line of each said even-numbered image field;

an image-rejecting filter for supplying a response to said product signal in which an image of said color carrier frequency and frequencies surrounding that image frequency are suppressed, said response including chrominance-descriptive amplitude-modulation sidebands of a chrominance carrier accompanied by color bursts, a first further set of amplitude-modulation sidebands, and a second further set of amplitude-modulation sidebands in quadrature with said first further set of amplitude-modulation sidebands;

a lowpass line-comb filter responding to said response supplied from said image-rejecting filter to recover an upconverted second under signal;

a local color oscillator included in said upconverting means for generating oscillations at a frequency the same as that of a suppressed chrominance carrier;

means for separating said color bursts from said response supplied from said image-rejecting filter;

means for phase-locking the oscillations from said local color oscillator to those separated color bursts;

means, responsive to the oscillations from said local color oscillator, for generating a phase alternating carrier that has a frequency the same as that of said suppressed chrominance carrier, but is switched in phase from one scan line to the next in each image field to have a same phase at corresponding points in each of the scan lines of each of said succession of image fields;

downconverting means for downconverting said upconverted second under signal in accordance with said phase alternating carrier to generate a downconverted signal comprising a first further set of amplitude-modulation sidebands and a second further set of amplitude-modulation sidebands in quadrature therewith; and means for synchronously detecting first and second auxiliary signals from said first and said second further sets of said amplitude-modulation sidebands, respectively.

128. Electronic apparatus as set forth in claim 127, said electronic apparatus further comprising:

means for generating a highpass filter response to said frequency-multiplexed signal, thereby separating from said composite under signal said frequency-modulation signal;

means for demodulating said frequency-modulation signal as separated, thereby to obtain a demodulation result; and means for processing said demodulation result as controlled by at least the first of said first and second auxiliary signals, thereby to recover a luminance signal.

129. Electronic apparatus as set forth in claim 128, further comprising:

a bandpass line-comb filter responding to said response supplied from said image-rejecting filter to recover said chrominance-descriptive amplitude-modulation sidebands therefrom;

means for linearly combining said luminance signal, as recovered by said means for processing said demodulation result, with said chrominance-descriptive amplitude-modulation sidebands as recovered by said bandpass line-comb filter, thereby to generate a composite video signal; and a television transmitter for modulating a picture carrier in accordance with said composite video signal.

130. Electronic apparatus for processing said frequency-multiplexed signal as set forth in claim 112, said electronic apparatus comprising:

means for generating a lowpass filter response to said frequency-multiplexed signal, thereby separating from said frequency-modulation signal a composite under signal comprising said color-under signal and said second under signal;

means, including a quadrature-selective filter for responding to said lowpass filter response to said frequency-multiplexed signal to reproduce said color-under signal and said second under signal separately from each other;

first upconverting means responsive to a reproduced color-under signal for regenerating chroma sidebands; and means, responsive to a reproduced second under signal for synchronously detecting first and said second auxiliary signals.

131. Electronic apparatus as set forth in claim 130, further comprising:

means for generating a highpass filter response to said frequency-multiplexed signal, thereby separating said frequency-modulation signal from said composite under signal;

means for demodulating said frequency-modulation signal as separated, thereby to obtain a demodulation result; and means for processing said demodulation result, as controlled by said first and said second auxiliary signals supplied from said means for synchronously detecting, thereby to generate said luminance signal as a reproduced luminance signal.

132. Electronic apparatus as set forth in claim 131, wherein said means for responding to said lowpass filter response to said frequency-multiplexed signal to reproduce said color-under signal and said second under signal separately from each other comprises:

a sync separator responsive to the reproduced luminance signal for separating synchronizing pulses therefrom;

a counter responsive to the separated synchronizing pulses for counting image fields;

said quadrature-selective filter being of a type with fixed filter coefficients having an input connection for receiving said lowpass filter response to said frequency-multiplexed signal, having a first output connection for supplying a response that reproduces said color-under signal during selected fields and that otherwise reproduces said second under signal, and having a second output connection for supplying a response that reproduces said second under signal during selected fields and that otherwise reproduces said color-under signal; and a multiplexer having first and second input connections from respective ones of the first and second output connections of said quadrature-selective filter the first, having respective output connections at which said color-under and second under signals are respectively supplied in response to selection controlled by the count of image fields by said counter.

133. Electronic apparatus as set forth in claim 132, wherein said quadrature-selective filter for responding to said lowpass filter response to said frequency-multiplexed signal to reproduce said color-under signal and said second under signal separately from each other comprises:

a component quadrature-selective filter having an input connection for receiving said lowpass filter response to said frequency-multiplexed signal and having a single output connection for supplying to the first input connection of said multiplexer said response that reproduces said color-under signal during selected fields and that otherwise reproduces said second under signal; and means for differentially combining the response from the single output connection of said component quadrature-selective filter with said lowpass filter response to said frequency-multiplexed signal as delayed to match the latency of said component quadrature-selective filter, thereby to supply to the second input connection of said multiplexer said response that reproduces said second under signal during selected fields and that otherwise reproduces said color-under signal.

134. Electronic apparatus as set forth in claim 131, further comprising:
a bandpass line-comb filter passing said chroma sidebands from an output signal of said first upconverting means and rejecting an upconverted second under signal in a bandpass line-comb filter response therefrom;
means for linearly combining said luminance signal, as recovered by said means for processing said demodulation result, with said chroma sidebands, as recovered by said bandpass line-comb filter, thereby to generate a composite video signal; and
a television transmitter for modulating a picture carrier in accordance with said composite video signal.

135. A video signal processing system for combining an auxiliary signal with a video chrominance signal carrying chrominance information of a video image and which said video chrominance signal at any one time occupies in a two dimensional spatial domain at most only two respectively opposing quadrants of a chrominance carrier on which said video chrominance signal is modulated, to provide therefrom a composite chrominance-plus-auxiliary signal said system, comprising:
combining means for receiving said video chrominance signal and said auxiliary signal, and for modulating said auxiliary signal onto an auxiliary carrier to produce a modulated auxiliary signal such that at any time said modulated auxiliary signal occupies in said two-dimensional spatial domain only opposing quadrants of said auxiliary carrier complementary to said opposing quadrants of said chrominance carrier occupied at said time by said video chrominance signal, and for combining said modulated auxiliary signal with said video chrominance signal for thereby providing said composite chrominance-plus-auxiliary signal.

136. The video signal processing system of claim 135, wherein said video chrominance signal is a color-under chrominance component signal.

137. The video signal processing system of claim 135, wherein said chrominance carrier is a four-phase carrier having a frequency of approximately 629 KHz and wherein said video chrominance signal is quadrature amplitude modulated on said chrominance carrier.

138. The video signal processing system of claim 135, wherein said auxiliary carrier is a four-phase carrier having a frequency of approximately 629 KHz and wherein said auxiliary signal is amplitude modulated on said auxiliary carrier.

139. The video signal processing system of claim 135, wherein said auxiliary carrier is a four-phase carrier having a frequency of approximately 250 KHz and wherein said auxiliary signal is amplitude modulated on said auxiliary carrier.

140. The video signal processing system of claim 135, wherein said chrominance carrier shifts 90° in phase each succeeding scan line of each of a succession of video fields, for purposes of claiming said video fields being consecutively numbered in order of their occurrence, said 90° of shift in phase being in a first sense in odd video fields and being in a second sense in even video fields, said first and second senses being opposite to each other.

141. The video signal processing system of claim 140, wherein said auxiliary carrier shifts 90° in phase each succeeding scan line of each of said succession of video fields, said 90° of shift in phase being in said first sense in said even video fields and being in said second sense in said odd video fields.

142. The video signal processing system of claim 135; wherein, when said video chrominance signal occupies a first quadrant and a third quadrant of said chrominance carrier in said two dimensional spatial domain, said auxiliary signal occupies a second quadrant and a fourth quadrant of said auxiliary carrier in said two dimensional spatial domain; and wherein, when said video chrominance signal occupies a second quadrant and a fourth quadrant of said chrominance carrier in said two dimensional spatial domain, said auxiliary signal occupies a first quadrant and a third quadrant of said auxiliary carrier in said two dimensional spatial domain.

143. The video signal processing system of claim 135, wherein said chrominance carrier and said auxiliary carrier are the same in frequency.

144. The video signal processing system of claim 135, wherein said auxiliary signal is a motion signal representative of a degree of motion in said video image.

145. The video signal processing system of claim 135, wherein said combining means comprises:
chrominance signal modulation means for modulating said video chrominance signal on said chrominance carrier to produce a modulated video chrominance signal.;
auxiliary signal modulation means for modulating said auxiliary signal on said auxiliary carrier to produce said modulated auxiliary signal; and
means for adding said modulated video chrominance signal and said modulated auxiliary signal together.

146. The video signal processing system of claim 145, wherein said chrominance signal modulation means is a down conversion mixer for converting a chrominance component signal modulated on a high frequency carrier to a lower carrier frequency.

147. The video signal processing system of claim 145, wherein said chrominance signal modulation means and said auxiliary signal modulation means are both four-phase modulators.

148. The video signal processing system of claim 144, wherein said video chrominance signal is an NTSC chroma component modulated on a chroma subcarrier having a frequency of approximately 3.58 MHz and said chrominance signal modulation means is a four-phase modulator having a carrier frequency of approximately 4.21 MHz for down-converting a frequency of said chrominance carrier to approximately 629 KHz.

149. The video signal processing system of claim 145, wherein said auxiliary signal modulation means is a four-phase modulator having a carrier frequency of approximately 250 KHz.

150. A video signal processing system for separating from a composite chrominance-plus-auxiliary signal a video chrominance signal carrying chrominance information of a video image, and which said video chrominance signal at any one time occupies, in a two-dimensional spatial domain, respectively opposing quadrants of a chrominance carrier on which said video chrominance signal is modulated and an auxiliary carrier on which an auxiliary signal is modulated to produce a modulated auxiliary signal such that said modulated auxiliary signal occupies only opposing quadrants of said auxiliary carrier complementary to said opposing quadrants of said chrominance carrier, said modulated auxiliary signal being combined with said video chrominance signal as mutual constituents of said composite chrominance-plus-auxiliary signal, said system comprising:

separation means for receiving said composite chrominance-plus-auxiliary signal and for selecting said video chrominance signal from respective opposing quadrants of said chrominance carrier occupied at said time by said video chrominance signal and for also selecting said auxiliary signal from respectively complementarily opposing quadrants of said auxiliary carrier occupied at said time by said auxiliary signal.

151. The video signal processing system of claim 150, wherein said video chrominance signal is a color-under chrominance component signal.

152. The video signal processing system of claim 150, wherein said chrominance carrier is a four-phase carrier having a frequency of approximately 629 KHz and wherein said video chrominance signal is quadrature amplitude modulated on said chrominance carrier.

153. The video signal processing system of claim 150, wherein said auxiliary carrier is a four-phase carrier having a frequency of approximately 629 KHz and wherein said auxiliary signal is amplitude modulated on said auxiliary carrier.

154. The video signal processing system of claim 150, wherein said auxiliary carrier is a four-phase carrier having a frequency of approximately 250 KHz and wherein said auxiliary signal is amplitude modulated on said auxiliary carrier.

155. The video signal processing system of claim 150, wherein said chrominance carrier shifts 90° in phase each succeeding scan line of each of a succession of video fields, for purposes of claiming said video fields being consecutively numbered in order of their occurrence, said 90° of shift in phase being in a first sense in odd video fields and being in a second sense in even video fields, said first and second senses being opposite to each other.

156. The video signal processing system of claim 155, wherein said auxiliary carrier shifts 90° in phase each succeeding scan line of each of said succession of video fields, said 90° of shift in phase being in said first sense in said even video fields and being in said second sense in said odd video fields.

157. The video signal processing system of claim 150; wherein, when said video chrominance signal occupies a first quadrant and a third quadrant of said chrominance carrier in said two dimensional spatial domain, said auxiliary signal occupies a second quadrant and a fourth quadrant of said auxiliary carrier in said two dimensional spatial domain; and wherein, when said video chrominance signal occupies a second quadrant and a fourth quadrant of said chrominance carrier in said two dimensional spatial domain, said auxiliary signal occupies a first quadrant and a third quadrant of said auxiliary carrier in said two dimensional spatial domain.

158. The video signal processing system of claim 150, wherein said chrominance carrier and said auxiliary carrier are equal in frequency.

159. The video signal processing system of claim 150, wherein said auxiliary signal is a motion signal representative of a degree of motion in said video image.

160. The video signal processing system of claim 150, wherein said separation means comprises:

quadrant selective filter means for receiving said composite chrominance-plus-auxiliary signal and passing therefrom signals occupying a pair of respectively opposing quadrants thereof while blocking signals from diagonally opposed quadrants thereof;

differencing means for differencing said composite chrominance-plus-auxiliary signal with an output signal passed by said quadrant selective filter means; and multiplexing means for switching at a video field rate a pair of signal outputs between said output signal passed by said quadrant selective filter means and a difference output signal of said differencing means.

\* \* \* \* \*